United States Patent
Yamagami et al.

(10) Patent No.: US 10,190,873 B1
(45) Date of Patent: Jan. 29, 2019

(54) SHAPE MEASURING DEVICE AND SHAPE MEASURING METHOD

(71) Applicant: Keyence Corporation, Osaka (JP)

(72) Inventors: Tsuyoshi Yamagami, Osaka (JP); Masato Shimodaira, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/895,467

(22) Filed: Feb. 13, 2018

(30) Foreign Application Priority Data

Jul. 31, 2017 (JP) .................. 2017-148148

(51) Int. Cl.
G01B 11/25 (2006.01)
G01B 11/02 (2006.01)

(52) U.S. Cl.
CPC .......... *G01B 11/2518* (2013.01); *G01B 11/02* (2013.01)

(58) Field of Classification Search
CPC ...................... G01B 11/2518; G01B 11/02
USPC ................................. 356/600–640
See application file for complete search history.

(56) References Cited

FOREIGN PATENT DOCUMENTS

JP 2015-009314 1/2015

OTHER PUBLICATIONS

U.S. Appl. No. 15/893,736, filed Feb. 12, 2018 (254 pages).
U.S. Appl. No. 15/893,741, filed Feb. 12, 2018 (257 pages).
U.S. Appl. No. 15/893,852, filed Feb. 12, 2018 (255 pages).
U.S. Appl. No. 15/894,183, filed Feb. 12, 2018 (444 pages).
U.S. Appl. No. 15/894,962, filed Feb. 13, 2018 (434 pages).
U.S. Appl. No. 15/895,263, filed Feb. 13, 2018 (77 pages).

*Primary Examiner* — Tri T Ton
(74) *Attorney, Agent, or Firm* — Kilyk & Bowersox, P.L.L.C.

(57) ABSTRACT

An exposure time is changed stepwise, a light receiving amount output from a light receiving section is obtained at each exposure time, which is changed stepwise, and height image data, in which each pixel value indicates a height of each portion of a surface of a measuring object, is generated based on the obtained light receiving amount. It is determined whether each pixel constituting each height image is valid or invalid based on the obtained light receiving amount. An exposure time, which corresponds to a height image in which the number of pixels determined to be valid satisfies a predetermined condition, is set as a set value.

10 Claims, 47 Drawing Sheets

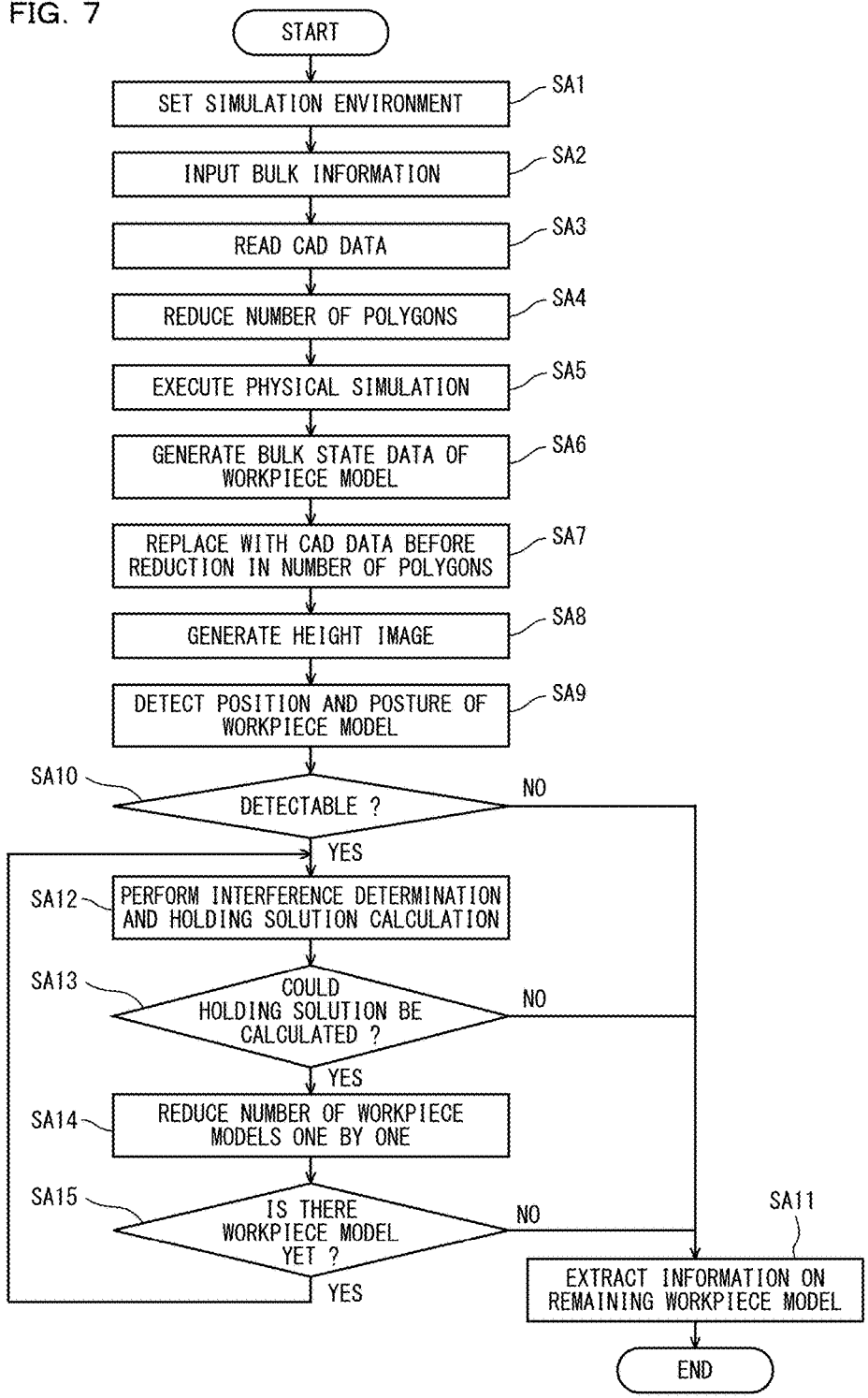

BEFORE REDUCTION IN NUMBER OF POLYGONS
NUMBER OF POLYGONS: 26,214

AFTER REDUCTION IN NUMBER OF POLYGONS
NUMBER OF POLYGONS: 414

AFTER REDUCTION IN NUMBER OF POLYGONS
NUMBER OF POLYGONS: 50

FIG. 31
2D DISPLAY       3D DISPLAY
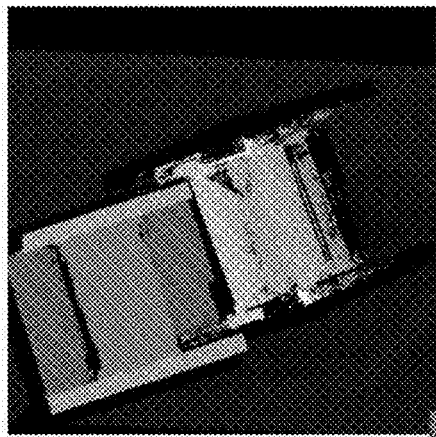 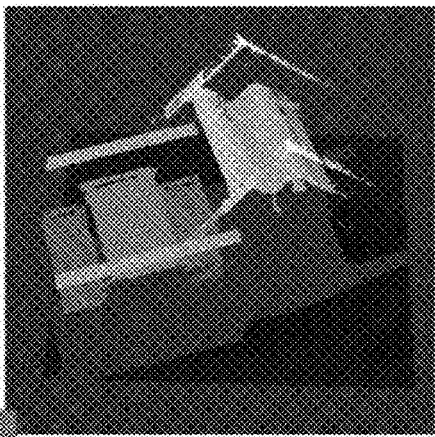
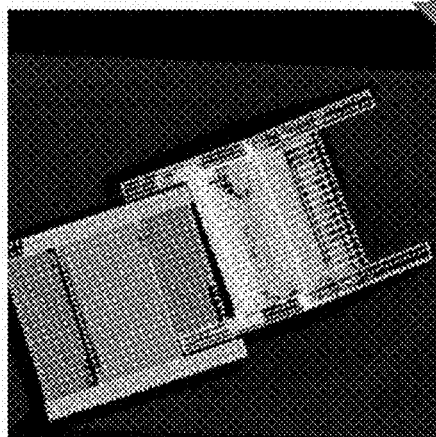 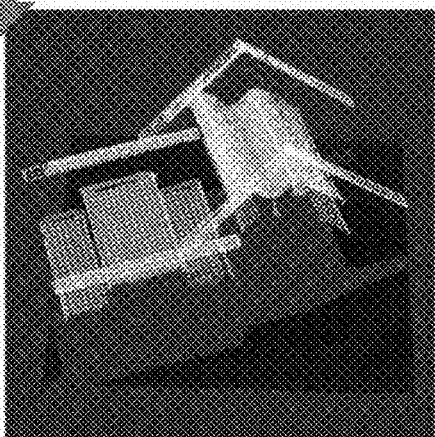

FIG. 35

| SEARCH MODEL | HOLDING REGISTRATION POSITION | NUMBER OF TIMES |
|---|---|---|
| A | A-000 | 125 |
| A | A-001 | 87 |
| A | A-002 | 0 |
| B | B-000 | 12 |
| B | B-001 | 3 |
| B | B-002 | 0 |
| B | B-003 | 0 |
| B | B-004 | 5 |
| C | C-000 | 226 |
| C | C-002 | 148 |
| C | C-003 | 215 |
| C | C-005 | 79 |

FIG. 36

| SEARCH MODEL | HOLDING REGISTRATION POSITION | NUMBER OF TIMES |
|---|---|---|
| C | C-000 | 226 |
| C | C-003 | 215 |
| C | C-002 | 148 |
| A | A-000 | 125 |
| A | A-001 | 87 |
| C | C-005 | 79 |
| B | B-000 | 12 |
| B | B-004 | 5 |
| B | B-001 | 3 |
| A | A-002 | 0 |
| B | B-002 | 0 |
| B | B-003 | 0 |

FIG. 37

| HAND MODEL | NUMBER OF REMAINING WORKPIECES (AVERAGE) | NUMBER OF REMAINING WORKPIECES (MAXIMUM) | NUMBER OF REMAINING WORKPIECES (MINIMUM) |
|---|---|---|---|
| HAND SHAPE 1 | 6.4 | 7 | 5 |
| HAND SHAPE 2 | 3.8 | 6 | 2 |
| HAND SHAPE 3 | 9.7 | 10 | 8 |
| HAND SHAPE 4 | 2.5 | 6 | 0 |
| HAND SHAPE 5 | 10 | 10 | 10 |
| HAND SHAPE 6 | 10 | 10 | 10 |
| HAND SHAPE 7 | 5.4 | 7 | 4 |

SHAPE MEASURING DEVICE AND SHAPE MEASURING METHOD

CROSS-REFERENCE TO RELATED APPLICATIONS

The present application claims foreign priority based on Japanese Patent Application No. 2017-148148, filed Jul. 31, 2017, the contents of which is incorporated herein by reference.

BACKGROUND OF THE INVENTION

1. Field of the Invention

The present invention relates to a shape measuring device and a shape measuring method, which measure the shape of an object to be measured using light.

2. Description of Related Art

For example, in various product assembly sites, a plurality of components (workpieces), which are accommodated in delivery boxes or the like, are held, by an end effector such as a hand portion attached to an arm of an industrial robot, sequentially extracted, and conveyed to a predetermined place.

A case where an industrial robot is used in combination with a robot vision, which is a visual sensor, is increasing. A robot system having a robot vision is configured to repeatedly perform an operation of first acquiring height information of a workpiece, which is a held object, by capturing an image of the workpiece using the robot vision, then holding (picking) a pre-registered appropriate position of the workpiece, and conveying and loading (placing) the workpiece on a predetermined place.

In addition, before conveyed, workpieces may overlap each other in an aligned state, but may not be aligned with each other and may be randomly superimposed and stacked in a non-aligned state, that is, loaded in bulk. When workpieces are loaded in bulk, typically, the workpieces have different positions and postures for each delivery box and there are no workpieces having the same position and posture. An operation of sequentially extracting such workpieces in bulk and conveying and loading the same on a predetermined place is called "bin picking". Bin picking is much more difficult than picking workpieces that are aligned, and needs to control a robot so as to reliably hold a target workpiece, in order to allow the hand portion of the corresponding robot so as not to interfere with surrounding objects.

As a visual sensor of a robot, which performs such bin picking, a shape measuring device may be used. The shape measuring device irradiates an object to be measured with light to receive reflected light, and obtains a height image showing the shape of the object to be measured based on the light receiving amount (e.g., see JP-A-2015-009314).

SUMMARY OF THE INVENTION

However, when capturing a height image, light such as patterned light projected from a projector, which is a light projecting section, is reflected from the surface of a workpiece and reaches an image sensor of a camera. At that time, an appropriate exposure time of the image sensor strongly depends on the material of the workpiece, and even in the same workpiece, strongly depends on the disposed state of the workpiece (e.g., the inclination of the surface). When the exposure time is not appropriate, the number of valid pixels required to constitute the height image is reduced.

Although the exposure time may be adjusted by manual operation, the manual operation requires a process in which a user searches for the range of optimum exposure time while viewing a height image obtained at an exposure time, which is set by the user. In addition, when performing a search for narrowing down the optimum exposure time by manual operation, it is difficult to obtain an appropriate exposure time from various cases due to dependency on individual skill and poor reproducibility. In addition, in the case of pixels constituting the height image, it is difficult to determine whether or not the pixels are valid pixels on the surface, and in particular, it is difficult to verify and determine within a short time whether or not the manually determined exposure time is a reasonable time.

The present invention has been made in view of the foregoing problems, and is to enable the automatic setting of the appropriate range of an exposure time.

To achieve the object described above, according to a first invention, there is provided a shape measuring device that measures a shape of a measuring object. The shape measuring device includes a light projecting section configured to irradiate the measuring object with light, a light receiving section configured to receive the light projected by the light projecting section and reflected from the measuring object, an exposure control section configured to change an exposure time of the light receiving section stepwise, a height image data generating section configured to obtain a light receiving amount output from the light receiving section at each exposure time, which is changed stepwise by the exposure control section, and to generate height image data, in which each pixel value indicates a height of each portion of a surface of the measuring object, based on the obtained light receiving amount, a pixel determination section configured to obtain a light receiving amount received by the light receiving section at each exposure time, which is changed stepwise by the exposure control section, and to determine whether each pixel constituting each height image, which is generated by the height image data generating section, is valid or invalid based on the obtained light receiving amount, and an exposure time setting section configured to set, as a set value, an exposure time, which corresponds to a height image in which the number of pixels determined to be valid by the pixel determination section satisfies a predetermined condition.

According to this configuration, the light receiving amount is obtained at each exposure time, which is changed stepwise by the exposure control section. Based on the light receiving amount at each exposure time, it is determined whether each pixel, which generates height image data, is valid or invalid. Since the exposure time, which corresponds to a height image in which the number of pixels determined to be valid satisfies a predetermined condition, is automatically set, height image data having a large number of valid pixels may be obtained without adjusting the exposure time by manual operation. Thus, dependency on individual skill of an exposure time adjustment operation is eliminated and reproducibility is increased, and moreover, it is possible to obtain an appropriate exposure time from various cases.

According to a second invention, the exposure control section is configured to increase the exposure time at an equal ratio. In other words, when the exposure time is increased at an equal interval, in a case of precisely searching for a portion having a short exposure time, the number of imaging times may become enormous since a change in the number of valid pixels in a portion having a long exposure time is small. In addition, although it is impossible to observe a change in the number of valid pixels in a portion having a short exposure time with sufficient resolution when fitting to a portion having a long exposure time, it is possible to accurately grasp the tendency of a change in the number of valid pixels while reducing the number of imaging times by increasing the exposure time at an equal ratio.

According to a third invention, the pixel determination section is configured to determine whether each pixel in an attention area, which is set within an imaging range by the light receiving section, is valid or invalid. In other words, although the imaging range by the light receiving section is often set to be wider than the area in which a workpiece is placed, even if it is determined whether a pixel in the area other than the workpiece is valid or invalid, this is not meaningful for the set value of the exposure time, and conversely, may cause the set value of the exposure time to be inappropriate. In the present invention, since the pixel in the area other than the workpiece may be excluded depending on the setting of the attention area, the set value of the exposure time may be an appropriate value.

According to a fourth invention, the shape measuring device further includes a display control section configured to generate an attention area setting screen for causing a user to set the attention area, and a display section configured to display the attention area setting screen generated by the display control section.

According to a fifth invention, the exposure time setting section is configured to set, as the set value, a predetermined time, which is equal to or less than an exposure time at which the number of pixels determined to be valid by the pixel determination section is the largest.

A predetermined time, which is less than the exposure time at which the number of pixels is the largest, may be set as the set value. That is, the exposure time at which the number of valid pixels takes the maximum value is often present in an approximately flat portion of the graph illustrated in FIG. 41. In this case, the exposure time selected as the set value is likely to fluctuate in the time axis direction, and thus may be unstable. Therefore, instead of the exposure time at which the number of valid pixels takes the maximum value, the exposure time at which the number of valid pixels is slightly smaller than the maximum value may be set as the set value.

According to a sixth invention, the light projecting section is configured to irradiate patterned light having a periodic illuminance distribution, and the pixel determination section is configured to determine a pixel, a contrast of a light amount of which is equal to or greater than a threshold, to be valid.

According to a seventh invention, the shape measuring device is configured to allow the user to adjust the exposure time set by the exposure time setting section.

According to an eighth invention, the shape measuring device further includes a display control section configured to enable simultaneous display of a height image corresponding to a first exposure time and a height image corresponding to a second exposure time, which is different from the first exposure time.

According to a ninth invention, the shape measuring device further includes a display control section configured to generate a graph illustrating a relationship between the number of pixels determined to be valid by the pixel determination section and the exposure time, and to enable logarithmic display of an exposure time axis.

According to a tenth invention, there is provided a shape measuring method of measuring a shape of a measuring object. The shape measuring method includes irradiating the measuring object with light and receiving the light reflected from the corresponding measuring object by a light receiving section, changing an exposure time of the light receiving section stepwise, obtaining a light receiving amount output from the light receiving section at each exposure time, which is changed stepwise, and generating height image data, in which each pixel value indicates a height of each portion of a surface of the measuring object, based on the obtained light receiving amount, obtaining a light receiving amount received by the light receiving section at each exposure time, which is changed stepwise, and determining whether each pixel constituting each height image data is valid or invalid based on the obtained light receiving amount, and setting, as a set value, an exposure time, which corresponds to a height image in which the number of pixels determined to be valid satisfies a predetermined condition.

According to the present invention, it is possible to obtain the light receiving amount of a light receiving section at each exposure time, which is changed stepwise, to determine whether each pixel constituting height image data is valid or invalid based on the obtained light receiving amount, and to set an exposure time, which corresponds to a height image in which the number of pixels determined to be valid satisfies a predetermined condition, as a set value. Therefore, it is possible to automatically set the appropriate range of the exposure time.

BRIEF DESCRIPTION OF THE DRAWINGS

FIG. 7 is a flowchart illustrating the procedure of a robot simulation;

FIG. 31 is a view illustrating a two-dimensional display case and a three-dimensional display case of superimposed results of a three-dimensional search (a position of each characteristic point of a search model);

FIG. 35 is a table illustrating a list of results of a picking operation simulation in the order of holding registration numbers;

FIG. 36 is a table illustrating a list of results of a picking operation simulation in descending order of the number of times;

FIG. 37 is a table illustrating a list of results of a picking operation simulation for each shape of a hand portion;

DESCRIPTION OF EMBODIMENTS

Hereinafter, exemplary embodiments of the present invention will be described in detail with reference to the drawings. In addition, the following description of exemplary embodiments is merely given by way of example and is not intended to limit the present invention, the application thereof, or the use thereof.

Figure 1:
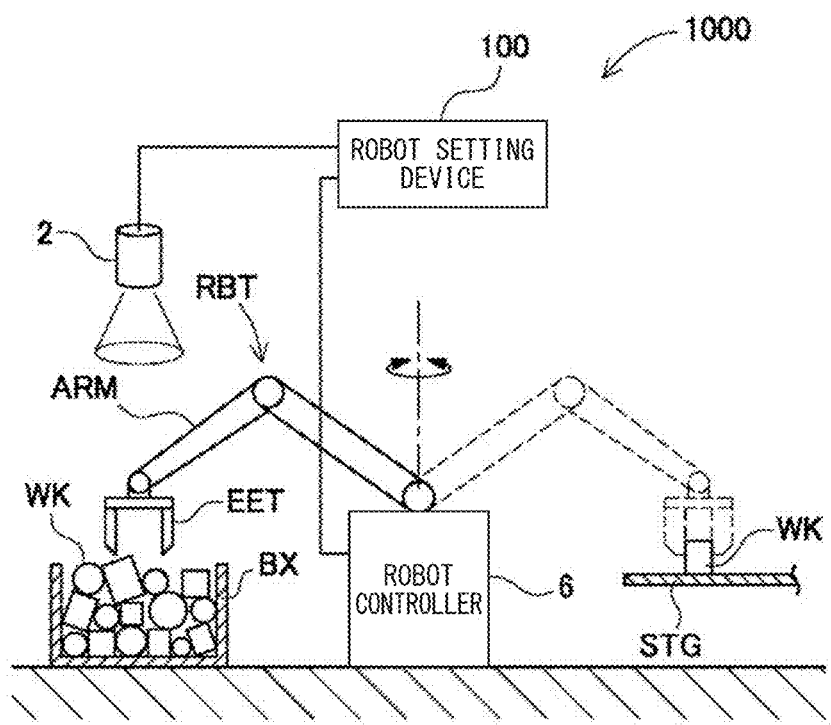
FIG. 1 is a schematic view illustrating a scene in which a bin picking operation is used using a robot system.

FIG. 1 is a schematic view illustrating a configuration example of a robot system 1000 according to an exemplary embodiment of the present invention. FIG. 1 illustrates an example of performing bin picking, by which a plurality of workpieces WK, which are stacked in a work space existing in manufacturing factories of various products or the like, are sequentially extracted using a robot RBT and are conveyed to a stage STG, which is provided at a predetermined place, and are loaded on the corresponding stage STG.

The robot system 1000 includes the robot RBT and a robot controller 6, which controls the robot RBT. The robot RBT is a general-purpose industrial robot, and a base portion thereof is fixed with respect to the floor surface of, for example, a factory. The robot RBT is also called, for example, a manipulator, and is configured to enable six-axes control. The robot RBT includes an arm portion ARM, which extends from the base portion, and an end effector EET, which is provided on the tip end portion of the arm portion ARM. The arm portion ARM may be configured in an articulated form to have a plurality of joint portions as movable portions. The end effector EET may be moved to a desired position within a movable range by the operation of each joint portion of the arm portion ARM and the rotational operation of the arm portion ARM.

Figure 5A:
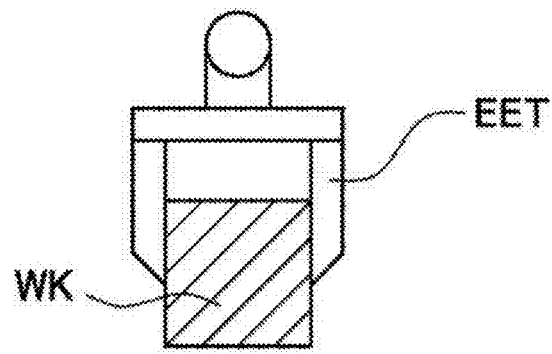
FIG. 5A is a schematic view illustrating an example of holding a workpiece by an end effector.
Figure 5B:
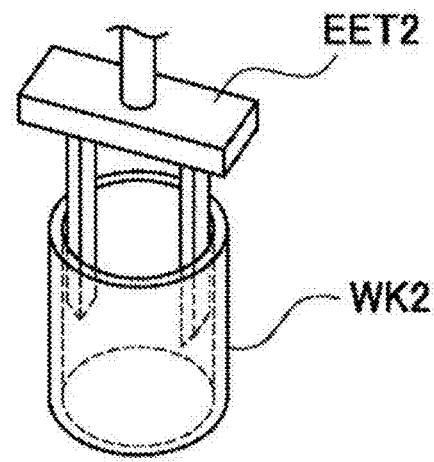
FIG. 5B is a schematic view illustrating an example of holding a workpiece having a cavity from an inner surface thereof.
Figure 5C:
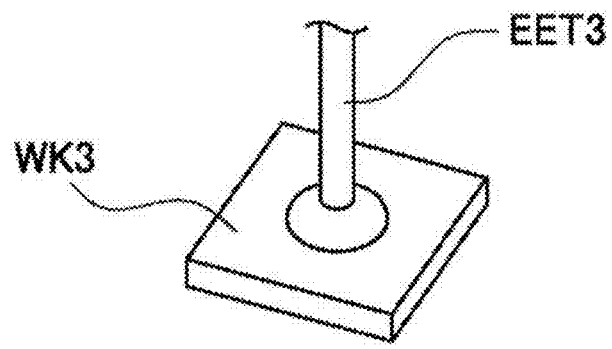
FIG. 5C is a schematic view illustrating an example of suctioning and holding a workpiece having a plate shape.

The end effector EET may be configured as, for example, a hand portion, which holds the workpiece WK. The end effector EFT may be, for example, an end effector EET1, which has a structure of holding the outer side of the workpiece WK by being fitted thereto as illustrated in FIG. 5A, an end effector EET2, which has a structure of inserting a claw portion thereof into a workpiece WK2 having a cavity portion and enlarging and opening the cavity portion so as to retain the workpiece WK2 as illustrated in FIG. 5B, or an end effector EET3, which suctions and retains a workpiece WK3 having a plate shape as illustrated in FIG. 5C, or may also use any other end effector. In addition, in this specification, the term "holding" is used as a meaning including all examples such as the method of fitting the outer side of the workpiece WK illustrated in FIG. 5A, a method of inserting the claw portion into the cavity portion so as to enlarge and open the cavity portion, and a suctioning method.

The robot RBT is controlled by the robot controller 6. The robot controller 6 controls an operation of the arm portion ARM, an opening and closing operation of the end effector EET, or the like. In addition, the robot controller 6 acquires information required to control the robot RBT from a robot setting device 100 illustrated in FIG. 2. For example, the three-dimensional shape of the workpieces WK, which are a large number of components randomly put into a storage container BX illustrated in FIG. 1, is acquired using a sensor section 2 such as, a three-dimensional camera or a lighting, the positions or postures of the workpieces WK are detected by the robot setting device 100, and the robot controller 6 acquires the information.

Figure 2:
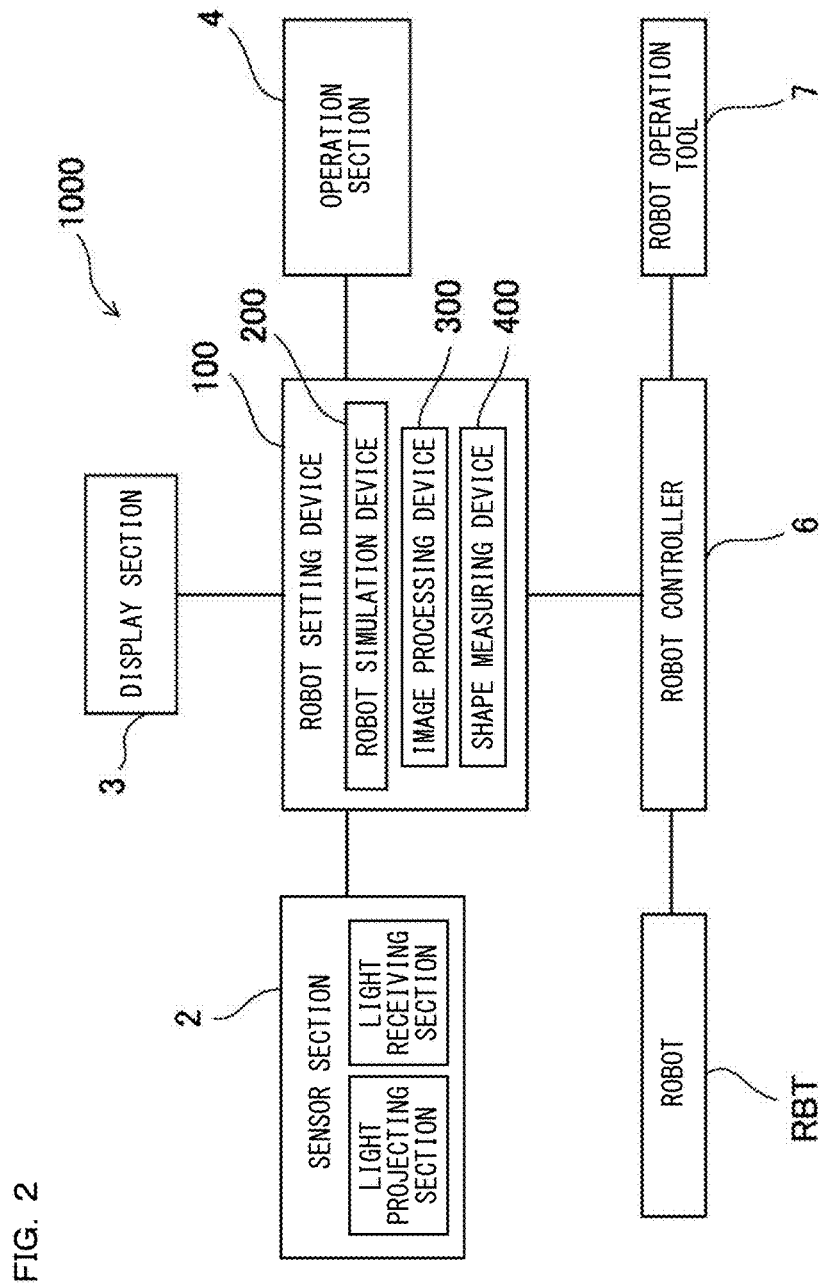
FIG. 2 is a block diagram illustrating a schematic configuration of the robot system.

A functional block diagram of the robot system 1000 is illustrated in FIG. 2. The robot system 1000 illustrated in FIG. 2 includes the robot setting device 100, the sensor section 2, a display section 3, an operation section 4, and a robot operation tool 7, in addition to the robot RBT and the robot controller 6.

The operation section 4 performs various settings related to a physical simulation, a picking operation simulation, and an image processing, which will be described later. In addition, the sensor section 2 acquires the three-dimensional shape of the workpiece WK by capturing an image of the workpiece WK. In addition, the display section 3 performs confirmation of setting or an operation state, confirmation of a simulation, or the like. In addition, a robot simulation device 200 or an image processing device 300, which is provided inside the robot setting device 100, performs various simulations, a three-dimensional search, interference determination, holding solution calculation, etc.

Meanwhile, the robot controller 6 is a well-known member configured to perform the control of the robot RBT in response to a signal output from the robot setting device 100. In addition, the robot operation tool 7 performs operation setting of the robot RBT. In addition, in the example of FIG. 2, the operation section 4 and the robot operation tool 7 are separate members, but may be a common member.

The sensor section 2 is a member, which is called a robot vision or the like, and captures an image of a work space or the workpiece WK. In this exemplary embodiment, the workpiece WK becomes at least an imaging object. Three-dimensional shape data, which indicates the three-dimensional shape of the workpieces WK loaded in bulk, may be acquired from the image captured by the sensor section 2. In addition, a method of acquiring the three-dimensional shape includes, for example, a pattern projection method, a stereo method, a lens focus method, a light sectioning method, an optical radar method, an interference method (white interference method), a TOF method, etc. and may use any method among these methods. Each method is well known in the related art, and thus, a detailed description thereof will be omitted. In the present exemplary embodiment, among the pattern projection method, a phase shift method of irradiating an imaging object with patterned light having a periodic illuminance distribution and receiving light reflected from the surface of the imaging object is used.

Figure 4:
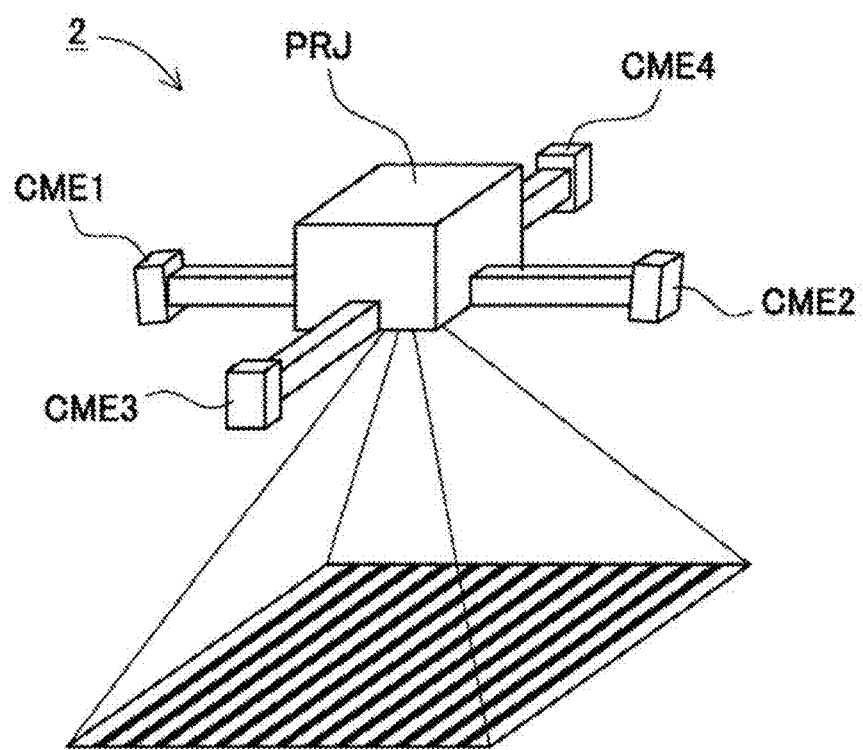
FIG. 4 is a perspective view illustrating an example of a sensor section.

The sensor section 2 is also one constituent element of a shape measuring device 400, which measures the shape of the workpiece WK, which is a measuring object. The shape measuring device 400 may be a part of the robot setting device 100, but may also be configured as a separate member. A specific configuration of the sensor section 2 is determined according to the measurement technique of a three-dimensional shape. The sensor section 2 includes a camera, a lighting, a projector, etc. For example, in the case of measuring the three-dimensional shape of the workpiece WK by the phase shift method, as illustrated in FIG. 4, the sensor section 2 includes a projector (a light projecting section) PRJ and a plurality of cameras (a light receiving section) CME1, CME2, CME3 and CME4. The projector PRJ is a member, which irradiates the workpiece WK with light. The cameras CME1, CME2, CME3 and CME4 are members each having an imaging element, which receives light that has been projected by the projector PRJ and reflected from the surface of the workpiece WK. A light source of the light projecting section may be configured with, for example, a plurality of light emitting diodes, a liquid crystal panel, an organic EL panel, or a digital micromirror device (DMD).

In addition, instead of being formed of a plurality of members, such as the cameras CME1, CME2, CME3 and CME4 and the projector PRJ, the sensor section 2 may have an integrated configuration thereof. For example, the sensor section 2 may be a 3D imaging head in which the cameras CME1, CME2, CME3 and CME4 and the projector PRJ are integrated into a head shape.

In addition, the generation of three-dimensional shape data may be performed by the sensor section 2. In this case, the sensor section 2 is provided with, for example, an image processing IC, which implements a function of generating three-dimensional shape data. Alternatively, there may be a configuration in which the generation of three-dimensional shape data is not performed on the image processing device 300 side and a raw image captured by the sensor section 2 is image-processed on the image processing device 300 side so as to generate three-dimensional shape data such as a three-dimensional image.

In addition, by executing calibration based on an image captured by the sensor section 2, the position coordinates of an actual workpiece WK (the coordinates of the movement position of the end effector EET) and the position coordinates of an image displayed on the display section 3 may be linked to each other.

The robot setting device 100 performs a three-dimensional search, interference determination, holding solution calculation, etc. based on the three-dimensional shape data of the workpiece WK obtained by the sensor section 2. The robot setting device 100 may be configured as a general-purpose computer having a dedicated image processing program installed therein, a dedicated image processing controller, or dedicated hardware. In addition, the robot setting device 100 may adopt a configuration in which an image processing program is installed in a dedicated computer, which specializes hardware such as a graphic board for an image inspection processing.

In addition, in the example of FIG. 2, the sensor section 2, the robot controller 6, or the like is configured as a member separate from the robot setting device 100, but the present invention is not limited to this configuration. For example, the sensor section 2 and the image processing device 300 may be integrated, or the robot controller 6 may be inserted into the robot setting device 100. In this manner, the division of the members illustrated in FIG. 2 is merely given by way of example, and a plurality of members may also be integrated. For example, the operation section 4, which operates the robot setting device 100, and the robot operation tool 7, which operates the robot controller 6, may be a common member.

However, the sensor section 2 is a member separate from the robot RBT. That is, the present invention is directed to a form, which is called an off-hand type in which the sensor section 2 is not provided on the arm portion ARM of a robot body 5. In other words, a mode which is called an on-hand type in which the sensor section 2 is provided on the end effector EET, is not included in the present invention.

The display section 3 is a member for displaying the three-dimensional shape of the workpiece WK acquired by the robot setting device 100, displaying various simulation images, or performing confirmation of various settings or operation states. The display section may use, for example, a liquid crystal monitor, an organic EL display, or a CRT. The operation section 4 is a member for performing various settings such as various simulations or image processings. The operation section 4 may use an input device such as a keyboard or a mouse. In addition, when the display section 3 is a touch panel, the operation section 4 and the display section 3 may be integrated with each other.

For example, when the robot setting device 100 is configured as a computer having an image processing program installed therein, a graphical user interface (GUI) screen of the image processing program is displayed on the display section 3. Various settings may be performed on the GUI displayed on the display section 3, and processing results such as simulation results may also be displayed thereon. In this case, the display section 3 may be used as a setting section for performing various settings.

The robot controller 6 controls an operation of the robot based on information captured by the sensor section 2. In addition, the robot operation tool 7 is a member for performing operation setting of the robot RBT, and may use, for example, a pendant.

As illustrated in FIG. 1, a plurality of workpieces WK are randomly stored in the storage container BX. The sensor section 2 is disposed above such a work space. Based on the three-dimensional shape of the workpiece WK obtained by the sensor section 2, the robot controller 6 specifies the workpiece WK, which is a held object, among the plurality of workpieces WK, and controls the robot RBT so as to hold the workpiece WK. Then, the robot controller 6 operates the arm portion ARM in a state where the arm portion holds the workpiece WK so as to move the same to a predetermined placement position, for example, onto the stage STG and place the workpiece WK in a predetermined posture. In other words, the robot controller 6 controls an operation of the robot RBT so as to hold the workpiece WK, which is a picking object specified by the sensor section 2 and the robot setting device 100, by the end effector EET, load the held workpiece WK in a predetermined reference posture on a placement place (the stage STG), and open the end effector EET. The stage STG may be, for example, a conveyor belt or a pallet.

Figure 6A:
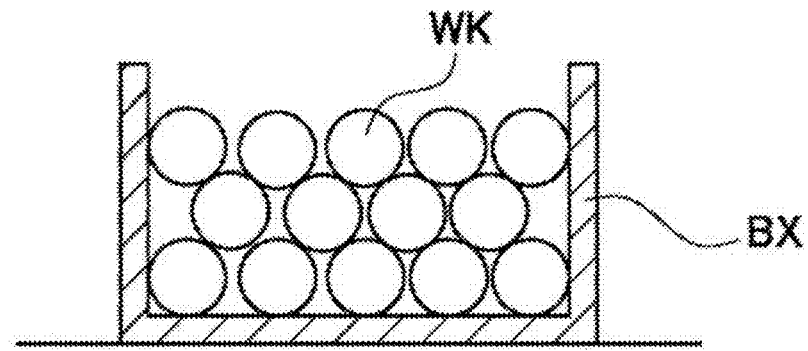
FIG. 6A is a schematic cross-sectional view illustrating an example in which workpieces are randomly put into and stacked in a storage container.
Figure 6B:
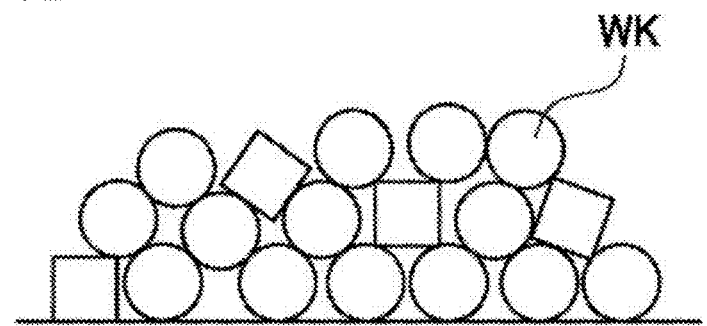
FIG. 6B is a schematic cross-sectional view illustrating an example in which workpieces are stacked on a floor surface.
Figure 6C:
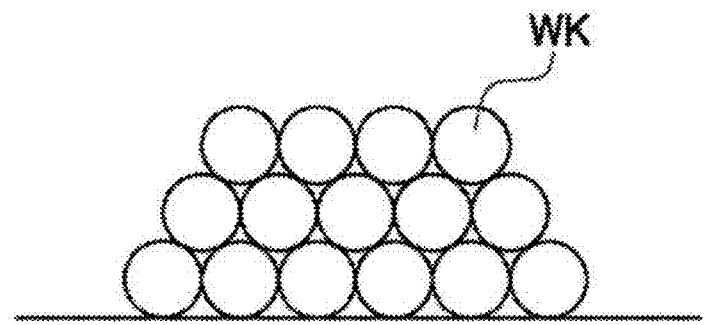
FIG. 6C is a schematic cross-sectional view illustrating a state where workpieces are arranged on a tray in a predetermined posture.

Here, the term "bin picking" in this specification is used as a meaning including an example of holding the workpieces WK, which are introduced into and randomly stacked in the storage container BX, by the robot RBT and loading the workpieces WK at a predetermined position as illustrated in FIG. 6A, an example of holding and loading the workpieces WK, which are stacked on a predetermined area without using a storage container, as illustrated in FIG. 6B, or an example of sequentially holding and loading the workpieces WK, which are arranged and stacked in a predetermined posture, as illustrated in FIG. 6C. In addition, the workpieces WK, which are not necessary to be in a superimposed and stacked state, but are randomly loaded on the plane without overlapping each other, are also called "bulk" in this specification (this is the same reason as why a case where the workpieces WK are sequentially picked up and there are no workpieces WK in an overlapped state at the end of picking is still called "bin picking"). In addition, the present invention is not necessarily limited to bin picking, but may also be applied to applications in which workpieces WK, which are not loaded in bulk, are picked up.

In addition, in the example of FIG. 1, the sensor section 2 is fixed above the work space, but the fixed position of the sensor section 2 may be any position as long as the sensor section 2 is able to capture an image of the work space. For example, the sensor section 2 may be disposed at an arbitrary position such as an upwardly inclined position, a lateral position, or a downwardly inclined position of the work space. However, a mode in which the sensor section 2 is disposed at a movable indefinite position, such as a position on the arm portion ARM is excluded. In addition, the number of cameras and lightings provided in the sensor section 2 is not limited to one, but may be plural. In addition, the connection between the sensor section 2, the robot RBT, and the robot controller 6 is not limited to wired connection, but may be well-known wireless connection.

When performing a bin picking operation in the robot system 1000, teaching including setting for causing the robot system 1000 to perform the bin picking operation may be performed in advance. Specifically, which portion of the workpiece WK is to be held by the end effector EET in what posture, i.e. the holding position and posture are registered.

Such setting may be performed by the robot operation tool 7 such as a pendant. In addition, as will be described later, setting may be performed in the vision space without operating the actual robot.

The display section 3 displays each of a workpiece model, which virtually shows the three-dimensional shape of the workpiece WK, and an end effector model, which virtually shows the three-dimensional shape of the end effector EET and is configured by three-dimensional CAD data, in a three-dimensional shape in a virtual three-dimensional space. In addition, the display section 3 may display a basic directional image of the workpiece model as a six-sided view. Thus, a setting operation of a holding position can be performed by displaying each posture of the workpiece model in a six-sided view, and thus a conventional troublesome setting operation of a holding position can be easily performed.

(Robot Simulation)

The robot system 1000 includes the robot simulation device 200 for simulating a bin picking operation of sequentially extracting a plurality of workpieces WK stacked in a work space by the robot RBT. The robot simulation device 200 may be integrated with the image processing device 300, and may be provided inside the robot setting device 100 together with the image processing device 300. The image processing device 300 is a device used for the control of the robot RBT, which performs a picking operation of holding and sequentially extracting a plurality of workpieces WK stacked in a work space.

Figure 3:
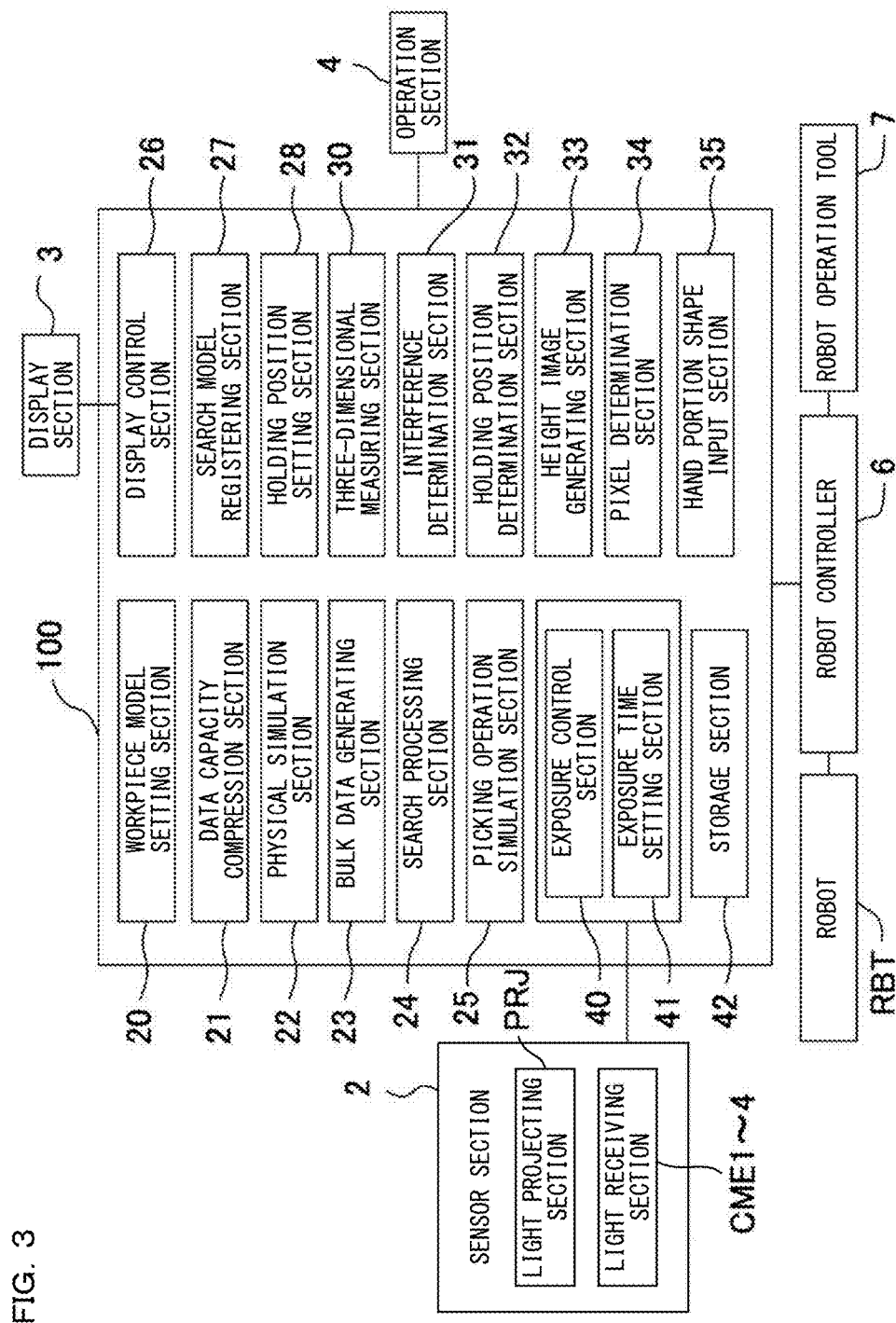
FIG. 3 is a block diagram illustrating a detailed configuration of the robot system.

As illustrated in FIG. 3, the robot setting device 100 includes a workpiece model setting section 20, a data capacity compression section 21, a physical simulation section 22, a bulk data generating section 23, a search processing section 24, a picking operation simulation section 25, a display control section 26, a search model registering section 27, a holding position setting section 28, a three-dimensional measuring section 30, an interference determination section 31, a holding position determination section 32, a height image generating section 33, a pixel determination section 34, a hand portion shape input section 35, an exposure control section 40, and an exposure time setting section 41. The respective sections may constitute the robot simulation device 200 or the image processing device 300, and may be configured by hardware or software. In addition, all of the respective sections may be integrated into a single device, or some sections may be separate from other sections so that the robot setting device 100 is composed of a plurality of devices. In addition, the respective sections may be implemented by hardware or software such as a microprocessor (MPU), CPU, a gate array such as CPU, LSI, FPGA or ASIC, hardware or software such as DSP, or mixtures thereof. In addition, each constituent element is not necessarily the same as the configuration illustrated in, for example, FIG. 3, and a case where one having substantially the same function or one element has the functions of a plurality of elements in the configuration illustrated in FIG. 3 is included in the present invention.

For example, the exposure control section 40 and the exposure time setting section 41 may be provided in the sensor section 2. In addition, the display control section 26 may be provided in the display section 3. In addition, the robot setting device 100 is also provided with a storage section 42 for storing various kinds of information. The storage section 42 may be configured with, for example, a semiconductor memory or a hard disk. In addition, the storage section 42 may be provided with a reading device, which is capable of reading out information stored in any of various storage media such as CD-ROM or DVD-ROM.

The robot simulation device 200 is configured to perform a three-dimensional simulation of a holding operation or a placement operation of the robot RBT before operation of the robot system 1000, that is, before an operation of holding and loading the workpieces WK in an actual work site is performed. In the robot simulation, a physical simulation, which generates a bulk state where a plurality of workpiece models are randomly stacked, and a picking operation simulation, which detects the position and posture of a workpiece model using data of the bulk state generated by the physical simulation and executes a simulation of a picking operation by the robot RBT, are performed. Hereinafter, the robot simulation device 200 and a robot simulation method implemented by the robot simulation device 200 will be described in detail based on a robot simulation flowchart illustrated in FIG. 7.

When starting a robot simulation, after the robot simulation flowchart illustrated in FIG. 7 starts, an environment (simulation environment) in which the simulation is executed is set in step SA1. The setting of the simulation environment may include, for example, the number of workpieces to be loaded in bulk, information on the storage container BX, information on the floor, and information on the design of the camera CME or the projector PRJ constituting the sensor section 2. In addition, upon a picking operation simulation, random positional deviation may occur in actual operation with respect to the storage container BX, and, for example, the range of positional deviation at this time may be included in the setting of the simulation environment.

Figure 8:
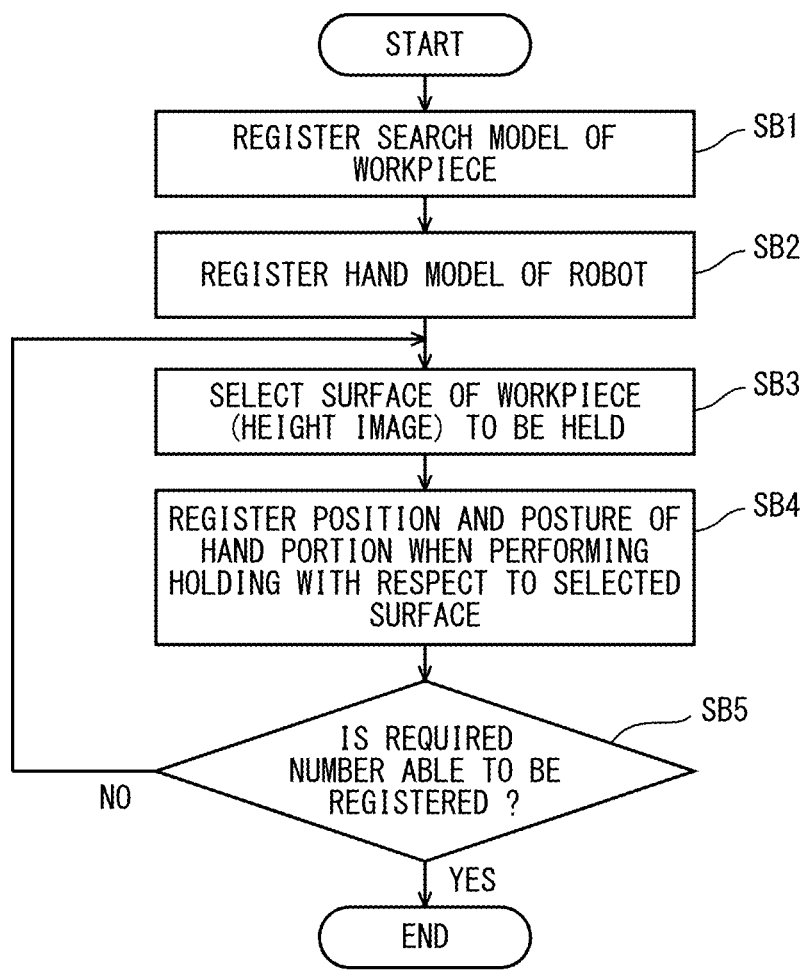
FIG. 8 is a flowchart illustrating the setting procedure of a simulation environment.

The major setting procedure of the simulation environment is illustrated in a simulation environment setting procedure flowchart of FIG. 8. After the simulation environment setting procedure flowchart starts, a search model of the workpiece WK is registered in step SB1. In the subsequent step SB2, a hand model of the robot RBT is registered. The search model of the workpiece WK in step SB1 is a model, which shows the shape of the workpiece WK used when executing a search processing to be described later. The hand model of the robot RBT in step SB2 is a model, which shows the shape of the hand portion (the end effector EET). Steps SB1 and SB2 may be interchanged in order. In addition, a container model, which models the storage container BX in which workpieces are stored, such as a delivery box, may be set.

Figure 9:
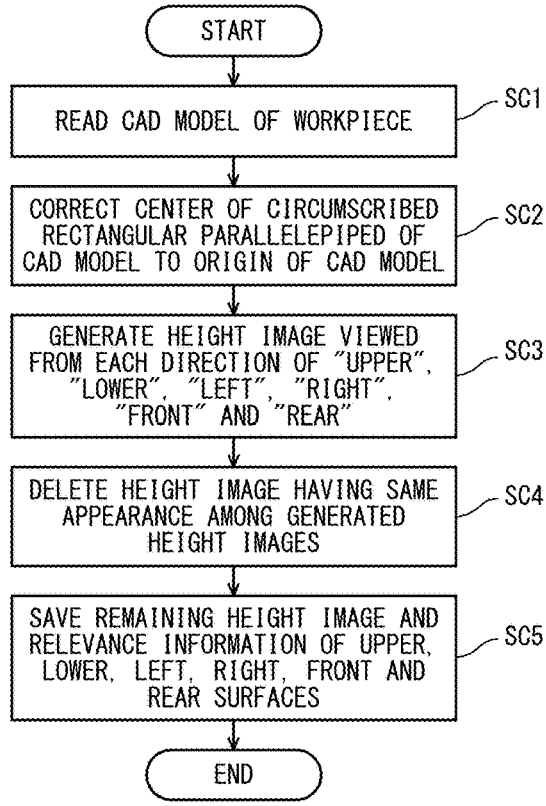
FIG. 9 is a flowchart illustrating the registration procedure of a search model when CAD data of a workpiece exists.
Figure 10:
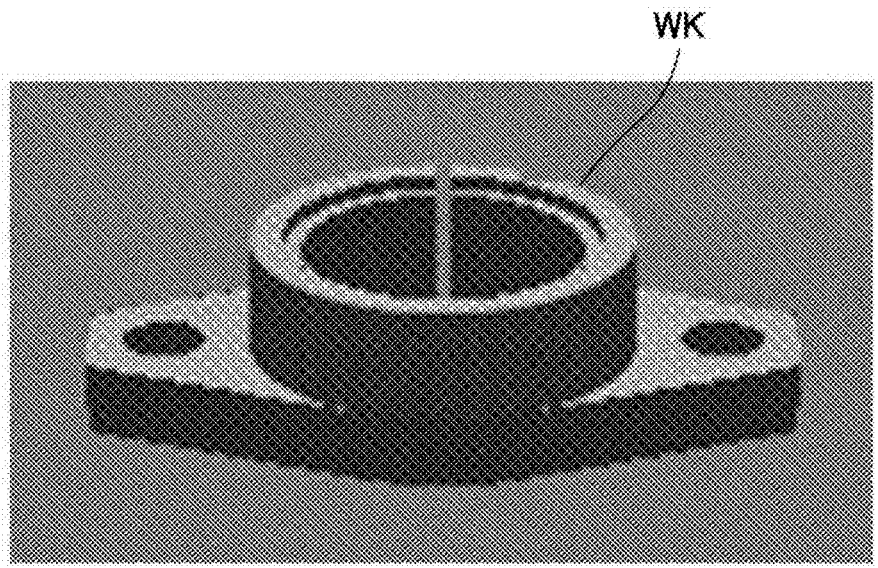
FIG. 10 is a perspective view illustrating a workpiece model based on three-dimensional CAD data.

The gist of registering the search model of the workpiece WK in step SB1 is as illustrated in a search model registration flowchart of FIG. 9. In the search model registration flowchart of FIG. 9, after the flowchart starts, three-dimensional CAD data (CAD model) of the workpiece WK is read out and temporarily stored in the storage section 42 included in the robot simulation device 200 in step SC1. An example of a workpiece model based on three-dimensional CAD data is illustrated in FIG. 10. The CAD data is data of the workpiece model, and may use data of a format, which has generally been used in the related art.

In this exemplary embodiment, the simplest STL form is used as the format of the CAD data. The STL form is data composed only of the enumeration of triangular polygon information (the coordinates of three points and the normal vector of the plane thereof). Alternatively, the workpiece model may be composed of point cloud data having three-dimensional information. Alternatively, the workpiece model may be composed of image data having height information, for example, a height image or a distance image.

Step SC1 is a workpiece model setting step of setting a workpiece model, which models the three-dimensional shape of the workpiece, and is performed by the workpiece model setting section 20 included in the robot setting device 100 illustrated in FIG. 3. The number of polygons of the CAD data read in step SC1 may be several thousands to several tens of thousands.

In step SC2 subsequent to step SC1, an origin correction processing of defining a circumscribed rectangular parallelepiped of the CAD model and correcting the center of the circumscribed rectangular parallelepiped to the origin of the CAD model is performed. The origin of the workpiece model is automatically determined by the robot setting device 100 from the coordinate information included in the three-dimensional CAD data. For example, with respect to the three-dimensional CAD data of the workpiece model, a virtual rectangular parallelepiped circumscribing the workpiece model may be defined, and the center of gravity of the virtual rectangular parallelepiped may be set to the origin of the workpiece model.

Thereafter, the processing proceeds to step SC3 in which height image data, which views the six surfaces of the CAD model read in step SC1, i.e. views the CAD model from each direction of "upper", "lower", "left", "right", "front", and "rear", is generated. That is, data of six height images is generated to be a plan view, a bottom view, a left side view, a right side view, a front view, and a rear view of the CAD model. Height images are obtained from this height image data. "Upper" represents a height image viewed from the plus direction (plus side) of the Z axis, "lower" represents a height image viewed from the minus direction (minus side) of the Z axis, "left" represents a height image viewed from the minus direction of the X axis, "right" represents a height image viewed from the plus direction of the X axis, "front" represents a height image viewed from the minus direction of the Y axis, and "rear" represents a height image viewed from the plus direction of the Y axis, respectively. However, these are merely given by way of example, and different coordinate systems may be used, or based on the coordinate system orthogonal to the axis, which is the straight line X=Y in the X-Y plane, height images viewed from the plus and minus directions of the respective axes may be used. In addition, when generating height images from three-dimensional CAD data, the height images may not be necessarily height images viewed from directions ("upper", "lower", "left", "right", "front", and "rear") orthogonal to the axes of the CAD data, and, for example, the posture (viewpoint) of the workpiece model may be arbitrarily changed and height images may be generated from the changed viewpoint.

Figure 11:
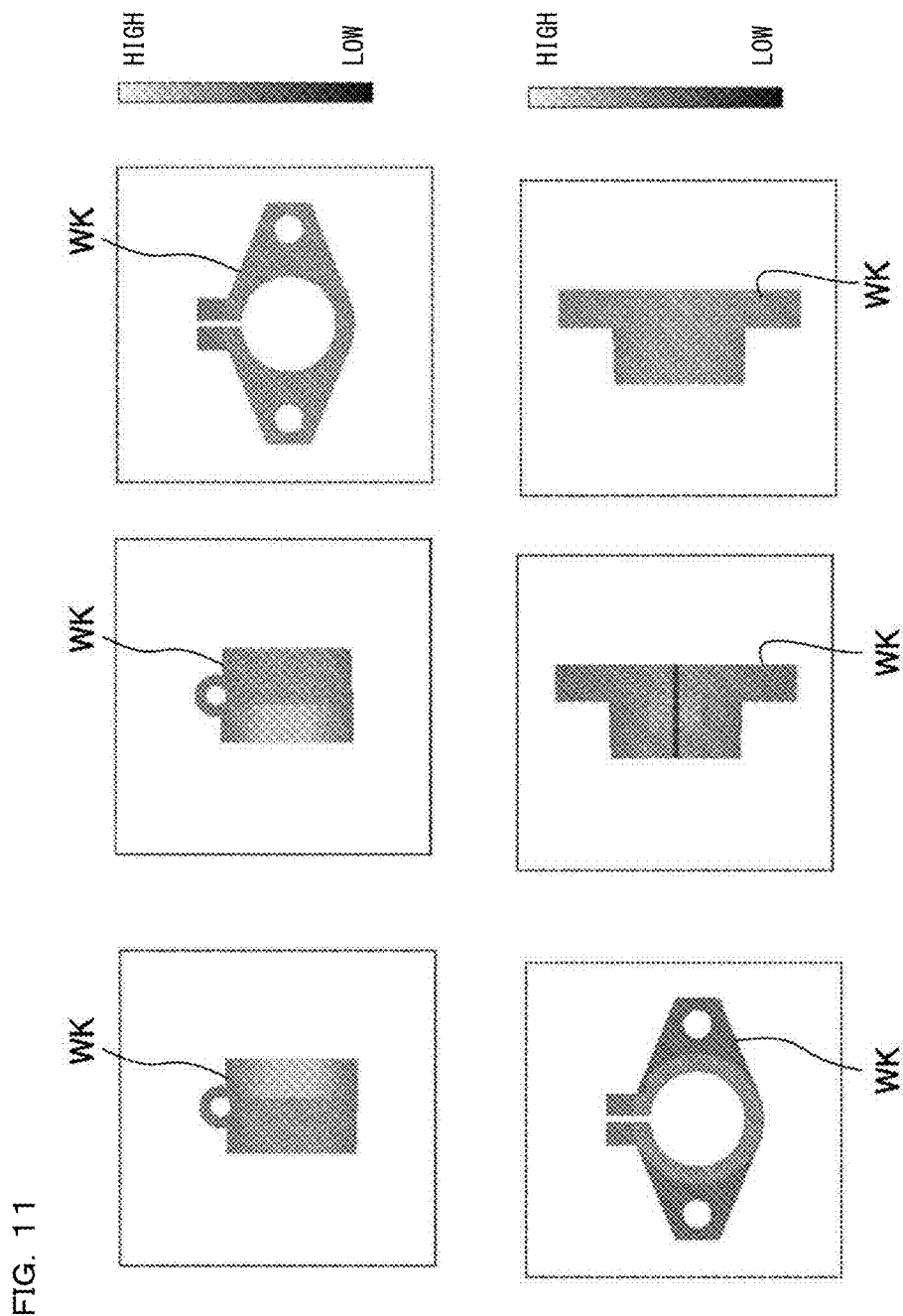
FIG. 11 is a view illustrating height images of the workpiece model illustrated in FIG. 10.

In this step SC3, since the CAD model is composed of the three-dimensional CAD data, height images with respect to six surfaces of the CAD model may be obtained by converting the three-dimensional CAD data into height images of the CAD model viewed respectively in the plus direction and the minus direction with respect to each of the X, Y, and Z coordinates. FIG. 11 illustrates height images of the workpiece model illustrated in FIG. 10 viewed from each of the upper, lower, left, right, front and rear directions. In FIG. 10, display is made so that the model becomes higher as it becomes white (the color thereof becomes brighter).

In step SC4 subsequent to step SC3, among the six height images generated in step SC3, height images, which have the same appearance, are deleted. The matching/mismatching of the appearance may be determined by generating height images of a total of the six surfaces viewed from the upper and lower of the workpiece (the plus and minus directions of the Z axis), the front and rear (the plus and minus directions of the Y axis), and the left and right (the plus and minus directions of the X axis) based on the height image data and checking whether or not some of the height images match each other. Here, whether or not the height images match each other is checked by rotating the height images at a pitch angle of 90°, and the surface, the appearance of which matches that of another surface, is excluded from a registration object of the search model. Such exclusion may be performed manually by the user, may be performed automatically on the robot simulation device 200 or the image processing device 300 side, or may be performed by a combination thereof.

Describing a concrete example, for example, when the workpiece WK is a rectangular parallelepiped, a height image viewed from the upper of the CAD model is the same as a height image viewed from the lower of the CAD model, and in this case, either one is deleted. Since a height image viewed from the left of the CAD model and a height image viewed from the right of the CAD model are the same, either one is deleted. In addition, since a height image viewed from the front of the CAD model and a height image viewed from the rear of the CAD model are the same, either one is deleted. Thus, since the number of search models may be reduced, the speed of each processing to be described later may be increased. Even if the workpiece WK has a complicated shape, a height image viewed from one direction may be the same as a height image viewed from another direction, and in this case, one of the height images may also be deleted. When the workpiece WK is a cube, five surfaces among six surfaces may be deleted.

Figure 12:
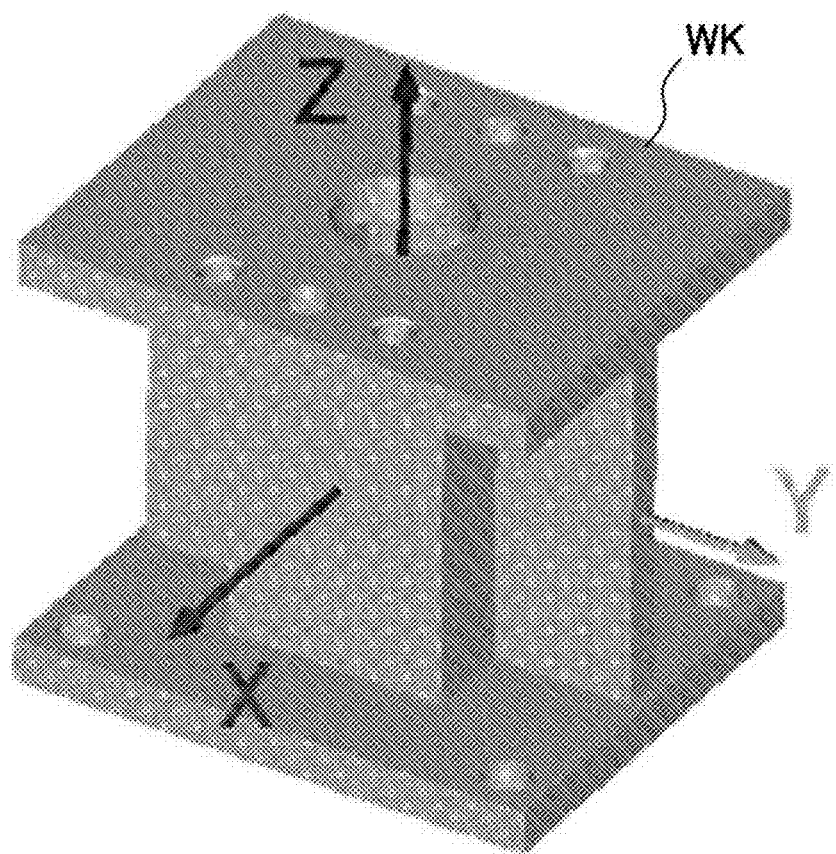
FIG. 12 is a perspective view illustrating another workpiece model based on three-dimensional CAD data.
Figure 13:
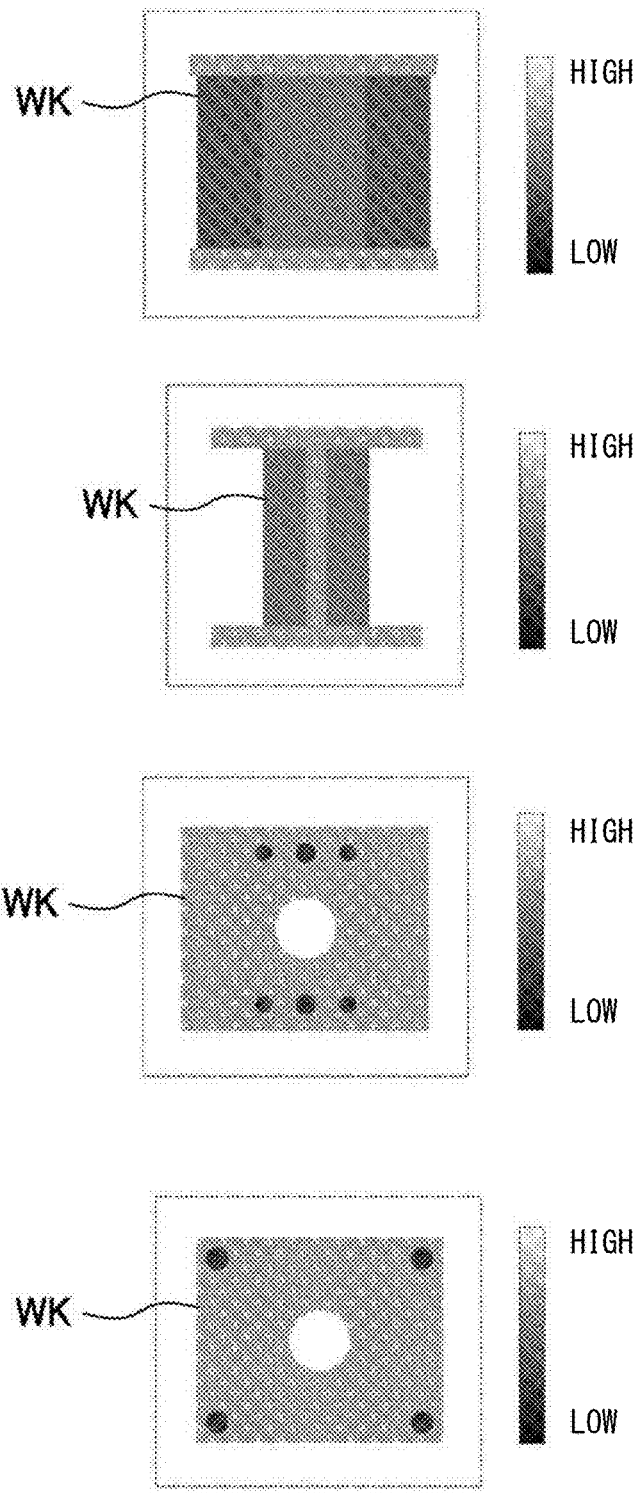
FIG. 13 is a view illustrating height images of the workpiece model illustrated in FIG. 12.

In addition, for example, when a workpiece model having a three-dimensional shape as illustrated in FIG. 12 is read in step SC1, as illustrated in FIG. 13, height images of the workpiece model viewed from the respective directions may be obtained. In a case of the workpiece model illustrated in FIG. 12, since a height image viewed from the plus direction of the X axis and a height image viewed from the minus direction of the X axis are the same, either one is omitted in step SC4. In addition, since a height image viewed from the plus direction of the Y axis and a height image viewed from the minus direction of the Y axis are the same, either one is omitted in step SC4. Therefore, as illustrated in FIG. 13, there are four height images after step SC4 has passed.

Thereafter, the processing proceeds to step SC5 and the height image data remaining in step SC4 is saved. Information, which indicates that the height image data to be saved is an image viewed from any one direction of the upper, lower, left, right, front and rear of the CAD model, that is, information on the direction, is given to the corresponding height image data, and the information on the direction and the height image data are saved in the storage section 42 of the robot simulation device 200 in association with each other. Thus, since the respective height image data may be saved in a state of having information on the relevance to respective upper, lower, left, right, front and rear surfaces, a plurality of pieces of height image data of one workpiece model viewed from different directions may be registered in the robot simulation device 200 or the image processing device 300 in association with each other.

Therefore, when the height image data is read out from the storage section 42, for example, height images viewed from six directions of the CAD model may be obtained in association with each other. As described above, a plurality of pieces of height image data of a workpiece model viewed from different directions may be registered as search models. The search models may be models used in a search processing of detecting the position and posture of the workpieces WK stacked in the work space, and a plurality of types of search models may be registered.

Figure 14:
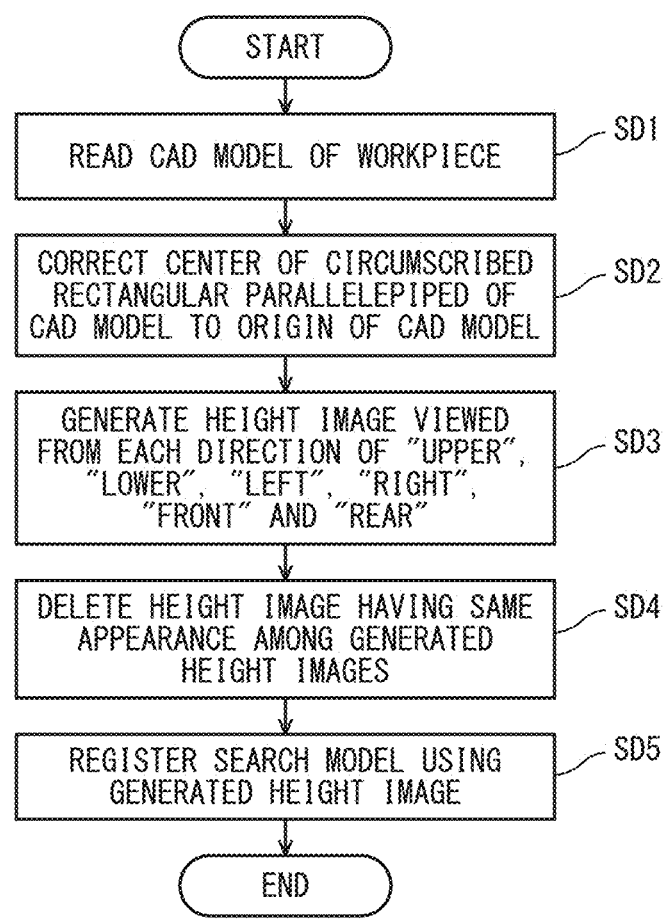
FIG. 14 is a flowchart illustrating another example of the registration procedure of a search model when CAD data of a workpiece exists.

In the search model registration flowchart illustrated in FIG. 9, information on the relevance to the respective surfaces is saved in step SC5, but the present invention is not limited thereto. For example, as illustrated in a search model registration flowchart illustrated in FIG. 14, steps SD1 to SD4 are the same as steps SC1 to SC4 of the flowchart illustrated in FIG. 9, but, in step SD5, information on the relevance to the respective surfaces may not be saved and only height image data may be saved.

Figure 15:
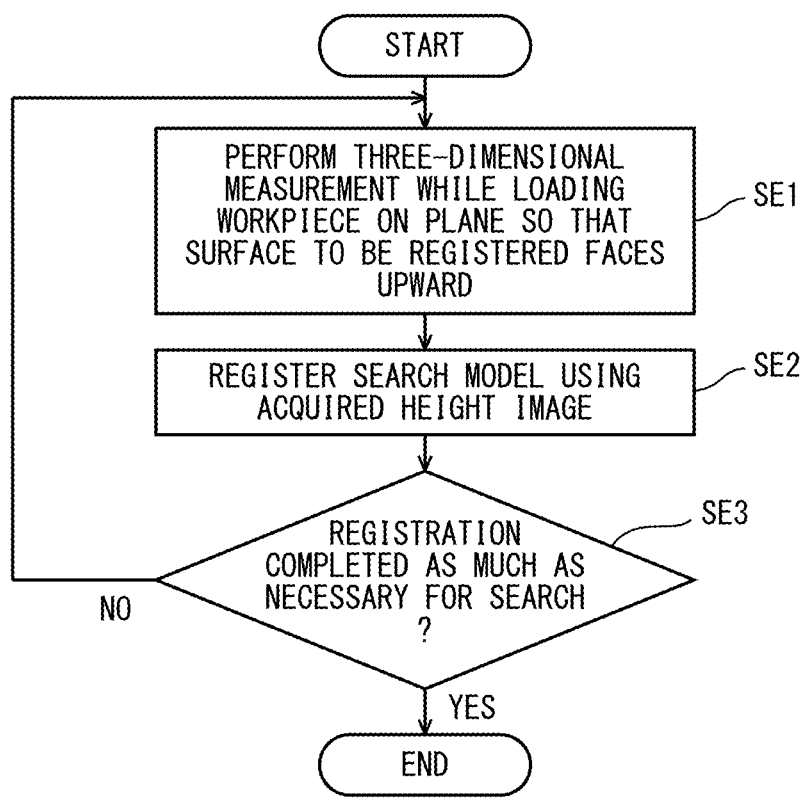
FIG. 15 is a flowchart illustrating an example of the registration procedure of a search model when no CAD data of a workpiece exists.
Figure 16:
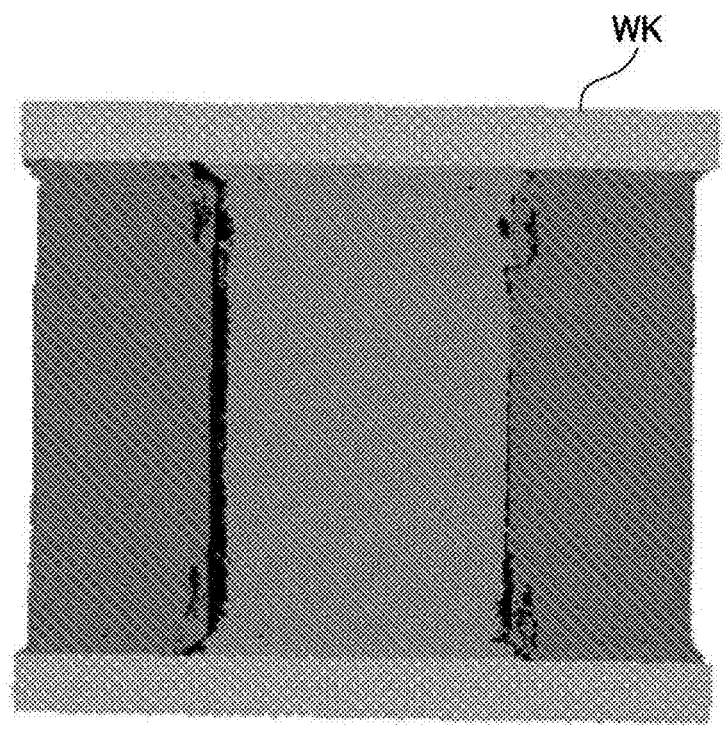
FIG. 16 is a view illustrating a height image of a workpiece model when no CAD data exists.

The search model registration flowchart illustrated in FIG. 9 is the gist in a case where CAD data of the workpiece WK exists. However, when there is no CAD data of the workpiece WK, according to a flowchart of FIG. 15 illustrating an example of the registration procedure of search models in a case where there is no CAD data of the workpiece WK, a plurality of pieces of height image data of a workpiece model viewed from different directions may be registered as search models. After the search model registration flowchart illustrated in FIG. 15 starts, in step SE1, three-dimensional measurement is performed while loading the workpiece WK on the plane such that a surface thereof to be registered faces upward. This three-dimensional measurement may be performed using the sensor section 2 and the three-dimensional measuring section 30 of the robot system 1000. Measurement data obtained by the three-dimensional measurement is output from the three-dimensional measuring section 30, and based on the measurement data, height image data of the surface of the workpiece WK to be registered may be obtained. An example of a height image obtained as described above is illustrated in FIG. 16.

In step SE2 subsequent to step SE1 of the flowchart illustrated in FIG. 15, the height image, which is obtained from the height image data obtained in step SE1, is registered as a search model. After registration, the processing proceeds to step SE3 and it is determined whether or not registration has been completed as much as necessary for a search. This determination may be performed by the user, but may be performed by the robot simulation device 200 or the image processing device 300. In other words, when all of the shapes of the workpiece WK viewed from the upper, lower, left, right, front and rear directions are different, step SE1 and step SE2 may be performed with respect to all of the six surfaces, but may not be performed with respect to all of the six surfaces in a case where there are surfaces having the same shape as in the above-described rectangular shape or the shape illustrated in FIG. 12. Once the registration has been completed as much as necessary for a search in step SE3, this flow ends.

As described above, a search model registration step of registering a plurality of pieces of height image data of a workpiece model viewed from different directions as search models may be performed. The search model registration step is performed by the search model registering section 27 included in the robot setting device 100 illustrated in FIG. 3.

Figure 17:
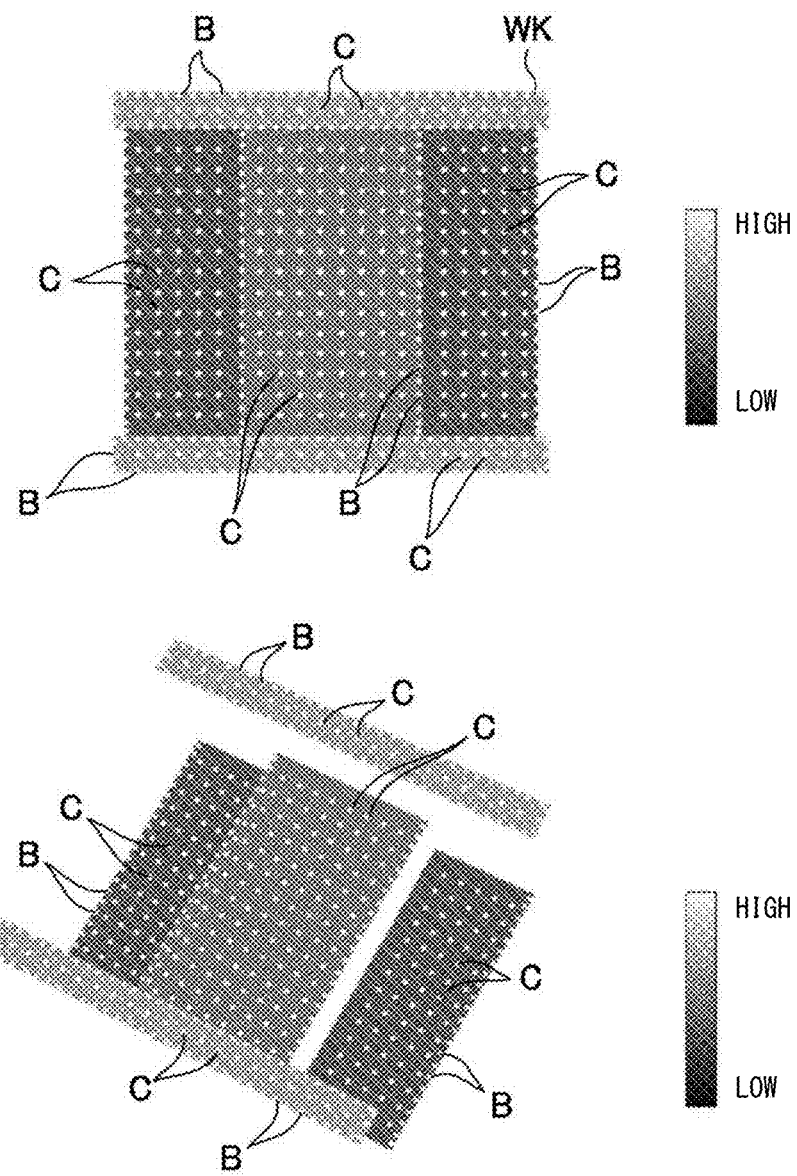
FIG. 17 is a view illustrating a height image on which characteristic points are disposed.

As illustrated in FIG. 17, characteristic points B and C may be disposed on a height image. The characteristic points B and C are points indicating the shape of a search model, and a plurality of characteristic points may be disposed in one height image. The characteristic points include outer-shape indicating points B, which are disposed along the peripheral edge portion of the search model, and surface-shape indicating points C, which are disposed in the surface of the search model. The outer-shape indicating points B are points indicating the outer shape of each surface constituting the search model, and are disposed at a predetermined interval on the outer contour line of the surface. The surface-shape indicating points C are disposed at a predetermined interval inside each surface constituting the search model, excluding the peripheral edge portion. By disposing the characteristic points, it is possible to grasp the approximate shape of the search model using the characteristic points, and the amount of data to be handled may be reduced. The outer-shape indicating points B and the surface-shape indicating points C may have different colors. The outer-shape indicating points B and the surface-shape indicating points C are displayed on the display section 3.

Next, the gist of registering the hand model of the robot RBT, which is performed in step SB2 of the simulation environment setting procedure flowchart illustrated in FIG. 8, will be described. The registration gist of the hand model of the robot RBT is illustrated in a hand model registration procedure flowchart of FIG. 18. After the flowchart starts, polygon data (CAD data) of the hand portion (equal to the end effector EET) is read out in step SF1. Step SF1 is a step in which the shape of the hand portion may be input by reading out the polygon data of the hand portion. Therefore, step SF1 is a hand portion shape input step of inputting the shape of the hand portion of the robot RBT, and this hand portion shape input step is performed by the hand portion shape input section 35 included in the robot setting device 100 illustrated in FIG. 3.

In step SF2 subsequent to step SF1, the direction in which the cross section of the hand portion is created is determined. Describing this step based on a hand model illustrated in FIG. 19, the axis A is set in the hand model. The axis A passes through the center portion of the hand model and also extends in the longitudinal direction of the hand model. The cross section in the direction orthogonal to the axis A is created. One cross section is not created, but a plurality of cross sections are created from the tip end to the base end of the hand model. This example illustrates a case where five cross-sections from cross section 1 to cross section 5 are created, but the number of created cross sections may be arbitrarily set. A position at which the cross section is created may be set to the vertex position of polygon data. The created cross section is illustrated in FIG. 20.

Figure 18:
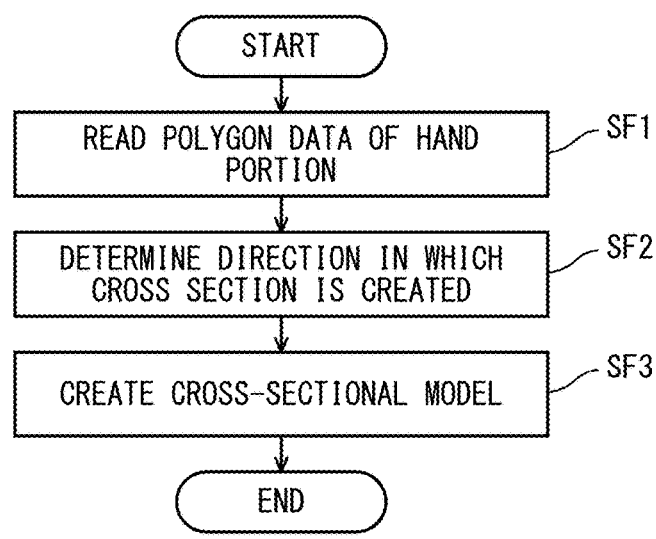
FIG. 18 is a flowchart illustrating an example of the registration procedure of a hand model.

In step SF3 of the flowchart illustrated in FIG. 18, a cross-sectional model is created using the cross sections created in step SF2. That is, a cross-sectional model of the hand portion may be created by information on the shape of the cross section and the position of the cross-section with respect to the axis A, which is set in the hand model in step SF1. In addition, another method of creating the cross-sectional model may be used, and for example, a method of creating cross sections at a predetermined interval in the direction of the axis A and coupling the cross sections having the same shape may be used.

Figure 19:
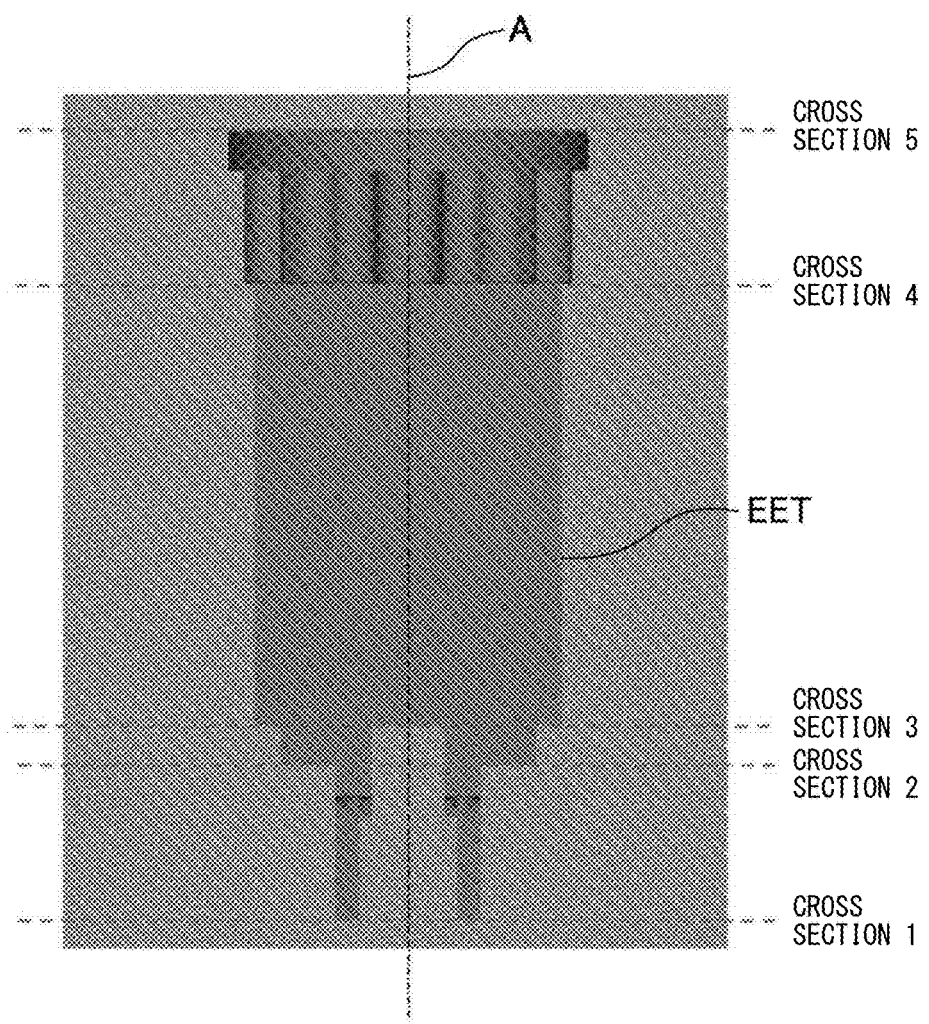
FIG. 19 is a side view illustrating a hand model based on three-dimensional CAD data.
Figure 20:
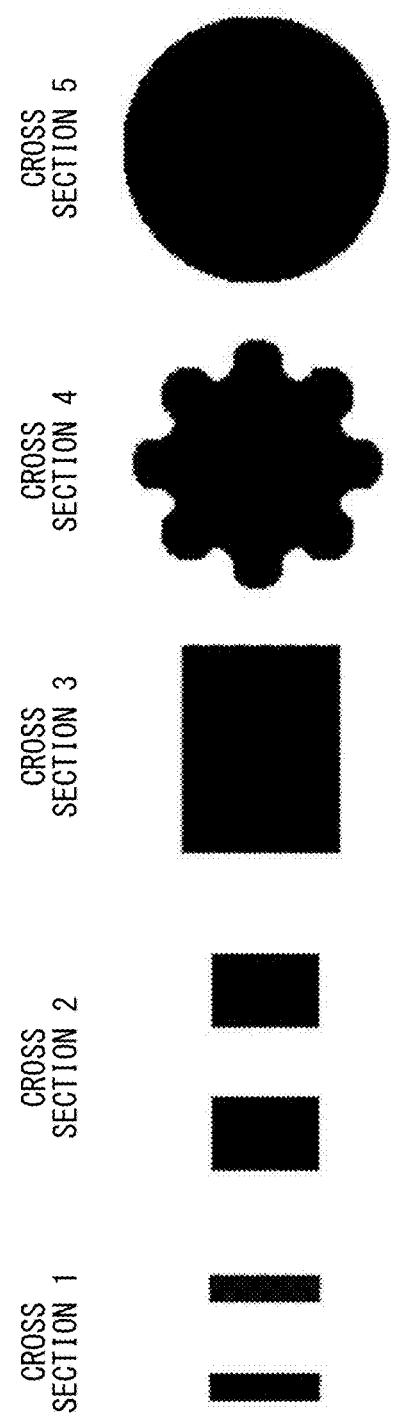
FIG. 20 is a view illustrating cross sections of the hand model.

There are various shapes of the hand portion of the robot RBT, and in addition to the shape illustrated in FIG. 19, for example, a claw portion may have a long shape, a short shape, a narrow shape, a wide shape, or a rod shape. The hand portion may also be registered according to the hand model registration procedure flowchart of FIG. 18. That is, a plurality of shapes of the hand portion of the robot RBT may be input and registered by the hand portion shape input section 35 illustrated in FIG. 3.

After the hand model of the robot RBT is registered through step SB2 of the simulation environment setting flowchart of FIG. 8 as described above, the processing proceeds to step SB3. In step SB3, the surface of the workpiece to be held by the hand portion of the robot RBT is selected. The surface of the workpiece may be displayed by a height image registered in the search model registration flowchart illustrated in FIG. 9, and the user selects a height image corresponding to the surface, which may be held by the hand portion of the robot RBT, from among a plurality of registered height images. When selecting the height image, a height image selection screen may be created by the display control section 26 and may be displayed on the display section 3. On the height image selection screen, a plurality of height images registered in the search model registration flowchart illustrated in FIG. 9 may be displayed at a time, and the user may select a height image from among the height images by operating the operation section 4.

Figure 21A:
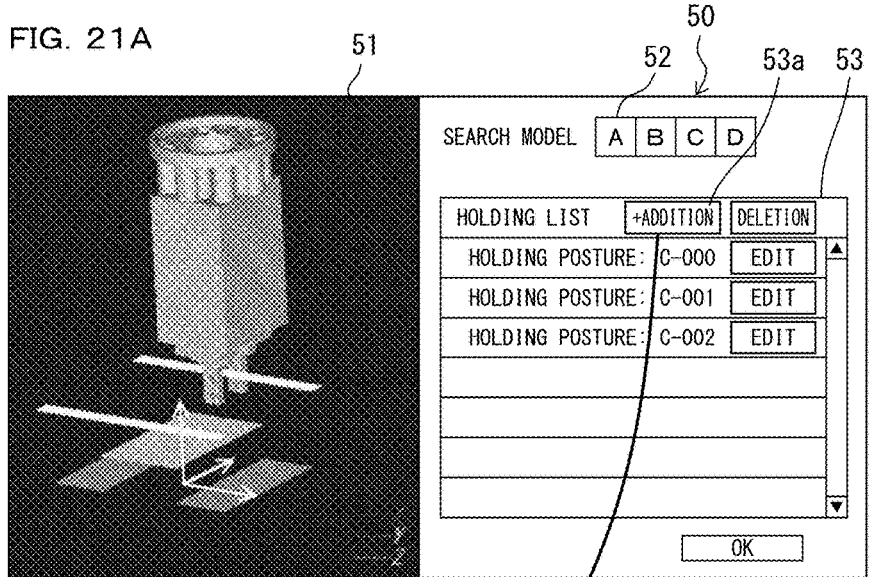
FIG. 21A is a view illustrating a holding position setting screen on which a holding posture list is displayed.
Figure 21B:
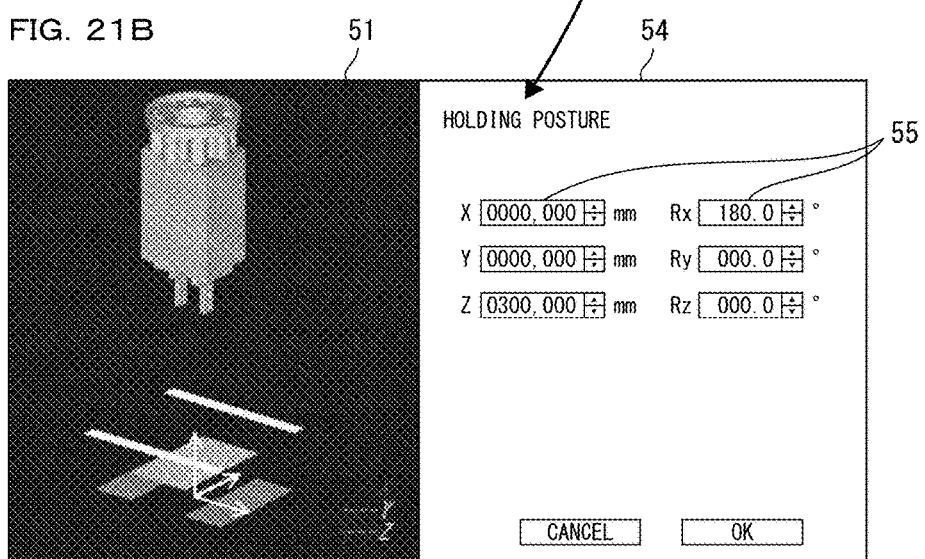
FIG. 21B is a view illustrating a holding position setting screen on which a holding posture setting area is displayed.

After selecting the height image in step SB3, the processing proceeds to step SB4 in which the position and posture of the hand portion when holding the surface selected in step SB3 are registered. In step SB4, a holding position setting screen (GUI) 50 illustrated in FIGS. 21A and 21B is displayed on the display section 3. The holding position setting screen 50 may be generated by the holding position setting section 28 included in the robot setting device 100 illustrated in FIG. 3. The generated holding position setting screen 50 may be displayed as illustrated in FIGS. 21A and 21B as the display control section 26 controls the display section 3.

As illustrated in FIG. 21A, the holding position setting screen 50 includes a model display area 51, a search model selection area 52, and a holding position display area 53. In the model display area 51, the hand model of the robot RBT and the search model selected in the search model selection area 52 are displayed. In the search model selection area 52, "A" to are displayed, and search models are allotted respectively thereto. For example, a height image of the CAD model viewed from the upper may be allotted to A, a height image of the CAD model viewed from the left may be allotted to B, a height image of the CAD model viewed from the right may be allotted to C, and a height image of the CAD model viewed from the front may be allotted to D. When the user selects an arbitrary alphabet in the search model selection region 52, the search model allotted to the alphabet is displayed in the model display area 51.

In the holding position display area 53, a holding position addition button 53a is provided. When the holding position addition button 53a is operated, a holding posture setting area 54 is displayed, along with the model display area 51, as illustrated in FIG. 21B. The holding position addition button 53a may be a virtual button, and may be operated with, for example, a mouse of the operation section 4.

In the holding posture setting area 54, input areas 55 are provided, to which the X axis coordinate, the Y axis coordinate, the Z axis coordinate, the rotation angle around the X axis, the rotation angle about the Y axis, and the rotation angle about the Z axis may be separately input. When a numerical value is input to each input area 55, the hand model displayed in the model display area 51 moves so as to correspond to the input value. Thus, since the hand model may be disposed at a desired position, it is possible to set which portion of the search model is to be held by the hand model in what posture, that is, the holding position and posture while adjusting the position of the hand model. Setting of the holding position and posture may be performed by directly operating, for example, the hand model with the mouse of the operation section 4, in addition to inputting the numerical value to each input area 55.

Here, the set holding position is a holding candidate position to be held by the robot RBT. As illustrated in FIG. 21A, a plurality of holding candidate positions to be held by the robot RBT may be set so as to correspond to respective search models registered by the search model registering section 27. For example, two holding candidate positions may be set to correspond to one search model, and four holding candidate positions may be set to correspond to another search model. The set holding candidate positions may be registered in the storage section 42 of the holding position setting section 28 included in the robot setting device 100 in a state of corresponding to the search model.

In general, a plurality of holding candidate positions may often be registered with respect to one workpiece. This is because, when a plurality of holding candidate positions are registered, an optimum solution may be selected from among a plurality of holding solutions, and therefore, there is a high possibility that it may be determined that holding is possible when there is another holding solution candidate even if an obtained holding solution candidate may not be a final solution due to, for example, interference between the hand portion and another object. When registering the plurality of holding candidate positions, performing the registration from the beginning each time increases the efforts when registering the same holding candidate position, which makes a work troublesome. Therefore, when information on completely registered holding candidate positions is copied so that the holding candidate positions may be saved as new holding candidate positions by changing some of positional parameters set at the holding candidate positions, the efforts may be saved and a plurality of holding candidate positions may be easily registered. In addition, similarly, existing holding candidate positions may be read out and positional parameters may be appropriately corrected, overwritten and saved.

Figure 22:
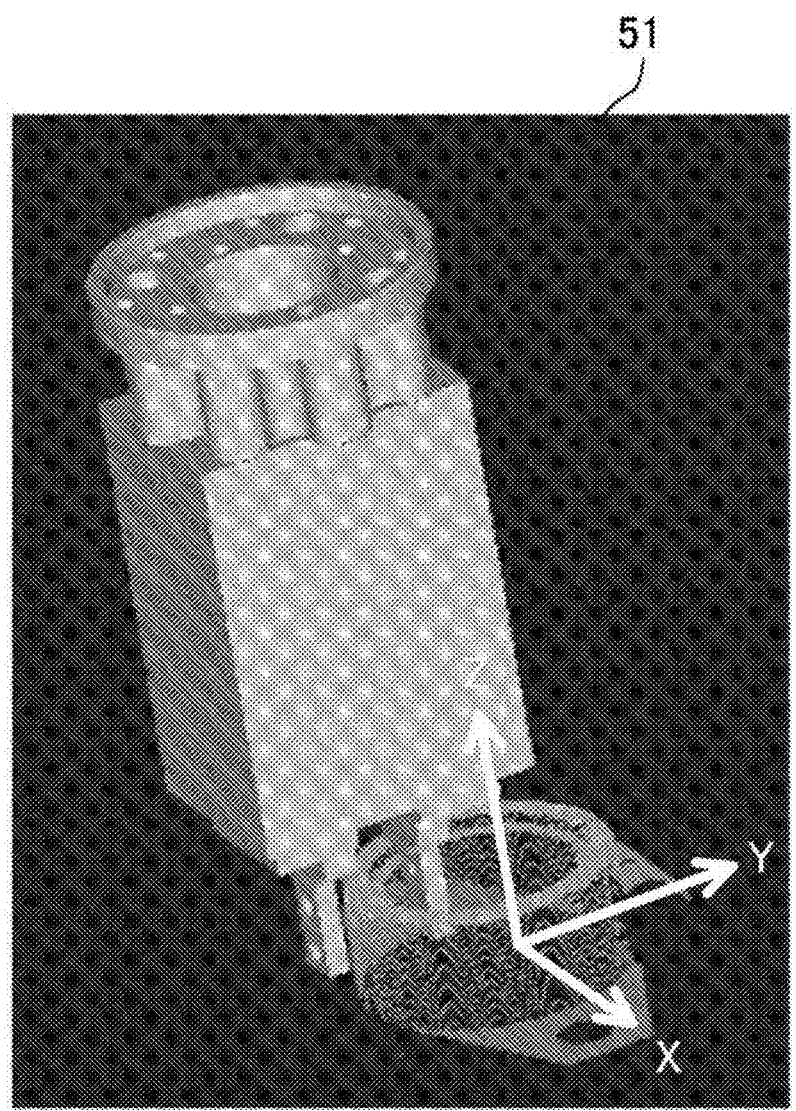
FIG. 22 is a view illustrating a state where a hand model is disposed at a position at which it is capable of holding a holding candidate position of a workpiece.
Figure 23:
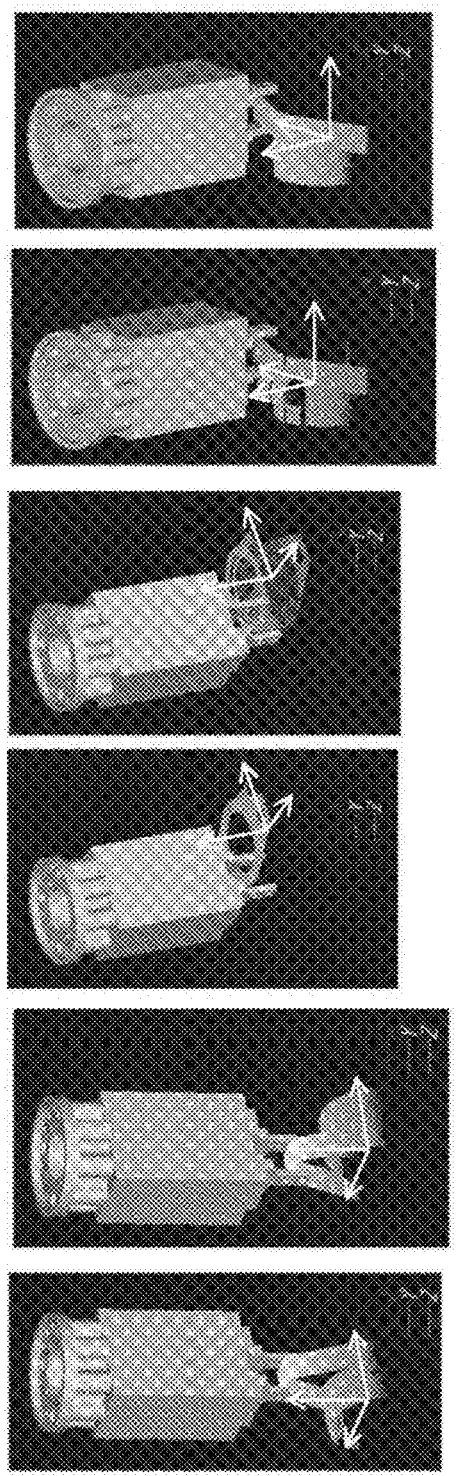
FIG. 23 is a view illustrating a state where a hand model is disposed at a position at which it is capable of holding a holding candidate position with respect to each of six search models.

FIG. 22 illustrates a state where the hand model is disposed at a holding candidate position. In addition, FIG. 23 illustrates a state where a hand model is disposed at a holding candidate position with respect to each of six search models, but it is not necessary to set holding candidate positions for all of the search models.

When registering a holding candidate position, the relative position and posture of an end effector model when holding a workpiece model are registered with respect to the origin of a search model. Meanwhile, when picking up the workpiece WK with an actual end effector EET, it is necessary to convert vision coordinates, which are the coordinates of a three-dimensional space (vision space) in which an image of the workpiece WK is captured by the sensor section 2, to robot coordinates used when the robot controller 6 actually operates the robot RBT.

Specifically, the position and posture of the workpiece model are acquired as the position (X, Y, Z) and the posture $(R_X, R_Y, R_Z)$ in the vision space (in addition, the posture $(R_X, R_Y, R_Z)$ is the posture represented by the Z-Y-X system Euler angle). In addition, similarly, the posture of the end effector model, which holds the workpiece model, is also acquired as the position (X, Y, Z) and the posture $(R_X, R_Y, R_Z)$ in the virtual three-dimensional space of the robot setting device 100. In order for the robot controller 6 to operate the robot RBT based on the position and posture in the vision space as described above, it is necessary to convert the position and the posture to the position (X', Y', Z') and the posture $(R_X', R_Y', R_Z')$ in the robot space. A processing of calculating the conversion formula for coordinate conversion from the position and posture calculated by the displayed coordinate system to the position and posture of the coordinate system in which the robot controller 6 operates the end effector EET is called calibration. This calibration may be performed by a conventionally well-known method.

In step SB5 of the flowchart illustrated in FIG. 8, it is determined whether or not a required number of holding candidate positions is able to be registered. When there are a large number of portions that are able to be held by the hand portion, the number of holding candidate positions to be registered increases. However, since this is a matter that the user decides, the determination in step SB5 is made by the user. In a case where, since it is determined as "NO" in step SB5, a required number of holding candidate positions is not able to be registered and other holding candidate positions to be registered remain, the processing proceeds to step SB4 via step SB3, and other holding candidate positions are set and registered. On the other hand, in a case where it is determined as "YES" in step SB5 and a required number of holding candidate positions is able to be registered, the flowchart ends.

In the simulation environment setting step SA1 illustrated in FIG. 7, the setting and registration of search models and the setting and registration of the hand model may be performed as described above, but the input or setting of various other kinds of information required to perform the simulation may be performed.

In step SA2 subsequent to step SA1, bulk information is input. The input bulk information includes, for example, the number of workpieces to be in bulk at a time, the shape of a bulk location (whether the location is a plane or a box), and the size of the bulk location.

When the bulk information is input in step SA2, the processing proceeds to step SA3 in which three-dimensional CAD data (CAD model) of the workpiece WK is read out. The data read in step SC1 of the search model registration flowchart of FIG. 9 may be read out and used in step SA3.

After reading the CAD data, the processing proceeds to step SA4 and the number of polygons in the CAD data read in step SA3 is reduced. Reducing the number of polygons in the CAD data means that the data capacity of the workpiece model is compressed and reduced. In addition, the compression of the data capacity may be possible by reducing the data of the workpiece model.

In general, three-dimensional CAD data is displayed as polygon data, which is represented as an aggregate of triangular surface information. A method of reducing the number of polygons while maintaining the shape of the workpiece model as much as possible includes, for example, a progressive mesh method proposed by Hoppe et al., or a Quadratic Error Metric (QEM) method proposed by Garland et al. A processing of reducing the number of polygons may be performed by any one of these conventionally well-known methods.

For example, in the QEM method, edges of adjacent polygons are deleted, and a new vertex is generated by combining two vertices. By repeating this operation, the number of polygons constituting entire CAD data may be greatly reduced and data capacity may be compressed. In addition, since it is sufficient for step SA4 that the data capacity of the CAD data read in step SA3 may be compressed, in addition to the method of reducing the number of polygons, the data capacity may be reduced by various other methods.

The step SA4 is a step performed to reduce calculation load upon a physical simulation by the physical simulation section 22 to be described later by creating a workpiece model having a reduced number of polygons while maintaining the shape of the workpiece model, represented by the CAD data, as much as possible. The step SA4 corresponds to a data capacity compression step of performing a processing of compressing the data capacity of the workpiece model set by the workpiece model setting section 20, and is performed by the data capacity compression section 21 included in the robot setting device 100 illustrated in FIG. 3.

Figure 24A:
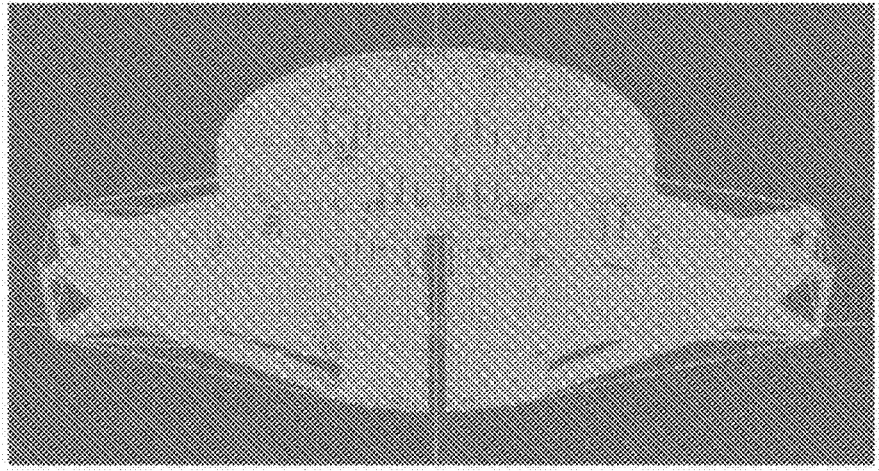
FIG. 24A is a view illustrating a workpiece model before a reduction in the number of polygons.
Figure 24B:
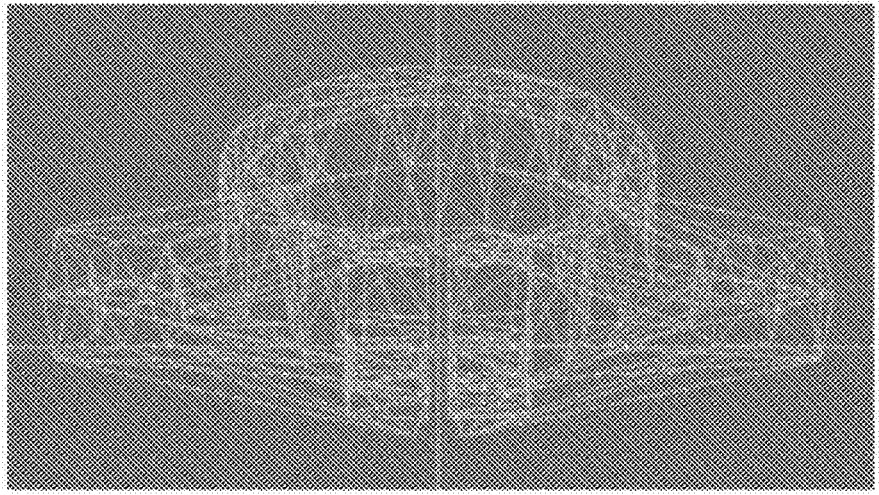
FIG. 24B is a view illustrating the workpiece model after a reduction in the number of polygons.
Figure 25:
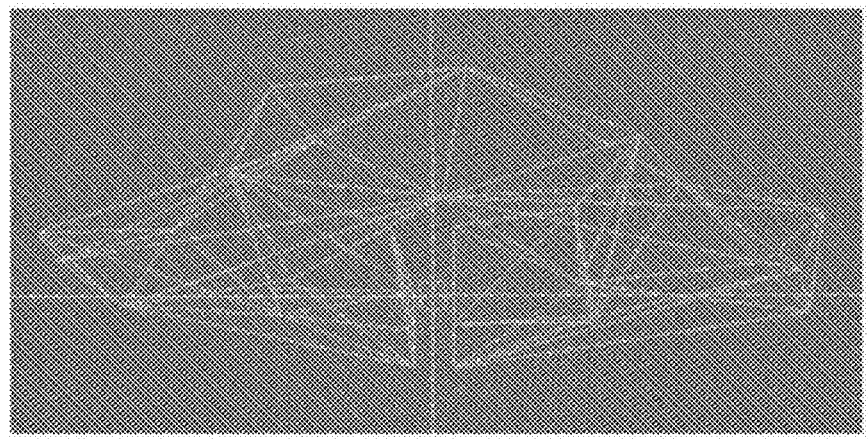
FIG. 25 is a view illustrating the workpiece model after the number of polygons is reduced until the original three-dimensional shape of a workpiece largely collapses.

Describing a concrete example of data capacity compression, FIG. 24A illustrates a workpiece model before a reduction in the number of polygons, and the number of polygons is 26,214. FIG. 24B illustrates the workpiece model after a reduction in the number of polygons, and the number of polygons is 414. In addition, FIG. 25 illustrates the workpiece model after the number of polygons is further reduced compared to the workpiece model illustrated in FIG. 24B, and the number of polygons is 50. In the workpiece model illustrated in FIG. 24B, the shape of the workpiece model before a reduction in the number of polygons remains even though the number of polygons is greatly reduced, and this amount of reduction (data compression amount) may be preferable because a simulation result to be described later has high reproducibility.

On the other hand, the workpiece model illustrated in FIG. 25 has a shape considerably different from the shape of the workpiece model before a reduction in the number of polygons because the degree of reduction in the number of polygons is too large. Performing a simulation to be described later using this workpiece model may be undesirable because there is a high possibility that reproducibility is remarkably lowered.

In this exemplary embodiment, in order to prevent the shape of the workpiece model from being greatly changed due to an excessive reduction in the number of polygons, a change in shape is set to fall within a preset threshold range. In order to implement this, the data capacity compression section 21 included in the robot setting device 100 illustrated in FIG. 3 is configured to set a shape change allowance value between a workpiece model before a compression processing and the workpiece model after the compression processing. Although the user attempts to reduce the number of polygons of CAD data used by the user as many as possible because a processing speed becomes higher as a larger number of polygons is reduced, since the result of a simulation may have poor reproducibility as described above, there is limitation on a reduction in the number of polygons. However, it is not easy for the user to judge to what extent the amount of reduction in the number of polygons is to be limited in order to increase the reproducibility of the result of a simulation. When the number of polygons is reduced due to erroneous judgment, a relevance between the simulation result and a picking moving image upon actual operation is lowered and there is no meaning to carry out the simulation.

In order to prevent this, the data capacity compression section 21 has a preset initial setting value as a shape change allowance value, which allows a change in the shape of a workpiece model due to a reduction in the number of polygons. The initial setting value may be stored in the storage section 42 upon shipment of the robot setting device 100, or may be stored in the storage section 42 when the use of the robot setting device 100 starts. The initial setting value may be changed after operation.

For example, in the above-described QEM method, the amount of deformation when a new vertex is generated by deleting the edges of a plurality of adjacent surfaces and the vertices at both ends thereof is regarded as a cost, and the edges are deleted in descending order of the cost. When deleting the edges and the vertices within a range in which the cumulative amount of deformation falls within a shape change allowance value thereof after suppressing the shape change allowance value to a small value of, for example, 1% order, it is possible to effectively reduce the number of polygons while preventing an extreme change in shape. Therefore, it is possible to achieve the simulation result having high reproducibility while reducing calculation load.

For example, in the QEM method, with respect to all edges (ridge lines) constituting polygon data, expected values of the amount of deformation in a case of deleting the vertices at both ends of the edges and generating vertices at new positions (edge deletion) are calculated. After sorting these values in ascending order, the edges may be deleted in the order of smaller expected values of the amount of deformation. When an edge is reduced, both ends thereof move to new vertices, and a new edge is generated between adjacent vertices. In a state where the expected value of the amount of deformation of the edge deleted by a previous operation is added to the expected value of the amount of deformation of all of the edges generated here, the expected values of the amount of deformation of all of the edges is sorted again in ascending order. As a result, an edge, which is newly generated by an edge deleting operation, becomes a form in which the amount of deformation from the initial shape up to that edge is accumulated, and thereafter becomes difficult to be deleted further.

It may also be possible to allow the user to input the shape change allowance value. For example, a screen for the input of a shape change allowance value may be displayed on the display section 3 by the display control section 26, and the user may input a shape change allowance value using the operation section 4. Similarly, the user may change an initial setting value.

After compressing the data capacity of the workpiece model, the processing proceeds to step SA5 of the flowchart illustrated in FIG. 7 so that a physical simulation is executed. The physical simulation is performed by the physical simulation section 22 included in the robot setting device 100 illustrated in FIG. 3. Specifically, the data capacity compression section 21 simulates an operation in which workpieces are disposed in a work space under the action of gravity by using a plurality of workpiece models having a compressed data capacity, and generates a bulk state where a plurality of workpiece models are stacked in a virtual work space. This is a physical simulation step. By performing the physical simulation, since a picking operation simulation to be described later may be performed by generating bulk data suited to the user's actual operation environment, such as by excluding a workpiece model having an obviously unnatural posture, it is possible to perform appropriate setting adjustment or verification in advance in a form close to actual operation without actually preparing workpieces. The physical simulation section 22 may be configured to generate bulk data excluding a workpiece model having a low probability of occurring physically.

The physical simulation may be executed using a conventionally well-known physical simulation engine. In the physical simulation, workpiece models are virtually disposed based on the action of a collision between workpieces and information on obstacles such as the floor. In a case where the workpieces WK are stored in the storage container BX as illustrated in FIG. 1 upon actual operation, a simulation of inputting the workpiece models from above into the storage container BX may be set so as to be performed by the physical simulation engine. In addition, in the physical simulation, for example, when the workpieces collide with each other, it is displayed how the workpiece model will move afterwards in consideration of a preset restitution coefficient or friction coefficient.

As an example of the physical simulation, there may be a case where a bulk state is generated inside the storage container BX by dropping or inputting the workpieces WK from above into the storage container BX. "Input" or "drop" is not limited to an operation of physically dropping the workpieces from a high place, and is used as a meaning including, for example, an operation of dropping workpiece models while pressing them in a horizontal direction from a predetermined height in order to verify rolling, an operation of dropping workpiece models by throwing them in a parabolic shape, or an operation of loading or stationarily leaving workpiece models in the storage container BX or on the floorer surface. In addition, in the physical simulation, in addition to sequentially inputting workpiece models one by one into the work space, an operation of simultaneously inputting, for example, falling or stationarily leaving a plurality of workpiece models at the same time may be simulated.

After executing the physical simulation, the processing proceeds to step SA6 in which bulk state data of the workpiece models are generated based on the result of the physical simulation. This step is also included in the physical simulation step, but is executed by the bulk data generating section 23 included in the robot setting device 100 illustrated in FIG. 3.

Figure 26:
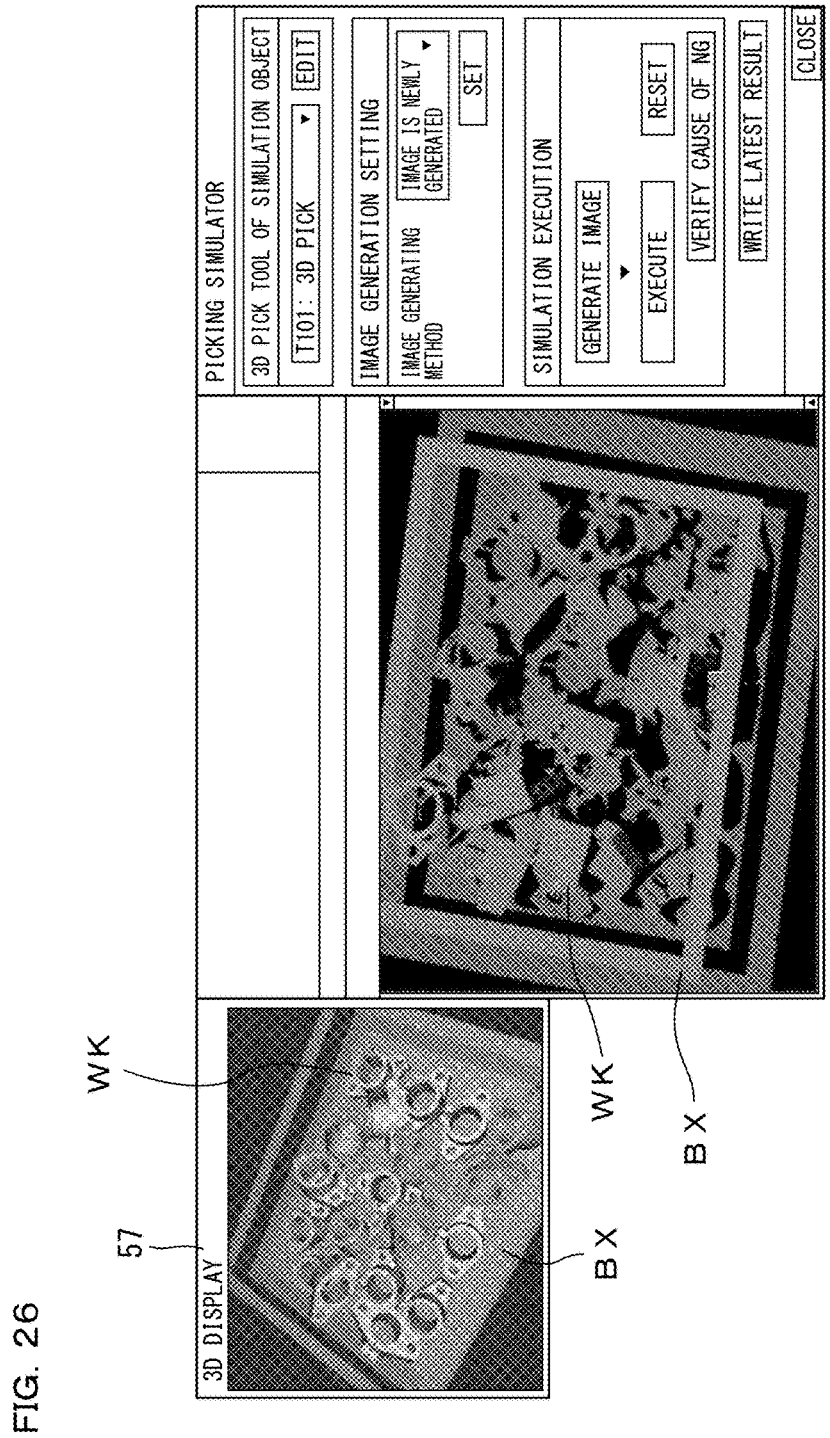
FIG. 26 is a view illustrating a screen on which a physical simulation image and a height image are simultaneously displayed.
Figure 27:
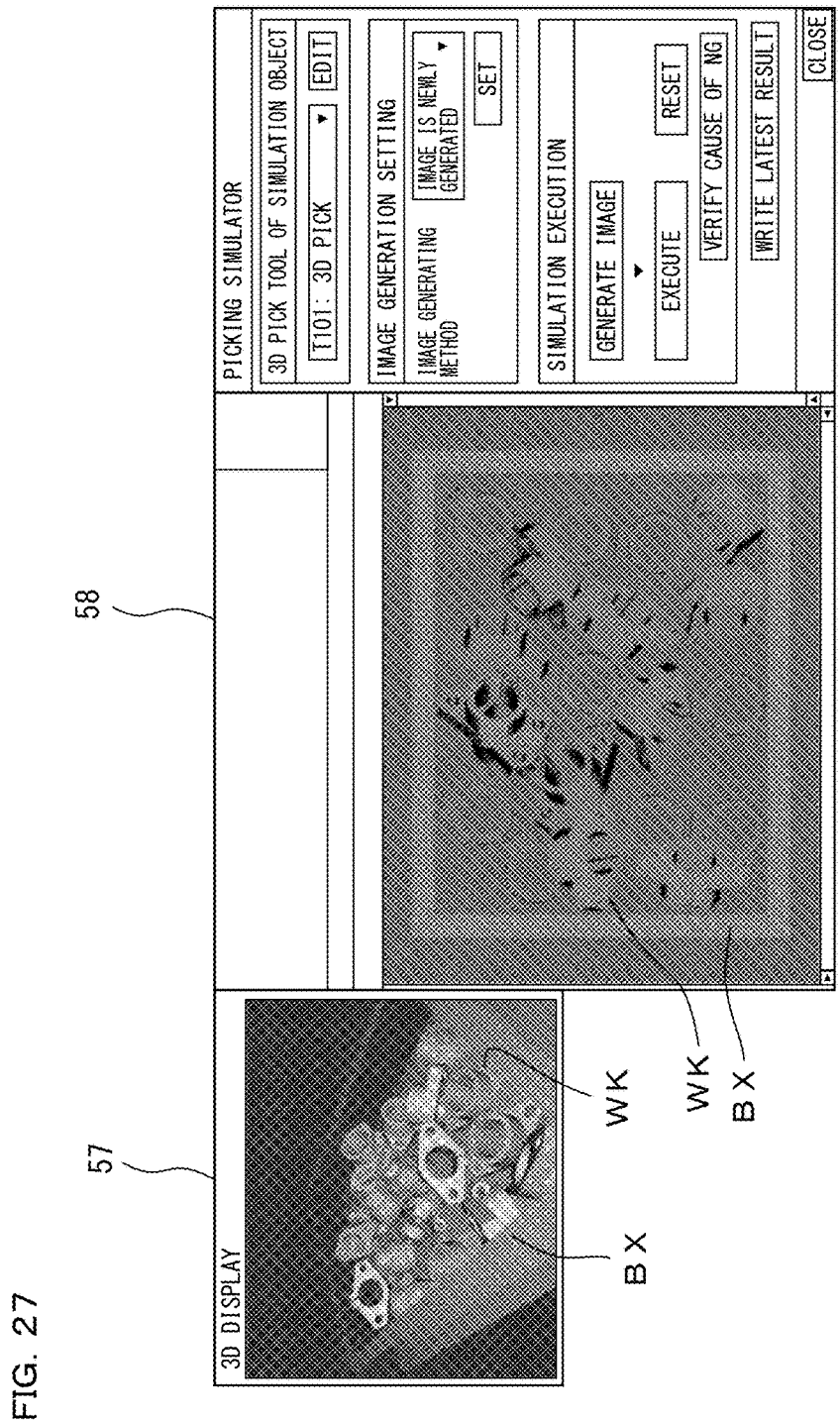
FIG. 27 is a view illustrating a screen on which the physical simulation image and the height image, which are viewed from a different viewpoint, are simultaneously displayed.

When an image is generated based on the bulk state data of the workpiece models, the images illustrated in FIGS. 26 and 27 are obtained. FIGS. 26 and 27 illustrate images displayed on the display section 3, and in each drawing, a left image is a physical simulation image 57 and a right image is a height image 58 to be described later. The display control section 26 generates an image showing a state where the workpiece models are randomly put into the storage container BX based on the bulk state data of the workpiece models, and causes the display section 3 to display the image as the physical simulation image 57. The workpiece model in the physical simulation image 57 may be a workpiece model before data capacity compression. In this case, by disposing the workpiece model, before a compression processing is performed by the data capacity compression section 21, according to information on the position and posture of the workpiece model among the bulk state data of the workpiece models, the workpiece model may be displayed as a precise workpiece model in the physical simulation image 57. Instead of loading the workpiece model before the compression processing is performed, a workpiece model, which has a data capacity larger than that of the workpiece model used by the physical simulation section 22 and also has a shape close to the three-dimensional shape of the workpiece, may be disposed. In addition, in a case where the result of the physical simulation seems to be a result unsuitable for a picking operation simulation to be described later when viewing the physical simulation image 57, the user may discard the result of the physical simulation and may execute a new physical simulation.

As illustrated in FIGS. 26 and 27, the physical simulation image 57 and the height image 58 may be images obtained by independently changing viewpoints, that is, the viewing angles thereof. The arrangement of the physical simulation image 57 and the height image 58 is not limited to the illustrated arrangement, but may be displayed at arbitrary positions on one display screen. In addition, for example, the physical simulation image 57 may be displayed as a moving image from the execution start to the end of the physical simulation. In this case, it is possible to view a state where a plurality of workpiece models drop into the storage container BX from above, a state where the workpiece models collide with each other, and a state where the workpiece models collide with the wall of the storage container BX, and the user may finally grasp how the bulk state is generated.

After generating the bulk state data of the workpiece models, the processing proceeds to step SA7 illustrated in FIG. 7 so that a workpiece model in the bulk state data of the workpiece models is replaced with the CAD data before a reduction in the number of polygons. That is, a workpiece model, which has a data capacity larger than that of the workpiece model used by the physical simulation section 22 and also has a shape close to the three-dimensional shape of the workpiece, is disposed according to the position and posture of each workpiece model in the data of the bulk state data generated by the physical simulation section 22. In this way, a data generating step is performed to generate search processing data for executing a search processing of detecting the position and posture of each workpiece model. The generation of the search processing data is performed by the bulk data generating section 23 included in the robot setting device 100 illustrated in FIG. 3.

The workpiece model, which has a data capacity larger than that of the workpiece model used by the physical simulation section 22 and also has a shape close to the three-dimensional shape of the workpiece WK, is a workpiece model, which has a low amount of compression of data and also has a more precise shape than that of the workpiece model used in the physical simulation step. With replacement to this workpiece, the reproducibility of the result of a picking operation simulation to be described later may be enhanced.

The bulk data generating section 23 may generate search processing data by disposing the workpiece model, before a compression processing is performed by the data capacity compression section 21, according to the position and posture of each workpiece model in the bulk state data generated by the physical simulation section 22. In this way, the reproducibility of the result of a picking operation simulation to be described later may be enhanced.

After generating the search processing data in step SA7, the processing proceeds to step SA8 in which height image data, which indicates the height of each portion of the workpiece model, is generated. A height image obtained from the height image data is an image having height information and is also referred to as, for example, a distance image or a three-dimensional image. Since information on the height of the workpiece model is included in the search processing data, height image data may be obtained by a well-known method based on the information on the height of the workpiece model. As illustrated in FIGS. 26 and 27, the height image 58, which may be obtained based on the height image data generated in step SA8, is displayed, along with the physical simulation image 57, on the display section 3.

After generating the height image in step SA8 illustrated in FIG. 7, the processing proceeds to step SA9 in which a search processing is executed to detect the position and posture of each workpiece model with respect to the search processing data generated by the bulk data generating section 23. This is a search processing step, and is performed by the search processing section 24 included in the robot setting device 100 illustrated in FIG. 3.

The search processing is performed with respect to the search processing data including height information, and therefore, may be called a three-dimensional search.

Specifically, a three-dimensional search, which specifies the posture and the position of each workpiece model, is performed using a search model registered by the search model registering section 27. First, the position and posture (X, Y, Z, $R_X$, $R_Y$, $R_Z$) in a state where respective characteristic points of the search model most closely match are searched from a height image. Here, $R_X$, $R_Y$ and $R_Z$ indicate the rotation angle with respect to the X axis, the rotation angle with respect to the Y axis, and the rotation angle with respect to the Z axis, respectively. Various methods for expressing such rotation angles have been proposed, and here, Z-Y-X-system Euler angles may be used. In addition, it may be not necessary for each search model to have one matching position and posture, but a plurality of positions and postures, which match to a predetermined degree or more, may be detected.

Figure 28:
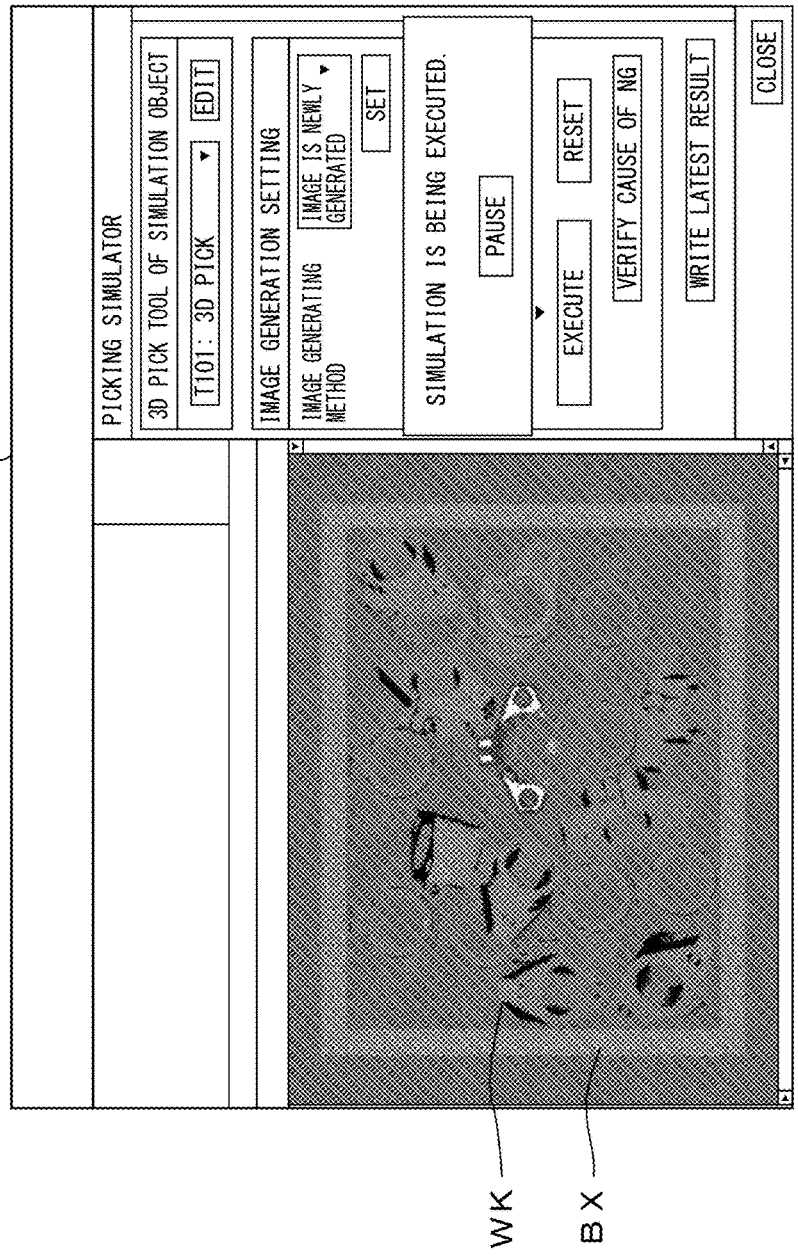
FIG. 28 is a view illustrating a screen on which a state where a workpiece model is detected in a height image is displayed.

For example, as illustrated in FIG. 28, when the workpiece model is detected from the height image based on the matching of characteristic points, characteristic points of the search model may be superimposed and displayed with a brighter color than the surroundings at the detected position. By using images of the respective surfaces of the workpiece, like a six-sided view, as the search model used for the three-dimensional search, it is advantageously possible to simplify a calculation processing of the three-dimensional search and to achieve a lower load and higher speed of the processing, compared to a case using, for example, a perspective view. In addition, even during registration of the search model, the displayed state becomes easy to view and the user may easily recognize the state.

Figure 29A:
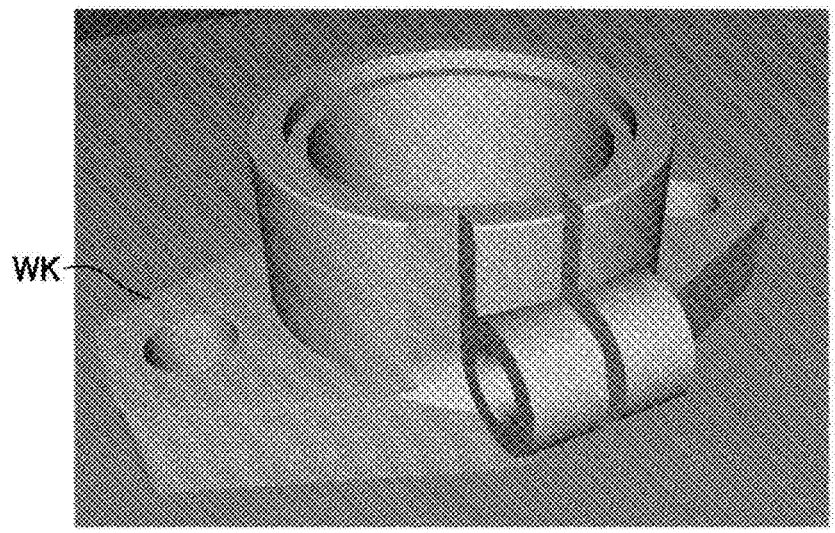
FIG. 29A is a view illustrating a case where a workpiece model, which constitutes a height image used for a three-dimensional search, is before a compression processing.
Figure 29B:
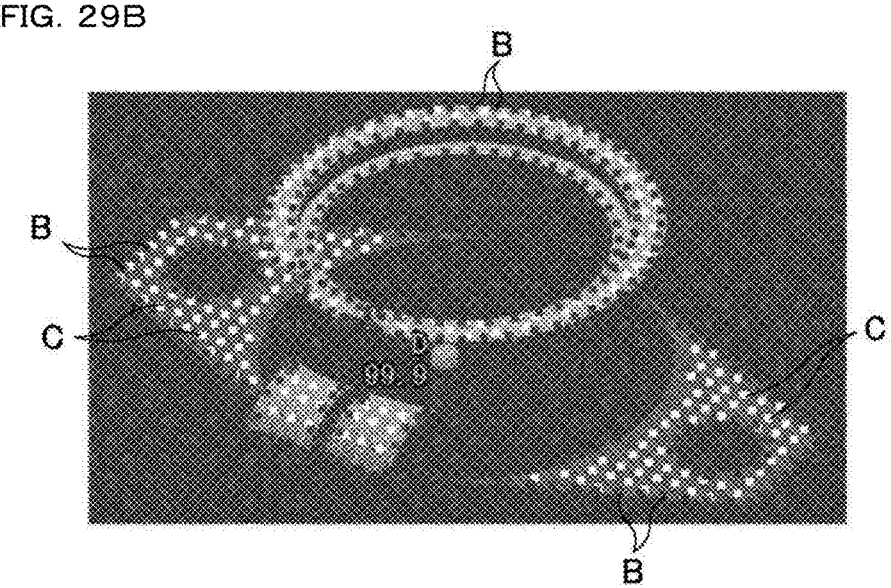
FIG. 29B is a view illustrating the superimposed and displayed state of the workpiece model before a compression processing and a search result (a position of each characteristic point of a search model) with respect to the workpiece before a compression processing.
Figure 30A:
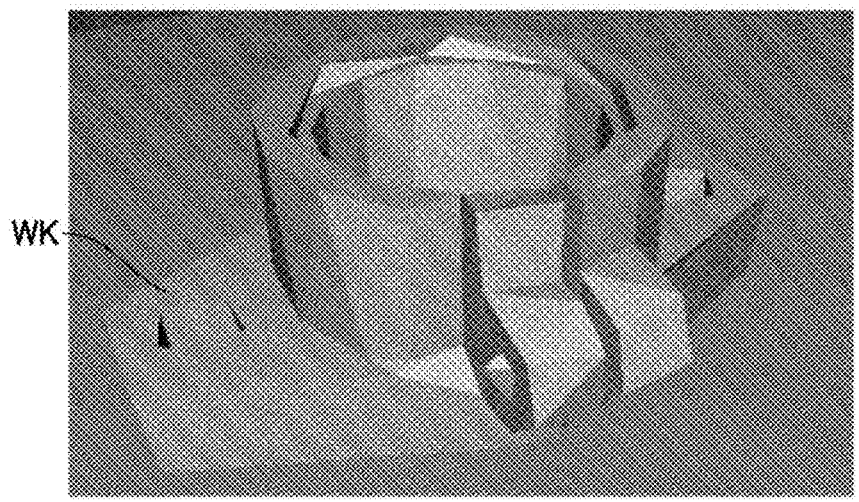
FIG. 30A is a view illustrating a case where a workpiece model, which constitutes a height image used for a three-dimensional search, is after a compression processing.
Figure 30B:
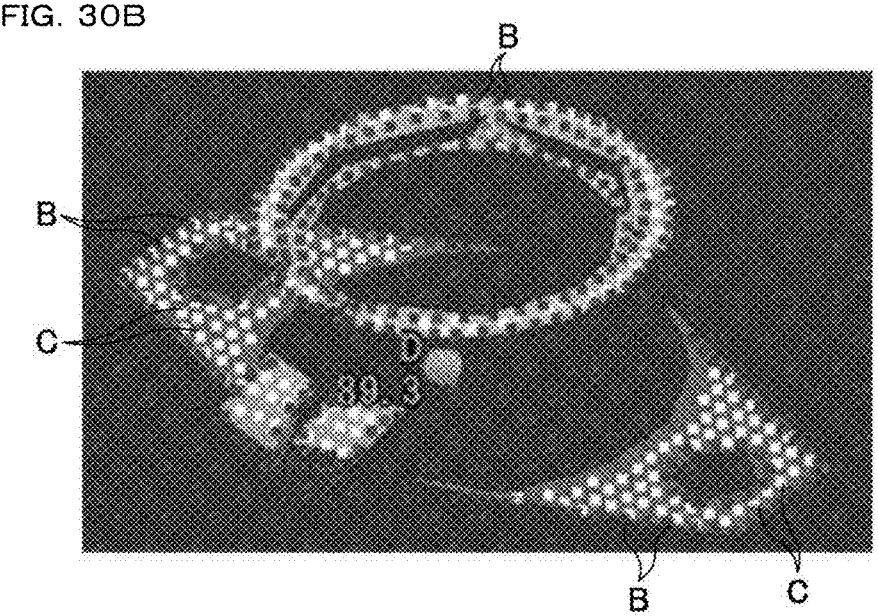
FIG. 30B is a view illustrating the superimposed and displayed state of the workpiece model after a compression processing and a search result (a position of each characteristic point of a search model) with respect to a workpiece before a compression processing.

Here, for example, a case where a workpiece model constituting a height image used for a three-dimensional search is a workpiece model compressed by the data capacity compression section 21 will be described. FIGS. 29A and 29B illustrate a case where the workpiece model constituting the height image used for the three-dimensional search is before a compression processing, whereas FIGS. 30A and 30B illustrate a case where the workpiece model constituting the height image used for the three-dimensional search is after a compression processing. When comparing FIG. 29B with FIG. 30B, it can be appreciated that the positions of characteristic points exactly match in FIG. 29B, whereas the positions of characteristic points do not exactly match in FIG. 30B, and thus the score is decreasing. Therefore, the accuracy of a three-dimensional search may be enhanced when the workpiece model before a compression processing illustrated in FIG. 29B is used upon the three-dimensional search. In addition, although the three-dimensional search may be performed using the search model after a compression processing illustrated in FIG. 30B, one having a lower amount of compression at that time may be preferable.

As illustrated in FIG. 31, each characteristic point of the search model may be superimposed and displayed at the position of the result of the three-dimensional search. On the left side of FIG. 31, a case of two-dimensional display is illustrated, and on the right side, a case of three-dimensional display is illustrated. A search result may be scored by the extent to which corresponding characteristic points existed in a height image (e.g., score ratios of characteristic points corresponding to each other with an error of a predetermined distance or less with respect to the height image).

As a result of searching for whether or not a search model registered by the search model registering section 27 exists in the height image by the search processing section 24, when no search model exists in the height image, that is, when a workpiece model cannot be detected, it is determined as "NO" in step SA10 illustrated in FIG. 7 so that the processing proceeds to step SA11, and information on the remaining workpiece model is extracted so that the flowchart ends.

In a case where a workpiece model may be detected in the height image as a result of the three-dimensional search in step SA9, it is determined as "YES" in step SA10 so that the processing proceeds to step SA12, and interference determination and holding solution calculation are performed. Steps SA12 to SA15 are picking operation simulation steps performed by the picking operation simulation section 25, which executes a simulation of a picking operation by the robot RBT, with respect to a workpiece model successfully searched by the search processing section 24. As a result of the three-dimensional search, a plurality of workpiece models may be detected in the height image. The picking operation simulation section 25 may have a physical simulation function or a height image generation function.

In this way, the picking operation simulation section 25 is a section for verifying a bin picking operation of a workpiece model in a virtual work space with respect to generated bulk data. By performing a picking operation simulation, it is possible to carry out in advance a labor-intensive confirmation operation such as whether or not the three-dimensional position and posture of the workpiece may be detected or setting adjustment in a form close to actual operation without actually preparing the workpiece.

In particular, after the picking operation simulation section 25 holds one workpiece model with a hand model to start at least a taking-out operation, the physical simulation section 22 may be configured to again execute a physical simulation with respect to bulk data in a state after the workpiece model is extracted. The timing at which the physical simulation is executed again may be after the workpiece model is held with the hand model and is pressed on the placement position, or may be in the course of taking out the workpiece model. That is, in a state where the workpiece model is held and lifted with the hand model, since, through the removal of one workpiece model, other workpiece models around the corresponding workpiece model may be moved, it is not necessary to wait until the held workpiece model is loaded. Therefore, the re-execution timing of the physical simulation is the timing at which one workpiece model is held and lifted with the hand model, or the timing after waiting until the state of another workpiece model is stabilized via movement under the action of gravity. For example, the timing may be after a predetermined time (e.g., 10 seconds) has passed from a point in time at which the workpiece model is held and lifted. After the physical simulation is executed again, the bulk data is updated.

Thus, when one workpiece model is extracted from the bulk data during the picking operation simulation, since an operation such as the collapse of a group of workpiece models in bulk according to this is also calculated by the physical simulation, and the picking operation simulation section 25 executes the subsequent picking operation simulation using the bulk data after this calculation, a more accurate bin picking simulation is implemented.

Figure 32A:
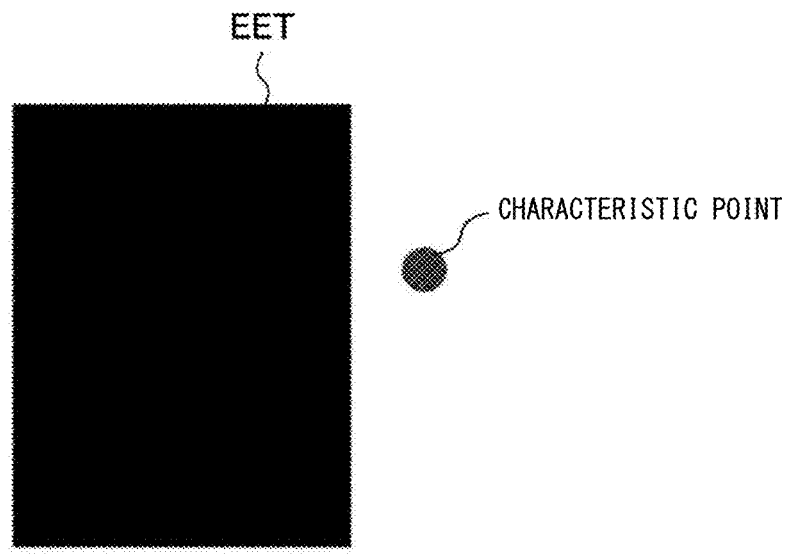
FIG. 32A is a view illustrating a case where a hand model and a three-dimensional measuring point do not interfere with each other.
Figure 32B:
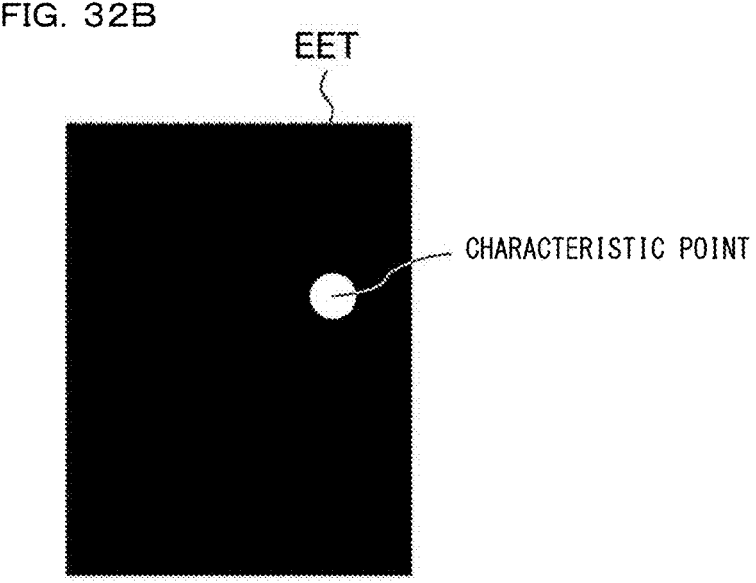
FIG. 32B is a view illustrating a case where the hand model and the three-dimensional measuring point interfere with each other.
Figure 33:
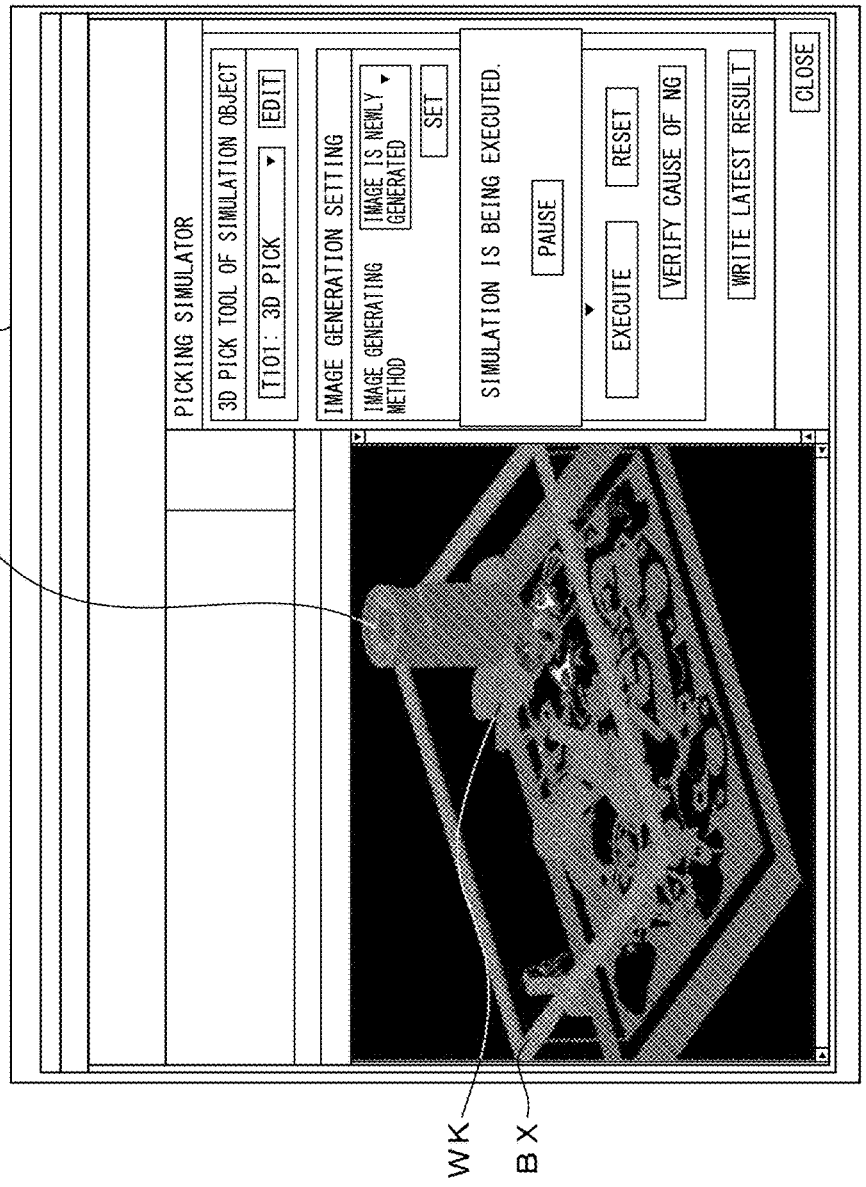
FIG. 33 is a view illustrating an image during a picking operation simulation.

In interference determination, it is determined whether or not a three-dimensional point cloud indicated by pixel data of each point on a height image interferes with a hand model, which is input in advance by the hand portion shape input section 35. Before the interference determination, with respect to one workpiece model detected by a three-dimensional search, the position at which the end effector EET is to be disposed and the posture of the end effector EET are calculated based on the position of the workpiece model and the holding posture of the registered workpiece model. An image during the picking operation simulation is illustrated in FIG. 33. Whether or not the end effector interferes with surrounding objects at the calculated position is determined by using a cross-sectional model registered in the hand model registration procedure flowchart of FIG. 18. In this interference determination, it is determined whether or not the three-dimensional point cloud interferes with the cross-sectional model using the cross-sectional model of the hand model. Specifically, as illustrated in FIG. 32A, when all three-dimensional points are spaced apart from the cross-sectional model, it is determined that the three-dimensional point cloud, that is, the height image does not interfere with the hand model. On the other hand, as illustrated in FIG. 32B, when only one three-dimensional point is contained inside the cross-sectional model, or when only one three-dimensional point is in contact with the edge portion of the cross-sectional model, it is determined that the three-dimensional point cloud, i.e. the height image does not interfere with the hand model. When there is no interference, this means that a holding solution for the workpiece model may be calculated. Thus, it is determined as "YES" in step SA13, and the processing proceeds to step SA14. On the other hand, when the three-dimensional point cloud interferes with the hand model, this means that no holding solution for the workpiece model may be calculated. Thus, it is determined as "NO" in step SA13 so that the processing proceeds to step SA11, and the flowchart ends.

Meanwhile, when the holding solution may be calculated and thus, the processing proceeds to step SA14, the number of workpiece models is reduced by one. The workpiece model, which is removed in step SA14, is a workpiece model that may be used to calculate a holding solution. After the number of workpiece models is reduced by one, the processing proceeds to step SA15, and then proceeds to step SA12 when there is another workpiece model obtained by the three-dimensional search. When there is no another workpiece model, it is determined as "NO" in step SA15 so that the processing proceeds to step SA11, and the flowchart ends.

In this way, the presence or absence of a holding solution capable of holding the workpiece model is determined for each detected workpiece model. Then, when a holding solution is obtained for the workpiece model, a simulation is performed to pick up a holding candidate position of the workpiece model with the hand portion and transport it to the outside of the storage container BX.

The result of executing the picking operation simulation may be displayed on the display section 3 as needed. The user may judge the suitability of the current setting based on the result of executing the picking operation simulation displayed on the display section 3. In addition, various settings may be changed as needed. For example, the installation position of the robot RBT, the position at which the storage container BX is placed, or the posture of the sensor section 2 is adjusted. When the picking operation simulation operation is again executed by re-inputting the changed setting as a simulation environment and an operation of confirming the suitability of the simulation environment, it is possible to determine appropriate setting conditions depending on the user's environment.

In addition, the physical simulation section 22 may repeatedly perform the physical simulation, but is configured to randomly stack workpiece models in bulk so that the workpiece models do not have the same arrangement each time. Therefore, the physical simulation section 22 may not create the same state as the bulk state obtained by the previously performed physical simulation. That is, since random bulk data is generated for each physical simulation, the result of the physical simulation is not reproducible.

Meanwhile, when the user performs, for example, reconsideration of the environment setting of a picking operation in order to confirm the effect thereof, it is the most efficient to reproduce a state, which has not been well done by a previous picking operation simulation, and confirm the state with respect to bulk data. For example, in a case where a holding solution of an end effector model for a certain workpiece model is not found and it is impossible to extract all workpiece models, the user may consider a measure of increasing the number of holding candidate positions or holding postures. In this case, in order to determine whether or not setting changed by the user was a valid solution to the problem that occurred at the previous time, it is the most efficient to reproduce and confirm a state, which has not been well done at the previous time, or a state close thereto.

In addition, the picking operation simulation may be started from not only a state where the problem occurs but also a state in the course of reaching the state where the problem occurs. For example, in a case where bulk data in which the problem occurred is composed by sequentially adding workpiece models, it is considered to confirm whether or not the number of workpiece models several times ago before the step in which the problem occurred may correspond to the number reduced by the several times.

In order to implement these, in the present exemplary embodiment, bulk data of a state that the user wishes to reuse such as the initial state, the end state, or the intermediate state of the bulk data is saved, and after the environment setting is again performed, it is possible to call up and verify the completely saved bulk data. The bulk data may be saved in the storage section 42, and may be recalled by designation by the user.

With the above procedure, when a holding solution is obtained with one of the workpiece models, the process of examining a holding candidate position ends at that point in time so that the processing is performed to hold the workpiece model at the holding candidate position corresponding to the obtained holding solution. However, the present invention is not limited to this method, and for example, the user may determine which holding candidate position to select after all holding candidate positions that can be held are acquired for one workpiece model. In addition, paying attention to information on the height at which a workpiece model is placed, one placed at a high height, in other words, one located at a higher position among a group of workpiece models in bulk may be selected as the holding candidate position.

The picking operation simulation may be performed as described above, and the picking operation simulation may be performed a plurality of times. That is, the picking operation simulation section 25 is configured to determine whether or not each of holding candidate positions, which are associated with workpiece models successfully searched by the search processing section 24, may be held by the robot RBT and to repeatedly execute the picking operation simulation in which the holding candidate position, which is determined to be held, is held by the robot RBT. The physical simulation section 22 is configured so as to execute a simulation a plurality of times using a plurality of workpiece models having a compressed data capacity so as to correspond to the picking operation simulation, which is performed a plurality of times. When the picking operation simulation ends, the physical simulation section 22 automatically executes a new physical simulation, and a picking operation simulation is performed using the new physical simulation result.

In addition, the picking operation simulation section 22 is configured to repeatedly execute a picking operation simulation, in which the workpiece models successfully searched by the search processing section 24 are held by the hand portion input by the hand portion shape input section 35, using each hand portion. When a plurality of shapes of the hand portion are input according to the hand model registration procedure flowchart of FIG. 18, after the picking operation simulation is performed using a hand model of one hand portion among them, the picking operation simulation is performed using a hand model of another hand portion. After the picking operation simulation for all hand portions ends, the picking operation simulation is performed again using the hand models of all of the hand portions. This may be performed repeatedly. In addition, after the picking operation simulation is performed a plurality of times using the hand model of one hand portion, the picking operation simulation may be performed a plurality of times using the hand model of another hand portion. The picking operation simulation may be performed hundreds to 1000 times for each hand portion.

Figure 34:
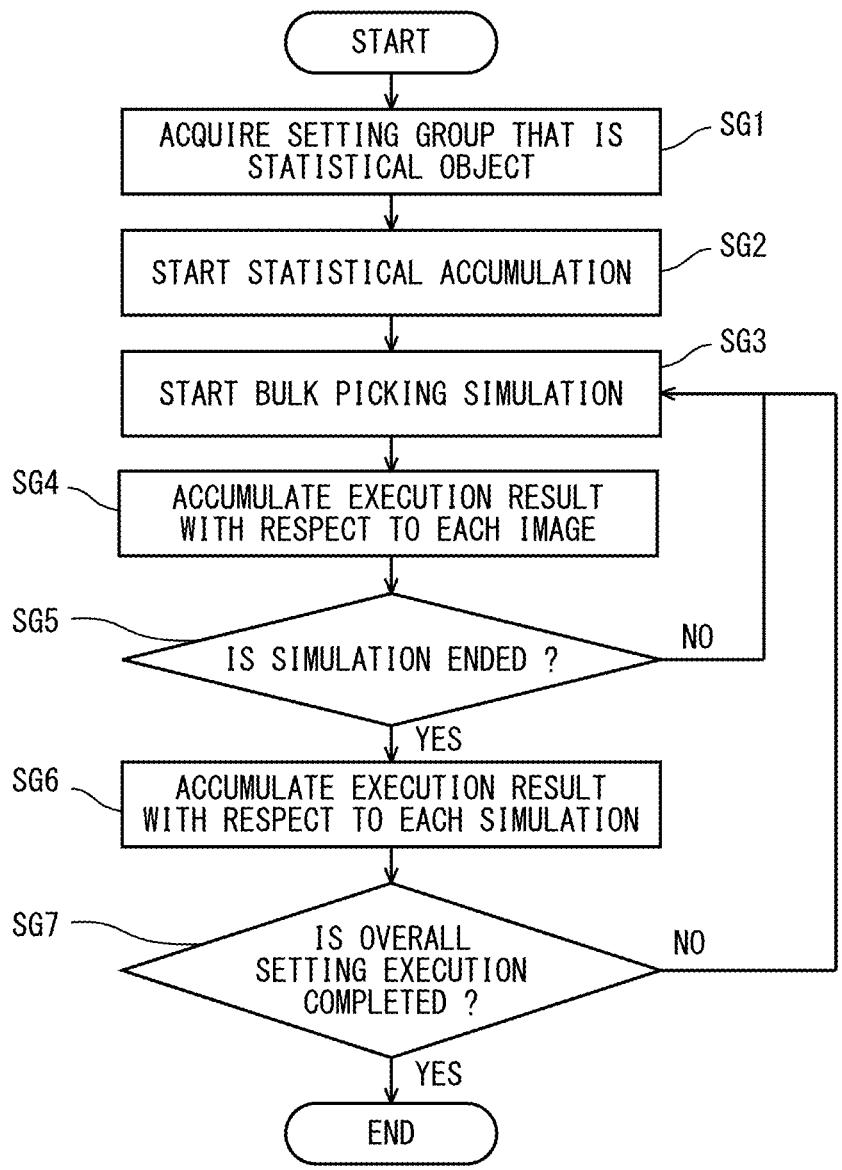
FIG. 34 is a statistical accumulation flowchart illustrating the procedure of accumulating results by performing a picking operation simulation a plurality of times.

As illustrated in the flowchart of FIG. 34, the picking operation simulation may be performed a plurality of times and the results thereof may be accumulated. After the flowchart of FIG. 34 starts, a setting group, which is a statistical object, is acquired in step SG1. The setting group is, for example, hand models of a plurality of hand portions input by the hand portion shape input part 35, a plurality of holding candidate positions set in search models, or a plurality of search models.

After the setting group, which is a statistical object, is acquired, the processing proceeds to step SG2, and statistical accumulation starts. This may be started by an instruction from the user. When the statistical accumulation starts, the processing proceeds to step SG3 in which the above-described picking operation simulation starts by acquiring a set of one setting (one hand portion, one holding candidate position, or one search model) from among the setting group acquired in step SG1. The picking operation simulation section 22 continues the picking operation simulation until holding by each hand portion is no longer performed.

The picking operation simulation in step SG3 is executed a plurality of times. That is, the physical simulation section 22 generates a bulk state where a plurality of workpiece models are stacked, obtains a height image based on the bulk state to perform a three-dimensional search, and then executes a picking operation simulation. Thereafter, the physical simulation section 22 newly generates a bulk state, obtains a height image based on the bulk state to perform a three-dimensional search, and then executes a picking operation simulation. That is, whenever the picking operation simulation by the picking operation simulation section 25 ends, the physical simulation section 22 newly executes a physical simulation to update data. This is repeatedly performed, and the results of the picking operation simulations for each height image are accumulated in step SG4.

When the picking operation simulation is performed a preset number of times, it is determined as "YES" in step SG5, and the processing proceeds to step SG6. On the other hand, when the number of times the picking operation simulation is performed is below the preset number, it is determined as "NO" in step SG5 so that the processing proceeds to step SG3 and a picking operation simulation is executed for another height image.

Thereafter, in step SG6, execution results for each picking operation simulation are accumulated. In step SG7, when there is a setting for which a picking operation simulation has not been executed among the setting groups acquired in step SG1, it is determined as "NO", and a picking operation simulation is repeatedly executed for the setting for which the picking operation simulation has not been executed. When the picking operation simulation is executed for all of the setting groups acquired in step SG1, it is determined as "YES" in step SG7 and the flowchart ends.

FIG. 35 is a table illustrating a list of results of a picking operation simulation in the order of holding registration numbers. In the left column of the table, search models are described, and in this example, there are three search models A to C. In the center column of the table in the left-and-right direction, holding candidate positions are listed and described in the order of registration numbers, there is illustrated a case where three holding candidate positions are registered in the search model A, five holding candidate positions are registered in the search model B, and four holding candidate positions are registered in the search model C. The number of times in the right column of the table is the number of times holding was successful in the picking operation simulation and is information indicating the frequency (use frequency) at which the holding candidate position is used when holding was successful in the picking operation simulation.

The table illustrated in FIG. 35 is a table generated by the display control section 26 so as to be displayed on the display section 3, and shows information indicating the use frequency of the respective search models A to C and the respective holding candidate positions A-001 to C-005 when holding was successful in the picking operation simulation in a comparable manner. In addition, instead of displaying both the respective search models A to C and the respective holding candidate positions A-001 to C-005, only the search models A to C or the respective holding candidate positions A-001 to C-005 may be displayed. In this table, although the respective search models and the respective holding candidate positions, which are not used for holding, are also displayed, only the respective search models, which are not used for holding, or only the respective holding candidate positions, which are not used for holding, may be displayed. The holding candidate positions, which are not used for holding, are holding candidate positions at which the number of times is 0.

FIG. 36 illustrates a case where the results illustrated in FIG. 35 are displayed in a list in descending order of the number of times, and this table is also a table generated by the display control section 26 so as to be displayed on the display section 3. Of course, the list may be displayed in ascending order. Since the holding registration position A-002, the holding registration position B-002, and the holding registration position B-003 are not adopted as the holding candidate positions during the picking operation simulation, it can be said that there is a problem in an actual bin picking operation even if they are deleted from data. In addition, it can be said that there is hardly any problem in the actual bin picking operation even if the search model B, which has a significantly smaller number of holding times than the search model A and the search model C, is deleted from data. In addition, since it is not necessary to consider the result data using these settings from the robot control program side, it is possible to reduce the number of setup processes.

FIG. 37 is a table illustrating a list of results of a picking operation simulation for each shape of the hand portion, and this table is also a table generated by the display control section 26 in order to be displayed on the display section 3. This table shows a case where the shape of the hand portion is seven kinds from "hand shape 1" to "hand shape 7", and the number of remaining workpieces (average) is a value obtained by dividing the total number of times, which is obtained by multiplying the number of workpieces that cannot be held in one picking operation simulation (workpieces remaining in the storage container BX) by the number of picking operation simulations, by the number of picking operation simulations. The (maximum) number of remaining workpieces is the number of workpieces in the picking operation simulation in which the largest number of workpieces remains, among all of the picking operation simulations. The (minimum) number of remaining workpieces is the number of workpieces in the picking operation simulation in which the smallest number of workpieces remains, among all of the picking operation simulations.

That is, since the display control section 26 is configured so that the number of workpiece models remaining when the picking operation simulation by the picking operation simulation section 25 ends may be displayed for each hand portion, the remaining number of workpieces may be compared for each shape of the hand portion. Since the remaining number of workpieces decreases as the degree of the success of holding the workpiece model by the hand portion is higher, and on the contrary, increases as the degree of the success of holding the workpiece model by the hand portion is lower, it is information indicating the degree of success of holding the workpiece model by the hand portion. Therefore, in this exemplary embodiment, information indicating the degree of the success of holding of the workpiece model by each hand portion obtained by the picking operation simulation may be displayed in a comparable manner. The degree of the success of holding the workpiece model may also be displayed by, for example, the ratio of the workpieces, which was successfully held, to all of the workpieces. A step of displaying the respective tables illustrated in FIGS. 35 to 37 on the display section 3 is a display step.

(Setting of Exposure Time)

As illustrated in FIG. 3, the shape measuring device 400 includes an exposure control section 40 for changing the exposure time (shutter speed) of the cameras CME1, CME2, CME3 and CME4 stepwise. The exposure control section 40 is configured to increase the exposure time at an equal ratio, but is not limited thereto. In this exemplary embodiment, the exposure time is extended by 1.5 times each time, but this magnification may be arbitrarily set.

The shape measuring device 400 includes the height image data generating section 33. The height image data generating section 33 is configured to obtain the light receiving amount from the cameras CME1, CME2, CME3 and CME4 at each exposure time, which is changed stepwise by the exposure control section 40, and to generate height image data in which each pixel value indicates the height of each portion of the surface of a measuring object (the surface of the workpiece WK) based on the obtained light receiving amount. This data may be generated by a method such as a phase shift method.

(Configuration of Pixel Determination Section)

The shape measuring device 400 includes the pixel determination section 34. The pixel determination section 34 is configured to obtain the light receiving amount received by the light receiving section at each exposure time, which is changed stepwise by the exposure control section 40, and to determine whether each pixel of each height image generated by the height image data generating section 33 is valid or invalid based on the obtained light receiving amount. In a case where the projector PRJ is configured to irradiate patterned light having a periodic illuminance distribution, the pixel determination section 34 is configured to determine that, when the contrast of the light amount of each pixel obtained by imaging of the cameras CME1, CME2, CME3 and CME4 is equal to or greater than a threshold, the pixel is valid. In addition, in a case where a light sectioning method is used as a method of acquiring a three-dimensional shape, when the quantity of light of each pixel is too small or saturated, the corresponding pixel is determined to be invalid and the other pixels are determined to be valid. That is, when the height image is generated, pixels, which cannot display the height, (pixels, which are displayed in black and appear to be pushed on the screen, or pixels, which are displayed whitely and appear to flutter) are invalid, and on the other hand, pixels, which cannot display the height, are determined to be valid.

Figure 39:
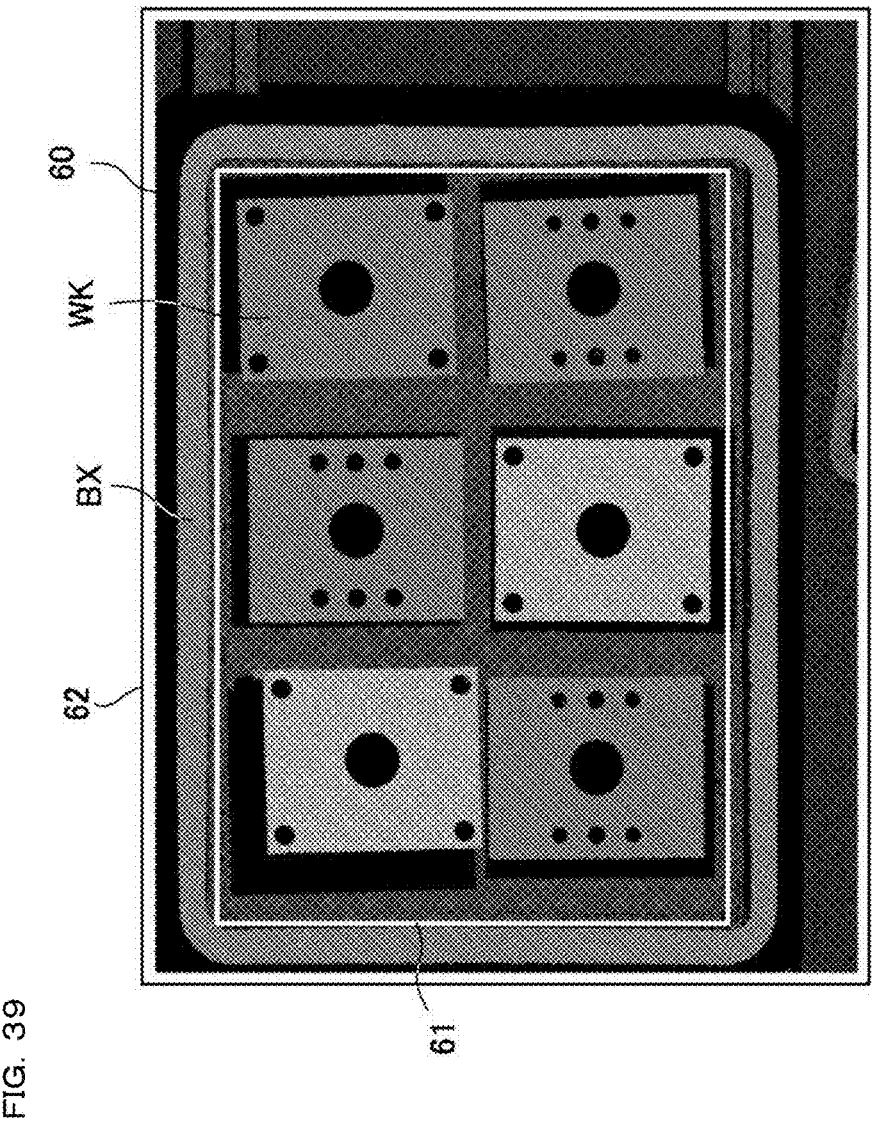
FIG. 39 is a view illustrating a case where an attention area is set within an imaging range.

The pixel determination section 34 may be configured to determine whether each pixel in an attention area set within the imaging range of the cameras CME1, CME2, CME3 and CME4 is valid or invalid. FIG. 39 illustrates an attention area setting screen 62 for allowing the user to set an attention area. The attention area setting screen 62 is a so-called user interface, which is generated by the display control section 26 and is displayed on the display section 3. An image 60 displayed in the attention area setting screen 62 of FIG. 39 is a height image within the imaging range of the cameras CME1, CME2, CME3 and CME4, and the storage container BX and the workpiece WK are included within this imaging range. Since the storage container BX is not a picking object, it is meaningless to determine whether pixels constituting the storage container BX are valid or invalid. In FIG. 39, a frame line 61 for setting the attention area may be displayed in the height image 60 on the attention area setting screen 62, and the user may set the area surrounded by the frame line 61 to the attention area. The frame line 61 may be enlarged, reduced, and deformed by operating the operation section 41, and the user may designate an arbitrary area as the attention area. When the attention area is set, whether each pixel in the area is valid or invalid is determined. Therefore, pixels in an unnecessary area are not used for setting the exposure time to be described later, and the exposure time may be set to an appropriate time.

Figure 42:
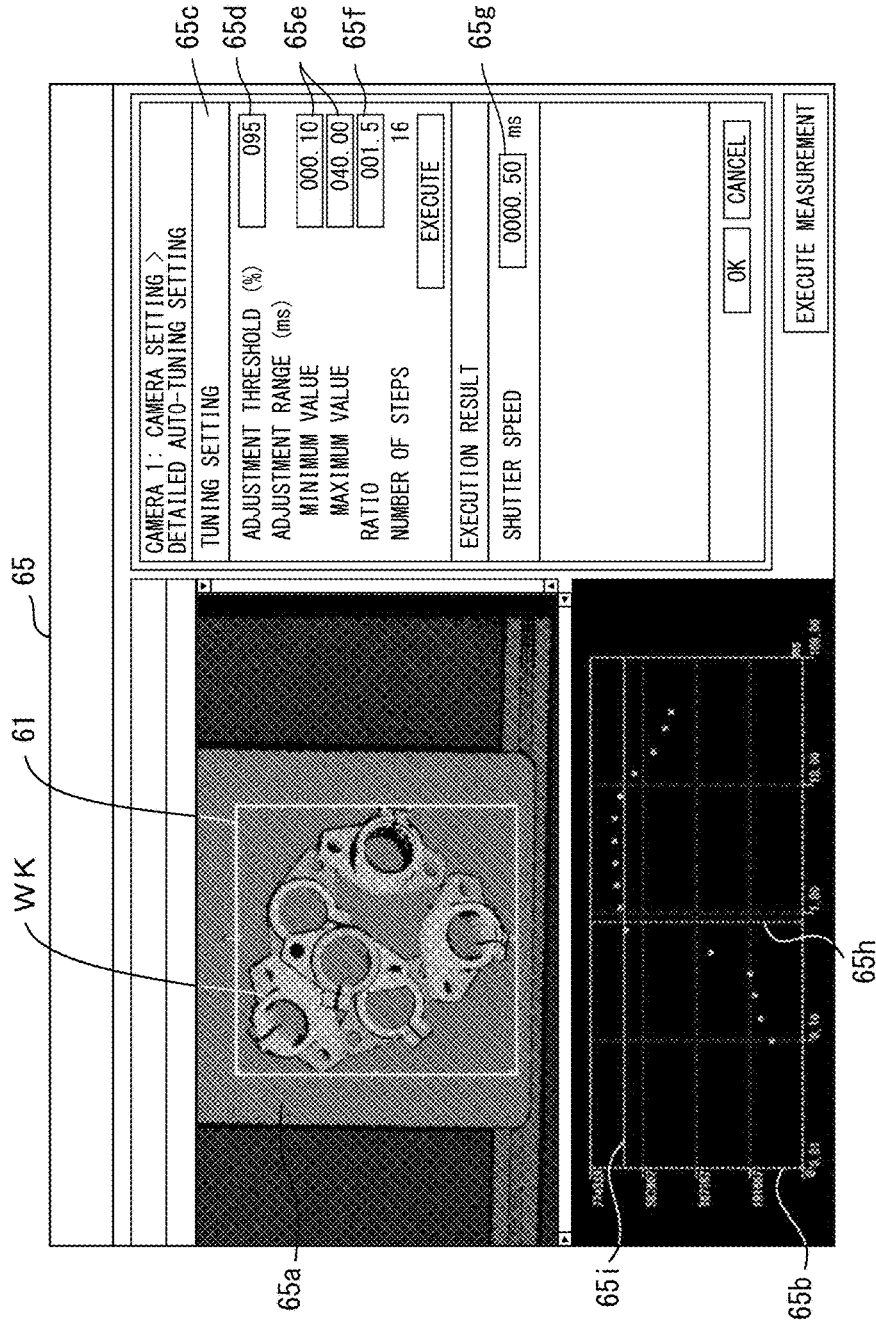
FIG. 42 is a view illustrating an exposure time setting screen in a case where an exposure time is at a recommended value.
Figure 43:
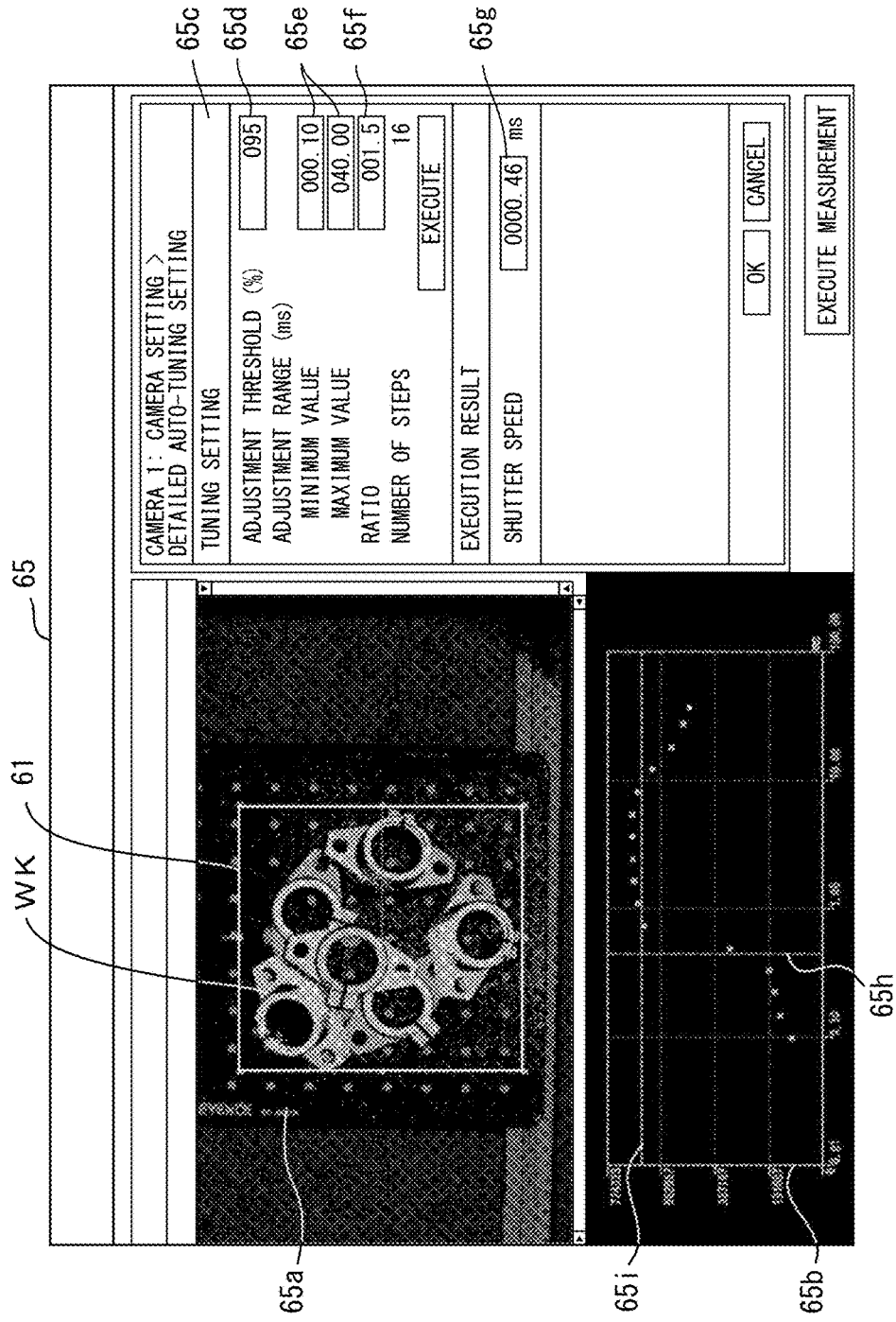
FIG. 43 is a view illustrating an exposure time setting screen in a case where an exposure time is shorter than a recommended value.
Figure 44:
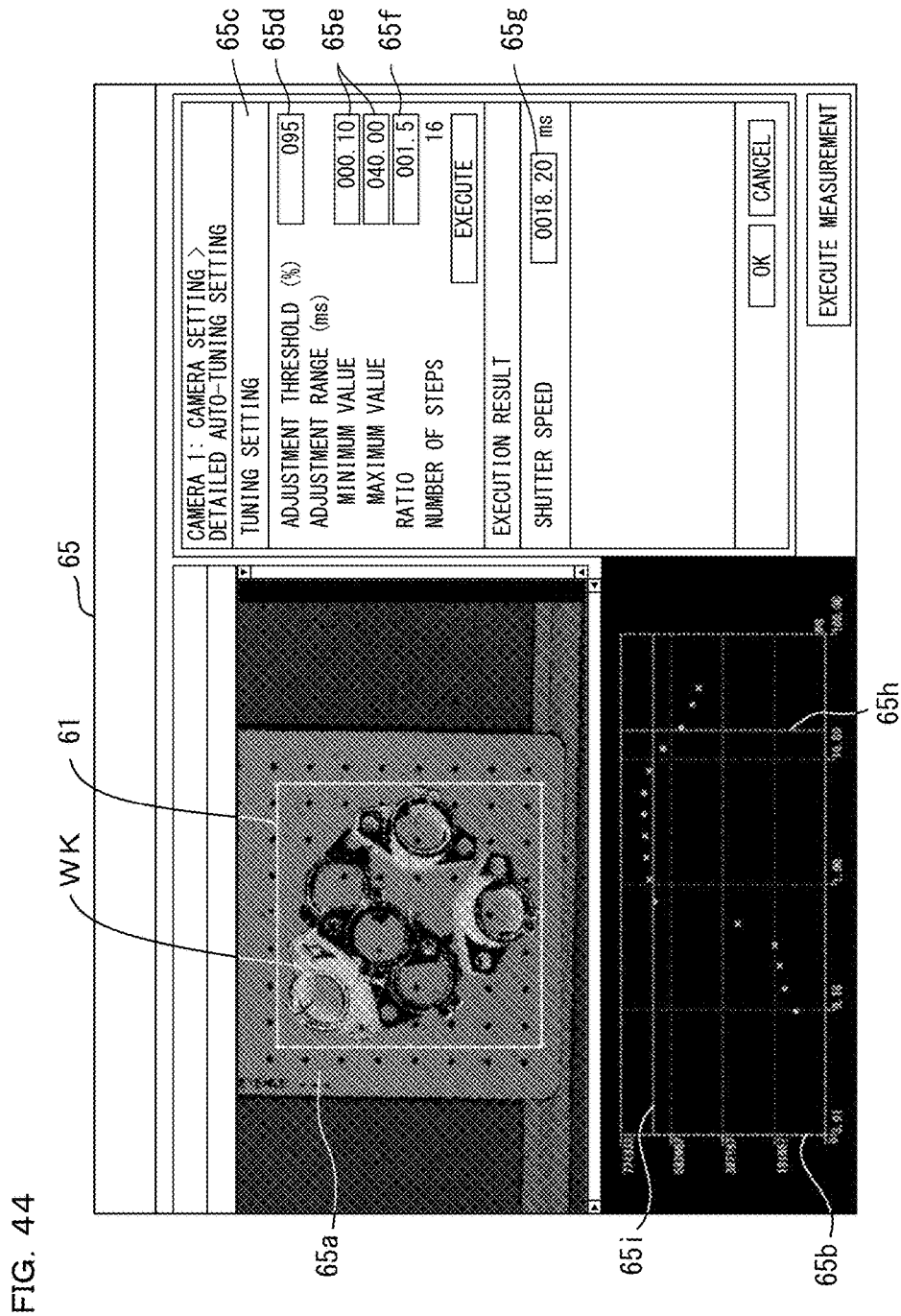
FIG. 44 is a view illustrating an exposure time setting screen in a case where an exposure time is longer than a recommended value.

FIG. 42, FIG. 43 and FIG. 44 illustrate one mode of the attention area setting screen, and the frame line 61 for setting the attention area is illustrated in white in each drawing. The display form of the frame line 61 is not limited to the form illustrated in each drawing. In addition, the attention area may be distinguished by a method such as changing the background color between the outside of the attention area and the inside of the attention area.

(Configuration of Exposure Time Setting Section)

The shape measuring device 400 includes the exposure time setting section 41. The exposure time setting section 41 sets, as a set value, the exposure time, which corresponds to a height image in which the number of pixels determined to be valid by the pixel determination section 34 satisfies a predetermined condition. The set value is the exposure time used for performing the actual operation of the robot system 1000. Although the exposure time may be adjusted by manual operation, manual operation requires a process in which the user searches for the range of optimum exposure time while viewing a height image obtained at an exposure time, which is set by the user. In addition, when performing a search for narrowing down the optimum exposure time by manual operation, it is difficult to obtain an appropriate exposure time from various cases due to dependency on individual skill and poor reproducibility. In addition, in a case of pixels constituting the height image, it is difficult to determine whether or not the pixels are valid pixels on the surface, and in particular, it is difficult to verify and determine within a short time whether or not the manually determined exposure time is a reasonable time. Thus, in this exemplary embodiment, an appropriate exposure time may be set automatically.

Figure 40:
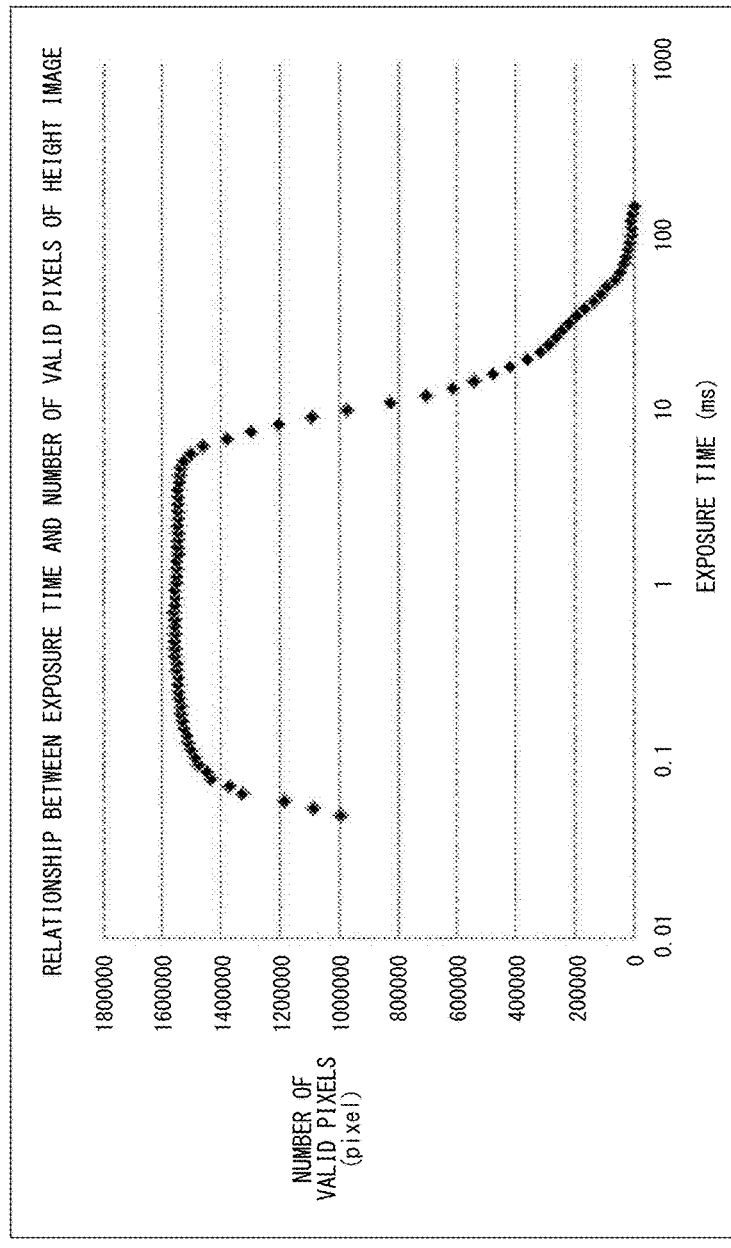
FIG. 40 is a graph illustrating a relationship between an exposure time and the number of valid pixels.

FIG. 40 is a graph illustrating a relationship between an exposure time and the number of valid pixels, in which the horizontal axis is the exposure time in logarithmic scale (ms) and the vertical axis is the number of valid pixels. In this graph, a height image is obtained by capturing an image of a certain fixed workpiece by the cameras CME1, CME2, CME3 and CME4 while changing the exposure time stepwise, and the number of valid pixels included in the height image is plotted for each exposure time. In the relationship between the number of valid pixels and the exposure time, as schematically illustrated in this graph, the number of valid pixels scarcely changes even if the exposure time changes within a certain range of the exposure time, but the number of valid pixels abruptly decreases outside the range. In the example of this graph, a height image having a large number of valid pixels may be obtained when the exposure time is within the range from 0.1 ms to 6 ms, but a height image having an extremely small number of valid pixels is obtained when the exposure time is below 0.1 ms and exceeds 6 ms. When the number of valid pixels becomes extremely small, the black portion in the height image of FIG. 39 increases, and thus, the accuracy of a three-dimensional search decreases.

Figure 41:
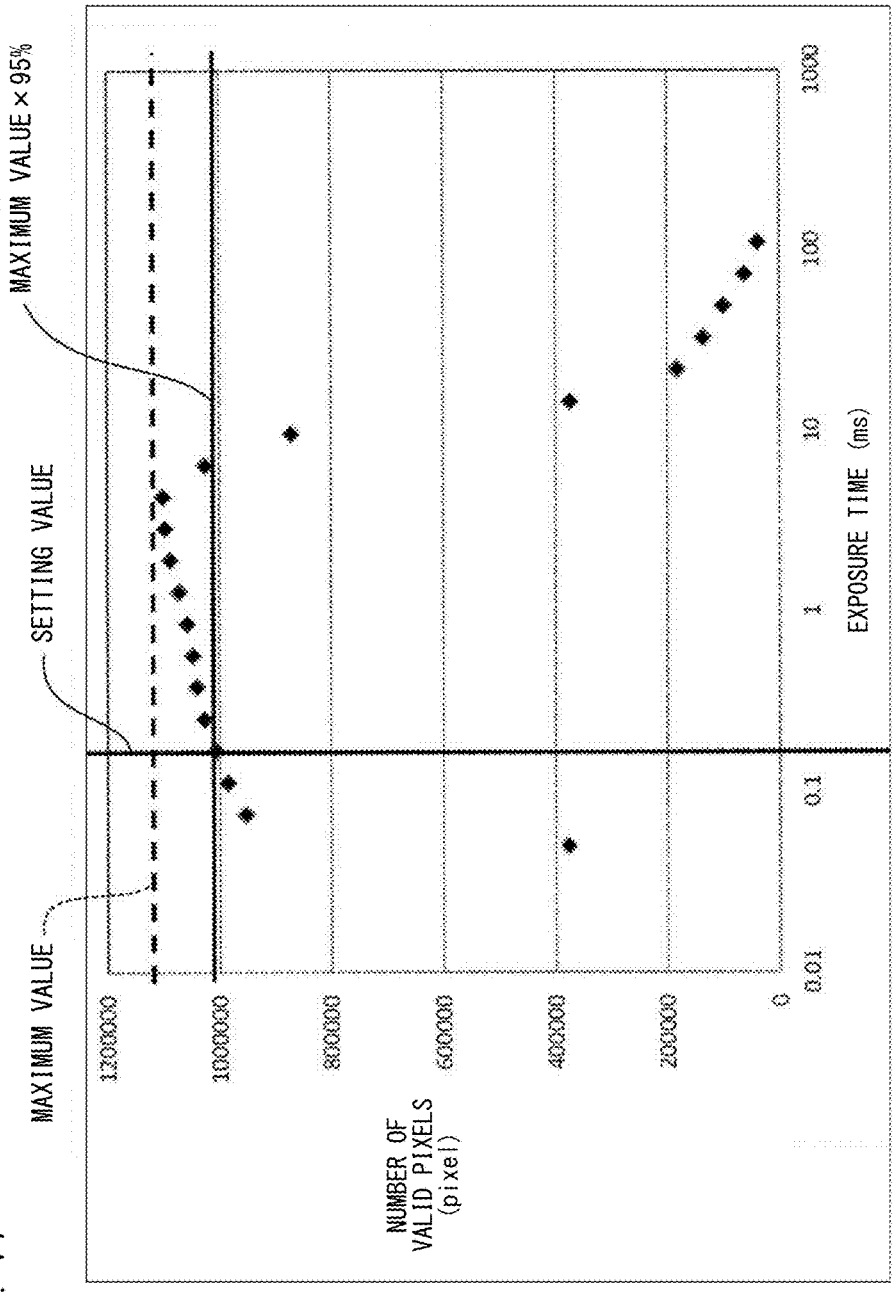
FIG. 41 is a view illustrating the gist of setting an exposure time.

In this exemplary embodiment, as illustrated in detail in FIG. 41, the exposure time at which the number of valid pixels is 95% of the maximum value is set as a set value. That is, the exposure time setting section 41 is configured to set, as a set value, a predetermined time, which is equal to or shorter than the exposure time at which the number of pixels determined to be valid by the pixel determination section 34 is the largest. The reason is that, since the exposure time at which the number of valid pixels takes the maximum value is often present in an approximately flat portion of the graph illustrated in FIG. 41 and the exposure time selected as the set value is likely to fluctuate in the time axis direction, and thus may be unstable, instead of the exposure time at which the number of valid pixels takes the maximum value, the exposure time at which the number of valid pixels is slightly smaller than the maximum value is set as the set value. In this exemplary embodiment, the exposure time at which the number of valid pixels is 95% of the maximum value is set as the set value, but is not limited thereto, and the exposure time at which the number of valid pixels is equal to or greater than 90% and equal to or less than 99% may be set as the set value.

In this exemplary embodiment, the user may adjust the exposure time automatically set by the exposure time setting section 41. FIG. 42 illustrates an exposure time setting screen 65 and also illustrates a case where the exposure time is at a recommended value. The exposure time setting screen 65 includes a height image display area 65a, which is generated by the height image generating section 33, a graph display area 65b, which displays a graph illustrating the relationship between the exposure time and the number of valid pixels, and a setting area 65c, which enables setting by the user.

An example of a method of generating a height image by the height image generating section 33 will be described.

The height image is an image in which a height value is stored in each pixel value constituting the image. Typically, the height image is an image in which the height is represented by a luminance value. With regard to the method of generating the height image, a Z buffer method may be suitably used.

That is, a two-dimensional height image is drawn by rendering, which erases shadows, based on three-dimensional bulk data composed of workpiece models, which are CAD data of workpieces. As a rendering method, for example, a Z buffer method, a Z sort method, a scan line method, or a ray tracing method may be used. Here, a plurality of workpiece models are drawn to a height image using the Z buffer method. In the Z buffer method, a relation of Z buffer=height image is implemented. In addition, the Z buffer is not initialized at infinity, but takes the form of being initialized to the minimum with floor surface or box information. In the course of the Z buffer method, a normal image, which retains normal information on the surface of the workpiece model for each pixel, is also created. Here, normal data is also updated with respect to a pixel, which overwrites the Z buffer. In addition, in this specification, the Z buffer method is exemplified as a method for conversion to a height image, but the present invention is not limited to the Z buffer method, and other methods may be appropriately used as described above. In this way, the height image is drawn again from the three-dimensional bulk data.

The graph displayed in the graph display area 65b may be generated by the display control section 26, and is the same as the graph illustrated in FIG. 40 or FIG. 41. The horizontal axis of the graph, that is, the exposure time axis is displayed in logarithmic (equal ratio), but is not limited to this display form, and an arbitrary display is also possible.

In the setting area 65c, a threshold setting portion 65d, which sets an adjustment threshold (%), a range setting portion 65e, which sets an adjustment range of the exposure time, a ratio setting portion 65f, and an exposure time display area 65g, which displays a set value (recommended value) of the exposure time, are provided.

The threshold setting portion 65d is a portion, which sets, as a set value, the exposure time at which the percentage of the number of valid pixels relative to the maximum value is a predetermined percentage, or sets the value as a percentage. The value may be set in a pitch of 1%. The range setting portion 65e may separately set the maximum value (maximum exposure time) and the minimum value (minimum exposure time) within the adjustment range of the exposure time. A ratio setting portion 65f is a portion, which sets the ratio when increasing the exposure time at an equal ratio.

The set value of the exposure time may be displayed with a white vertical line 65h in the graph displayed in the graph display area 65b. In addition, a value, which is obtained by multiplying the maximum value of the number of valid pixels by a value set by the threshold setting portion 65d, may be displayed with a white horizontal line 65i in the graph displayed in the graph display area 65b.

The user may adjust the exposure time by inputting the exposure time, which is displayed in the exposure time display area 65g, by operating the operation section 4. FIG. 43 illustrates a case where the exposure time is shorter than a recommended value, and FIG. 44 illustrates a case where the exposure time is longer than the recommended value. As illustrated in FIGS. 43 and 44, when the user changes the exposure time to a time that is out of the set value, a height image captured at the changed exposure time may be displayed in the height image display area 65a. The height images illustrated in FIGS. 43 and 44 show that the black and pushed portion is wider compared to the height image illustrated in FIG. 42 in a case where the exposure time is at the recommended value, and thus, it can be appreciated that the exposure time is inappropriate.

In addition, the height image captured at the exposure time illustrated in FIG. 42 and the height image captured at the exposure time illustrated in FIG. 43 or 44 may be simultaneously displayed on the display section 3. That is, the display control section 26 may be configured so that a height image corresponding to a first exposure time and a height image corresponding to a second exposure time, which is different from the first exposure time, may be simultaneously displayed.

The setting of the exposure time may be performed before actual operation starts, but may also be performed in order to adjust the exposure time after actual operation starts.

(Three-Dimensional Measuring Section)

The three-dimensional measuring section 30 may be provided in the image processing device 300. The three-dimensional measuring section 30 is configured to three-dimensionally measure a work space in which a plurality of workpieces are stacked during actual operation and to output the measurement data. The sensor section 2 may be a component of the three-dimensional measuring section 30. The measurement method is as described above and is not particularly limited. The three-dimensional measuring section 30 may be integrally provided in the sensor section 2.

(Search Processing Section)

The search processing section 24 is used in the picking operation simulation described above, but may also be used during actual operation. The search processing section 24 may be configured separately from one used in the picking operation simulation.

That is, the search processing section 24 performs a search processing of detecting the positions and postures of a plurality of workpieces included in measurement data output from the three-dimensional measuring section 30 using a plurality of search models registered in the search model registering section 27. When performing the search processing, a height image is generated by the height image generating section 33 based on the measurement data output from the three-dimensional measuring section 30, and whether or not the search model registered by the search model registering section 27 exists in the height image is searched for. This method may be the same as the method performed in the picking operation simulation.

In addition, the search processing section 24 may detect the positions and postures of the plurality of workpieces included in the measurement data output from the three-dimensional measuring section 30 using a plurality of characteristic points, which indicate the shape of the search models. That is, a height image is generated based on the measurement data output from the three-dimensional measuring section 30, and a shape matching the plurality of characteristic points representing the shape of the search model is searched for in this height image.

In addition, the search processing section 24 may be configured to detect the positions and postures of the plurality of workpieces included in the measurement data output from the three-dimensional measuring section 30 using associated height image data registered in the search model registering section 27.

(Interference Determination Section)

The interference determination section 31 may be provided in the image processing device 300. The interference determination section 31 determines whether or not the robot RBT may hold a holding candidate position, which is set on the surface of a workpiece corresponding to a search model successfully searched by the search processing section 24, without interfering with surrounding objects. The determination method by the interference determination section 31 may be made the same as the method performed in the picking operation simulation.

Figure 45A:
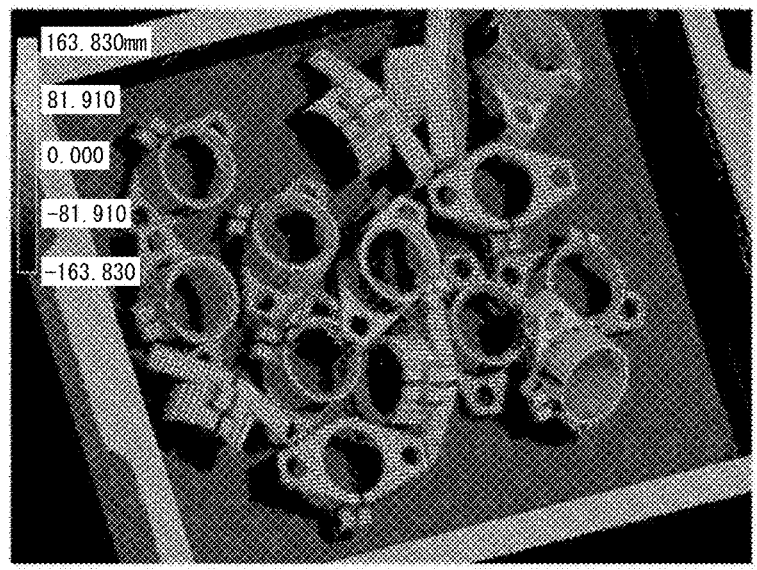
FIG. 45A is a view illustrating the superimposed and displayed state of a point cloud, which three-dimensionally displays a height image, generated based on measurement data obtained by a three-dimensional measuring section, from a slightly inclined direction, and characteristic points of search models at positions of search results.

The interference determination section 31 is configured to estimate a workpiece surface, which cannot be measured by the three-dimensional measuring section 30, based on a search model that has already been successfully searched. FIG. 45A is a view illustrating the superimposed and displayed state of a point cloud, which three-dimensionally displays a height image, generated based on measurement data obtained by the three-dimensional measuring section 30, from a slightly inclined direction, and characteristic points of search models at positions of search results. Since, for example, approximately vertical surfaces are omitted from the measurement data, the inner bottom surface appears to be omitted, or many black and pushed portions are shown. The black and pushed portions in the height image are a blind spot of the camera CME, a portion that becomes a blind spot from the projected light of the projector PRJ, a highly lustrous metallic workpiece, or a portion in which data became illegal due to multiple reflection with surrounding objects. As described above, when there are many black and pushed portions in the height image, a three-dimensional search may not be performed sufficiently, or interference may be erroneously determined even through interference does not occur in practice.

Figure 45B:
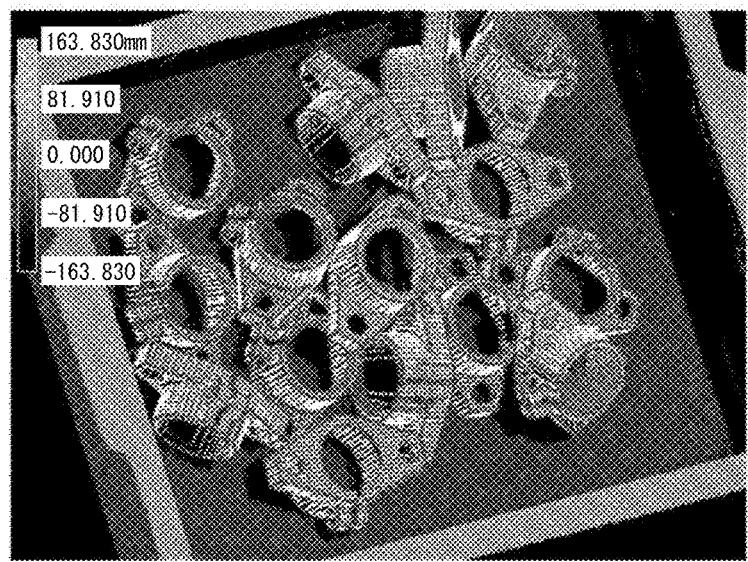
FIG. 45B is a view illustrating the superimposed and displayed state of a workpiece surface, which is not measured by the three-dimensional measuring section and is estimated using the relevance to other surfaces, and characteristic points of search models of other surfaces, in addition to FIG. 45A.

On the other hand, FIG. 45B is a view illustrating the superimposed and displayed state of a workpiece surface, which is not measured by the three-dimensional measuring section 30 and is estimated using the relevance to other surfaces, and characteristic points of search models of other estimated surfaces, in addition to FIG. 45A. That is, in the search model registering section 27, since a plurality of height image data of the workpiece model viewed from different directions are registered as search models and each height image is saved in a state of having relevance information thereof, for example, when a search model of the workpiece viewed from above is successfully searched in actual operation, it is possible to know that the shape of the workpiece model is completed when a search model viewed from the left is located at any position of the search model viewed from above in any manner, and to supplement an omitted part of the measurement data using the same. Therefore, in FIG. 45B, portions that cannot be three-dimensionally measured such as approximately vertical surfaces may be supplemented at characteristic points of search models, compared to FIG. 45A. In addition to the interference determination for the three-dimensional point cloud described in the explanation of the interference determination in the physical simulation, when the interference determination with respect to the characteristic points of the search models including other surfaces estimated based on the search result is also performed, it is possible to implement the interference determination in consideration of the portions that cannot be three-dimensionally measured.

(Holding Position Determination Section)

The holding position determination section 32 may be provided in the image processing device 300. The holding position determination section 32 is configured to determine a holding candidate position, which is determined by the interference determination section 31 so as to be held without interfering with surrounding objects, as an actual holding position.

(Procedure in Actual Operation)

Next, the procedure in actual operation will be described based on the flowchart illustrated in FIG. 38. In step SH1 after started, as illustrated in FIG. 1, the workpieces WK, which are in bulk in the storage container BX, are three-dimensionally measured using the sensor section 2. In step SH1, a height image is generated by the height image generating section 33 based on the measurement data output from the three-dimensional measuring section 30.

Thereafter, in step SH2, the above-described three-dimensional search is performed on the height image generated in step SH1 to detect the position and posture of each workpiece. In the subsequent step SH3, the position and posture at which the hand portion is to be disposed are calculated based on the position of a registered workpiece model and the holding posture of the workpiece model.

In step SH4, whether or not the hand portion interferes with surrounding objects at the calculated position is determined by using the cross-sectional model registered in the hand model registration procedure flowchart of FIG. 18. Specifically, whether or not a three-dimensional point cloud indicated by the pixel data of each point on the height image interferes with a hand model input in advance by the hand portion shape input section 35 is determined by using the cross-sectional model of the hand portion. When it is determined as "NO" in step SH5 and the hand portion does not interfere with surrounding objects, the processing ends under the judgment in which there is a holding solution. The holding solution is transmitted to the robot controller 6, and the robot controller 6 controls the arm portion ARM and the hand portion to pick up and transport the workpieces WK.

When it is determined as "YES" in step SH5 and the hand portion interferes with surrounding objects, the processing proceeds to step SH6 and it is determined whether or not there is another registered holding candidate position. When it is determined as "YES" in step SH6 and there is another holding candidate position, the processing returns to step SH3. When it is determined as "NO" in step SH6 and there is no other holding candidate position, the processing proceeds to step SH7. In step SH7, it is determined whether or not there is another workpiece detected in step SH2. When it is determined as "YES" in step SH7 and there is another workpiece, the processing returns to step SH3. When it is determined as "NO" in step SH7 and there is no other workpiece, the processing ends under the judgment in which there is no holding solution. When a plurality of workpieces are detected by the three-dimensional search as described above, it is determined whether or not the detected workpieces may be held one by one.

Figure 38:
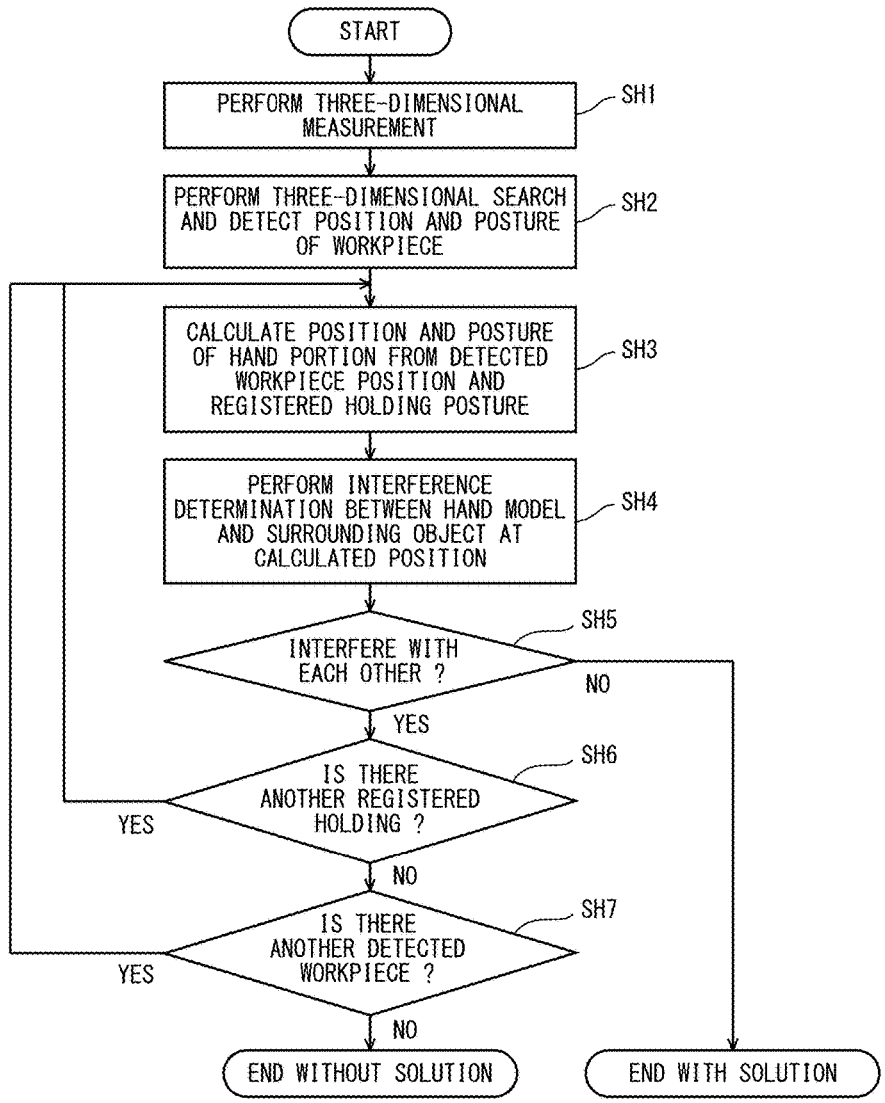
FIG. 38 is a flowchart illustrating the procedure upon operation.
Figure 46:
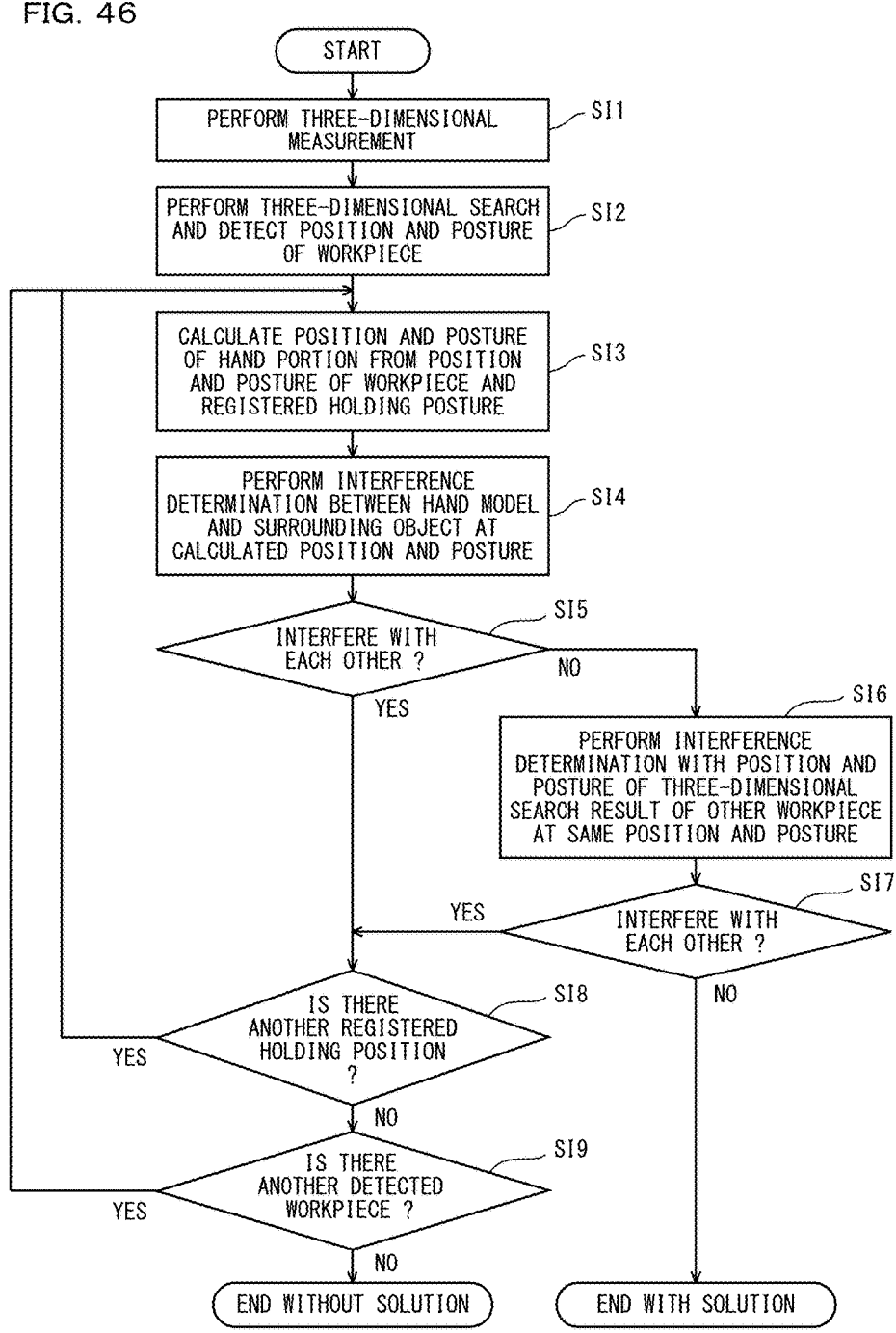
FIG. 46 is a flowchart illustrating another procedure upon operation.

The flowchart illustrated in FIG. 46 illustrates another procedure 1 upon operation, and steps SI1 to SI5 of the flowchart illustrated in FIG. 46 are the same as steps SH1 to SH5 of the flowchart illustrated in FIG. 38. In step SI6 of the flowchart illustrated in FIG. 46, it is determined whether or not the hand portion interferes with other detected workpieces at the same position and posture as the result calculated in step SI3. Specifically, whether or not a group of characteristic points of a search model determined from the position and posture of each search result interferes with the hand model input in advance by the hand portion shape input section 35 is determined using the cross-sectional model of the hand portion. In addition, whether or not a group of characteristic points of a search model of another surface estimated from each search result interferes with the hand model is also determined using the relevance to the surfaces.

When it is determined as "NO" in step SI7, the processing ends under the judgment in which there is a holding solution. On the other hand, when it is determined as "YES" in step SI7, the processing proceeds to step SI8. Step SI8 and step SI9 are the same as step SH6 and step SH7 of the flowchart illustrated in FIG. 38, respectively.

Figure 47A:
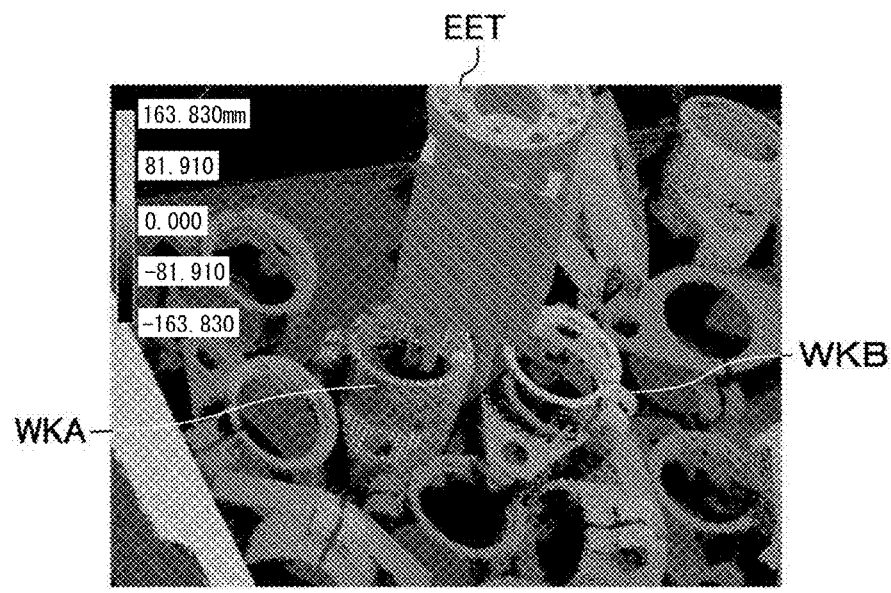
FIG. 47A is an image illustrating a case where an incorrect determination result is obtained by interference determination without using the relevance to other surfaces.
Figure 47B:
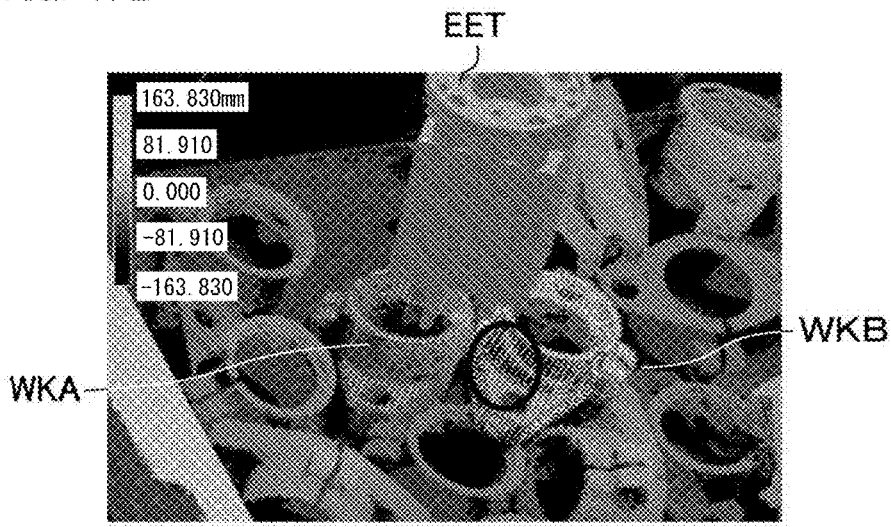
FIG. 47B is an image illustrating a case where a correct determination result is obtained by interference determination using the relevance to other surfaces.

FIG. 47A illustrates a case where interference determination is performed only on a three-dimensional point cloud obtained by actually performing three-dimensional measurement without using the relevance to other surfaces, and it can be appreciated that the shape of the side surface of the workpiece WKB close to the right side of the workpiece WKA, which is a holding object, is omitted in the measurement data. On the other hand, FIG. 47B illustrates a case where interference determination is performed on both the characteristic points of the search result of another workpiece or the characteristic points of a search model of another estimated surface by using the relevance to the surfaces. Since a search model of the workpiece WKB viewed from above is successfully searched, and thus the shape of the side surface of the workpiece WKB is estimated using the relevance to the search model viewed from above, the characteristic points are also displayed on the side surface of the workpiece WKB. By using the relevance to the surfaces as described above, it is possible to estimate and supplement an omitted part of the measurement data.

In a case of FIG. 47A, since the shape of the side surface of the workpiece WKB is omitted, when the hand portion attempts to hold the workpiece WKA, which is an held object, it is erroneously determined that interference does not occur even though the tip end of the hand portion actually interferes with the side surface of the workpiece WKB. On the other hand, in a case of FIG. 47B, in addition to the interference determination for the three-dimensional point cloud indicated by the pixel data of each point of the height image, since the shape of the side surface of the workpiece WKB is estimated based on information on the relevance to the surfaces and interference determination is performed by including the characteristic points of the estimated search model, it is determined that the tip end of the hand portion interferes with the side surface of the workpiece WKB when the hand portion attempts to grip the workpiece WKA, which is a held object, and a correct determination result may be obtained.

Figure 48:
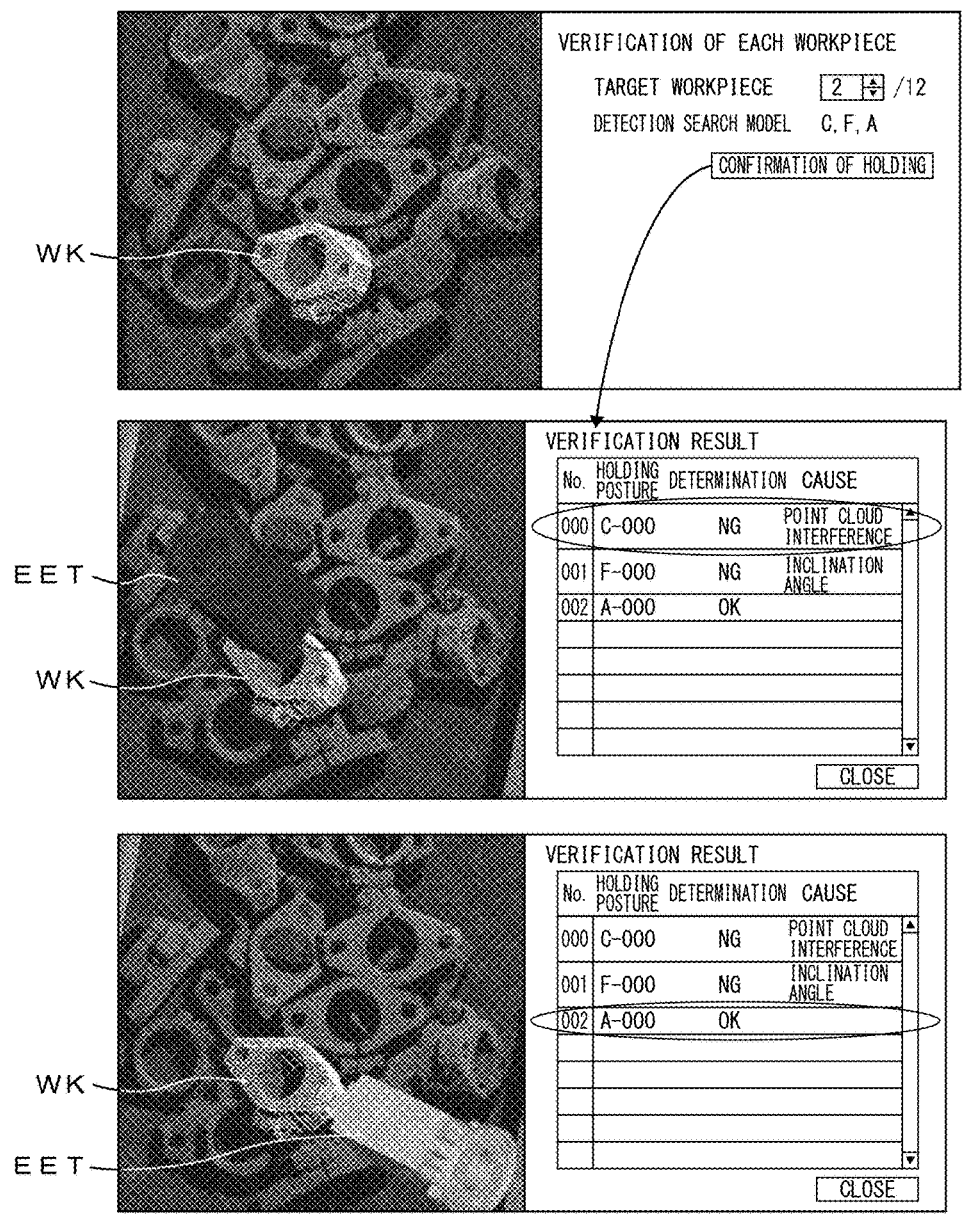
FIG. 48 is a view illustrating an image displayed on a display section while interference determination is performed.

In addition, as illustrated in FIG. 48, interference between the workpiece and the hand portion may be determined for each holding candidate position. The reason of the interference is, for example, displayed, on the screen illustrated in FIG. 48, as "point cloud interference" when the characteristic points interfere with the hand portion, or as "inclination angle" when the inclination angle of the hand portion is out of a prescribed range.

Figure 49:
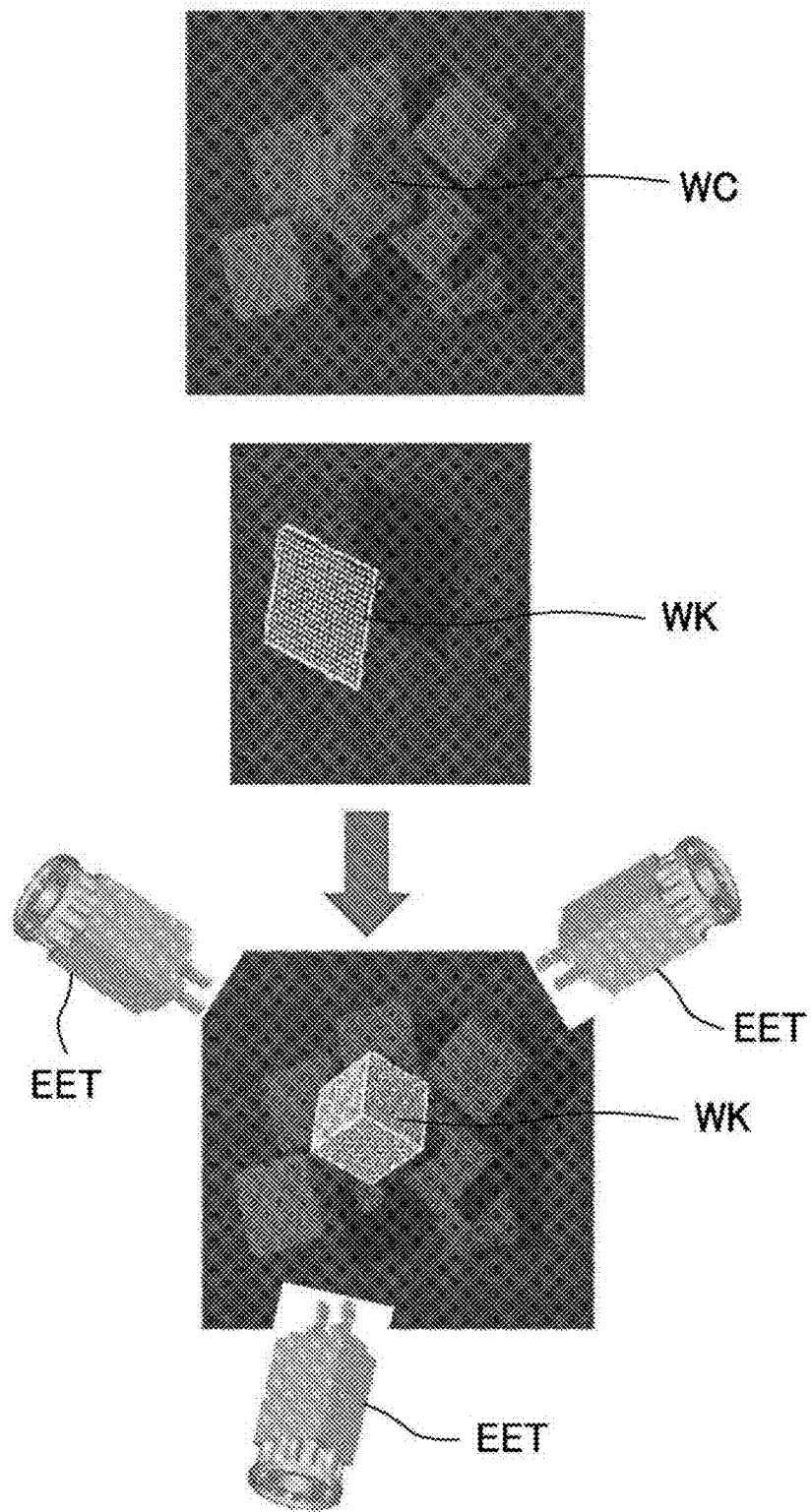
FIG. 49 is a view for explaining a case where cubic workpieces are in bulk.

In addition, as illustrated in FIG. 49, in a case where workpieces having a cubic shape are in bulk, since all of the six surfaces of the workpiece have the same shape, only one surface is registered as a search model and one holding posture to hold the surface from directly above is registered. Thus, the search and holding with respect to all of the six surfaces are possible.

(Operation and Effect of Exemplary Embodiment)

According to this exemplary embodiment, since a plurality of workpiece models having a compressed data capacity are used upon a physical simulation, and search processing data in which workpiece models having a large data capacity are disposed according to the position and posture of each workpiece model in the data of the bulk state generated by the physical simulation is used upon a picking operation simulation, it is possible to execute a bin picking simulation having high reproducibility while shortening the time required for the physical simulation.

In addition, it is possible to register a plurality of search models and to set a plurality of holding candidate positions for each search model in association with the corresponding search model. A search processing of detecting the position and posture of the workpiece model is executed using the registered search model, and when each of the plurality of holding candidate positions associated with the successfully searched workpiece model may be held by the robot, a picking operation of holding the holding candidate position by the robot is simulated. By repeating this simulation, information indicating the use frequency of each search model and/or each holding candidate position when the holding is successful may be displayed in a comparable manner. Therefore, it is possible to easily compare a holding position having a low contribution rate for improving the removal success rate of the workpiece with other holding positions, and to select the holding position based on objective data.

In addition, since a plurality of shapes of the hand portion of the robot RBT may be input by the hand portion shape input section 35, a picking operation simulation may be executed by using each input shape of the hand portion, and information indicating the degree of success of holding the workpiece model by each hand portion may be displayed in a comparable manner, it is possible to easily compare the shape of the hand portion having a low contribution rate for improving the removal success rate of the workpiece with the shape of other shapes of the hand portion, and to select the hand portion based on objective data.

In addition, the workpiece surface, which cannot be measured by the three-dimensional measuring section 30, is estimated based on the search model that has already been successfully searched, and it is determined also using the estimated workpiece surface whether or not the robot RBT does not interfere with surrounding objects. Thus, since the shape of the workpiece in the portion in which height data is omitted may be estimated by using the portion in which height data exists, it is possible to precisely determine whether or not the robot RBT interferes with surrounding objects even though there is an omitted part in the height data.

In addition, when setting the exposure time, it is possible to obtain the light receiving amount at each exposure time, which is changed stepwise by the exposure control section 40. It is determined, based on the light receiving amount received at each exposure time, whether each pixel, which generates height image data, is valid or invalid. Since the exposure time, which corresponds to the height image in which the number of pixels determined to be valid satisfies a predetermined condition, is automatically set, it is possible to obtain height image data having a large number of valid pixels without adjusting the exposure time by manual operation. Thus, dependency on individual skill is eliminated and reproducibility is increased, and moreover, it is possible to obtain an appropriate exposure time from various cases.

The above-described exemplary embodiment is merely illustrative in all respects, and should not be interpreted restrictively. In addition, all variations or modifications falling within the scope of the claims are within the scope of the present invention.

As described above, the present invention may be applied to, for example, a robot system, which picks up workpieces in bulk.

What is claimed is:
1. A shape measuring device that measures a shape of a measuring object, the shape measuring device comprising:

a light projecting section configured to irradiate the measuring object with light;

a light receiving section configured to receive the light projected by the light projecting section and reflected from the measuring object;

an exposure control section configured to change an exposure time of the light receiving section stepwise;

a height image data generating section configured to obtain a light receiving amount output from the light receiving section at each exposure time, which is changed stepwise by the exposure control section, and to generate height image data, in which each pixel value indicates a height of each portion of a surface of the measuring object, based on the obtained light receiving amount;

a pixel determination section configured to obtain a light receiving amount received by the light receiving section at each exposure time, which is changed stepwise by the exposure control section, and to determine whether each pixel constituting each height image, which is generated by the height image data generating section, is valid or invalid based on the obtained light receiving amount; and an exposure time setting section configured to set, as a set value, an exposure time, which corresponds to a height image in which the number of pixels determined to be valid by the pixel determination section satisfies a predetermined condition.

2. The shape measuring device according to claim 1, wherein the exposure control section is configured to increase the exposure time at an equal ratio.

3. The shape measuring device according to claim 1, wherein the pixel determination section is configured to determine whether each pixel in an attention area, which is set within an imaging range by the light receiving section, is valid or invalid.

4. The shape measuring device according to claim 3, further comprising:

a display control section configured to generate an attention area setting screen configured to cause a user to set the attention area; and a display section configured to display the attention area setting screen generated by the display control section.

5. The shape measuring device according to claim 1, wherein the exposure time setting section is configured to set, as the set value, a predetermined time, which is equal to or less than an exposure time at which the number of pixels determined to be valid by the pixel determination section is the largest.

6. The shape measuring device according to claim 1, wherein the light projecting section is configured to irradiate patterned light having a periodic illuminance distribution, and the pixel determination section is configured to determine a pixel, a contrast of a light amount of which is equal to or greater than a threshold value, to be valid.

7. The shape measuring device according to claim 1, wherein the shape measuring device is configured to allow the user to adjust the exposure time set by the exposure time setting section.

8. The shape measuring device according to claim 1, further comprising a display control section configured to enable simultaneous display of a height image corresponding to a first exposure time and a height image corresponding to a second exposure time, which is different from the first exposure time.

9. The shape measuring device according to claim 1, further comprising a display control section configured to generate a graph illustrating a relationship between the number of pixels determined to be valid by the pixel determination section, and the exposure time and to enable logarithmic display of an exposure time axis.

10. A shape measuring method of measuring a shape of a measuring object, the shape measuring method comprising:

irradiating the measuring object with light and receiving the light reflected from the measuring object;

changing an exposure time of the light receiving section stepwise, obtaining a light receiving amount output from the light receiving section at each exposure time, which is changed stepwise, and generating height image data, in which each pixel value indicates a height of each portion of a surface of the measuring object, based on the obtained light receiving amount;

obtaining a light receiving amount received by the light receiving section at each exposure time, which is changed stepwise, and determining whether each pixel constituting each height image data is valid or invalid based on the obtained light receiving amount; and setting, as a set value, an exposure time, which corresponds to a height image in which the number of pixels determined to be valid satisfies a predetermined condition.

\* \* \* \* \*